(12) United States Patent
Benfield et al.

(10) Patent No.: US 11,257,171 B2
(45) Date of Patent: Feb. 22, 2022

(54) DATA PROCESSING SYSTEM FOR MANAGING ACTIVITIES LINKED TO MULTIMEDIA CONTENT

(71) Applicant: Understory, LLC, Alpharetta, GA (US)

(72) Inventors: Steve Benfield, Sandy Springs, GA (US); Ahmad Aslami, Alpharetta, GA (US); Taylor Jones, Chattanooga, TN (US); Jonathan Cutrell, Chattanooga, TN (US); Taylor Dolan, San Francisco, CA (US); Andrew Kimball, Suwanee, GA (US); Chad Mills, Nashville, TN (US)

(73) Assignee: Understory, LLC, Alpharetta, GA (US)

( * ) Notice: Subject to any disclaimer, the term of this patent is extended or adjusted under 35 U.S.C. 154(b) by 44 days.

(21) Appl. No.: 16/557,601

(22) Filed: Aug. 30, 2019

(65) Prior Publication Data

US 2020/0027172 A1 Jan. 23, 2020

Related U.S. Application Data

(63) Continuation-in-part of application No. 15/988,878, filed on May 24, 2018, now Pat. No. 10,402,918.
(Continued)

(51) Int. Cl.
*G06F 16/00* (2019.01)
*G06Q 50/00* (2012.01)
(Continued)

(52) U.S. Cl.
CPC ............ *G06Q 50/01* (2013.01); *G06F 16/41* (2019.01); *G06F 16/43* (2019.01); *G06F 16/44* (2019.01);
(Continued)

(58) Field of Classification Search
CPC ....................................................... G06F 16/48
See application file for complete search history.

(56) References Cited

U.S. PATENT DOCUMENTS 6,557,042 B1 4/2003 He et al.
7,092,821 B2 8/2006 Ronen et al.
(Continued)

FOREIGN PATENT DOCUMENTS

WO 2017085717 5/2017

OTHER PUBLICATIONS

Notice of Allowance, dated Feb. 7, 2020, from corresponding U.S. Appl. No. 16/706,568.
(Continued)

*Primary Examiner* — Ajith Jacob
(74) *Attorney, Agent, or Firm* — Brient IP Law, LLC

(57) ABSTRACT

An activity management system is configured to allow users to access multimedia content where the multimedia content is divided into segments. While a user is viewing or interacting with the multimedia content, the user can submit one or more activities (e.g., comments, questions, replies, or reactions) using an interface. The system is operable to electronically link the activity provided by the user with the particular segment of multimedia content in which the activity was captured by the system. The system is also configured to throttle the number of activities that are displayed to a user for any given segment based on (1) viewers linked to the user (e.g., groups, social media groups, etc.), (2) viewers that influence the user, (3) viewers selected by the user, (4) viewers that cause the user to be engaged with the multimedia content, and (5) a threshold number of activities set by the viewer or the system.

14 Claims, 50 Drawing Sheets

Related U.S. Application Data which is a continuation of application No. 15/785,002, filed on Oct. 16, 2017, now Pat. No. 9,984,426, which is a continuation of application No. 15/619,481, filed on Jun. 10, 2017, now Pat. No. 9,852,480.

(60) Provisional application No. 62/448,674, filed on Jan. 20, 2017, provisional application No. 62/348,555, filed on Jun. 10, 2016.

(51) Int. Cl.

| | | |
|---|---|---|
| *G06F 16/41* | (2019.01) | |
| *G06F 16/43* | (2019.01) | |
| *G06F 16/48* | (2019.01) | |
| *G06F 16/783* | (2019.01) | |
| *G06Q 30/02* | (2012.01) | |
| *G06F 16/44* | (2019.01) | |
| *G06F 40/00* | (2020.01) | |

(52) U.S. Cl.
CPC ............ *G06F 16/48* (2019.01); *G06F 16/783* (2019.01); *G06F 40/00* (2020.01); *G06Q 30/0201* (2013.01); *H05K 999/00* (2013.01); *H05K 999/99* (2013.01)

(56) References Cited

U.S. PATENT DOCUMENTS

| | | | |
|---|---|---|---|
| 7,823,058 | B2 | 10/2010 | Pea et al. |
| 8,180,770 | B2 | 5/2012 | Ranasinghe et al. |
| 8,375,024 | B2 | 2/2013 | Andreas |
| 8,516,533 | B2 | 8/2013 | Davis et al. |
| 8,526,782 | B2 | 9/2013 | Kaiser et al. |
| 8,631,436 | B2 | 1/2014 | Arrasvuori et al. |
| 8,727,885 | B2 | 5/2014 | Berger et al. |
| 8,838,748 | B2 | 9/2014 | Raj et al. |
| 8,870,661 | B2 | 10/2014 | Perry et al. |
| 9,129,008 | B1 | 9/2015 | Stacey |
| 9,305,303 | B2 | 4/2016 | Farlie |
| 9,323,810 | B2 | 4/2016 | Wang et al. |
| 9,336,268 | B1 | 5/2016 | Moudy et al. |
| 9,495,713 | B2 | 11/2016 | McClements, IV |
| 9,535,988 | B2 | 1/2017 | Horowitz et al. |
| 9,552,596 | B2 | 1/2017 | Waldman et al. |
| 9,660,950 | B2 | 5/2017 | Archibong et al. |
| 9,680,895 | B1 | 6/2017 | Wang et al. |
| 9,703,463 | B2 | 7/2017 | Narbeh et al. |
| 9,811,514 | B1 | 11/2017 | Lewis et al. |
| 9,852,480 | B1 | 12/2017 | Kimball et al. |
| 9,881,345 | B2 | 1/2018 | Brunn et al. |
| 9,967,618 | B2 | 5/2018 | Blong et al. |
| 9,996,224 | B2 | 6/2018 | Fisher et al. |
| 10,067,987 | B1 | 9/2018 | Khanna et al. |
| 10,102,593 | B2 | 10/2018 | Benfield et al. |
| 2009/0150919 | A1 | 6/2009 | Lee et al. |
| 2011/0107369 | A1 | 5/2011 | O'Brien et al. |
| 2012/0151320 | A1 | 6/2012 | McClements IV |
| 2014/0089815 | A1 | 3/2014 | Gildfind et al. |
| 2014/0129570 | A1 | 5/2014 | Johnson |
| 2014/0310746 | A1* | 10/2014 | Larsen ................. H04N 21/242 725/37 |
| 2014/0325557 | A1 | 10/2014 | Evans et al. |
| 2014/0328570 | A1 | 11/2014 | Hui et al. |
| 2014/0337126 | A1 | 11/2014 | Nerses et al. |
| 2015/0074698 | A1 | 3/2015 | Errol et al. |
| 2015/0177964 | A1 | 6/2015 | Spirer |
| 2016/0048556 | A1 | 2/2016 | Kelly et al. |
| 2016/0253710 | A1 | 9/2016 | Publicover et al. |
| 2017/0185720 | A1 | 6/2017 | Downs et al. |
| 2017/0220570 | A1 | 8/2017 | Tilaye et al. |
| 2020/0065322 | A1* | 2/2020 | Zhao ................. H04N 21/8547 |

OTHER PUBLICATIONS

International Search Report, dated Mar. 20, 2020, from corresponding International Application No. PCT/US2019/065083.

Written Opinion of the International Searching Authority, dated Mar. 20, 2020, from corresponding International Application No. PCT/US2019/065083.

Barbier, Eva, "Engaging Millennials Part 4: Engage in a Two Way Conversation", http://blog.viralgains.com/2016/08/engaging-millennials-part-4-engage-conversation/, Viral Gains, Aug. 29, 2016.

Huron, Samuel et al., "PolemicTweet: Video Annotation and Analysis through Tagged Tweets", https://petra.isenberg.cc/publications/papers/Huron_2013_PVA.pdf, INRIA-Team Aviz, Apr. 24, 2013.

International Search Report, dated Apr. 19, 2019, from corresponding International Application No. PCT/US2019/024661.

International Search Report, dated Aug. 28, 2017, from corresponding International Application No. PCT/US2017/036916.

Maca, Victor Manuel Mondragon et al., "Measurement of viewer sentiment to improve the quality of television and interactive content using adaptive content", https://www.researchgate.net/profile/Vijay_Semwal2/publication/311255620_Measurement_of_viewer_sentiment_to_improve_the_quality_of_television_and_interactive_content_using_adaptive_content/links/585beb7608aebf17d3867fa8/Measurement-of-viewer-sentiment-to-improve-the-quality-of-television-and-interactive-content-using-adaptive-content.pdf, Research Gate, Mar. 2016.

Notice of Allowance, dated Apr. 24, 2019, from corresponding U.S. Appl. No. 15/988,878.

Notice of Allowance, dated Aug. 11, 2017, from corresponding U.S. Appl. No. 15/619,481.

Notice of Allowance, dated Aug. 14, 2018, from corresponding U.S. Appl. No. 15/988,859.

Notice of Allowance, dated Aug. 15, 2018, from corresponding U.S. Appl. No. 15/988,882.

Notice of Allowance, dated Aug. 3, 2018, from corresponding U.S. Appl. No. 15/988,868.

Notice of Allowance, dated Feb. 2, 2018, from corresponding U.S. Appl. No. 15/785,002.

Notice of Allowance, dated Jun. 5, 2018, from corresponding U.S. Appl. No. 15/940,601.

Office Action, dated Aug. 11, 2017, from corresponding U.S. Appl. No. 15/619,477.

Office Action, dated Aug. 16, 2018, from corresponding U.S. Appl. No. 15/988,871.

Office Action, dated Sep. 14, 2018, from corresponding U.S. Appl. No. 15/988,878.

Tao, Xiaoming et al., "Real-Time Personalized Content Catering via Viewer Sentiment Feedback: A QoE Perspective", https://www.researchgate.net/profile/Linhao_Dong/publication/285458109_Real-Time_Personalized_Content_Catering_via_Viewer_Sentiment_Feedback_A_QoE_Perspective/links/565e6c8108ae4988a7bd5dd3/Real-Time-Personalized-Content-Catering-via-Viewer-Sentiment-Feedback-A-QoE-Perspective.pdf, Research Gate, Nov. 2015.

Written Opinion of the International Searching Authority, dated Apr. 19, 2019, from corresponding International Application No. PCT/US2019/024661.

Written Opinion of the International Searching Authority, dated Aug. 28, 2017, from corresponding International Application No. PCT/US2017/036916.

Office Action, dated Aug. 20, 2021, from corresponding U.S. Appl. No. 16/908,400.

\* cited by examiner

FIG. 10

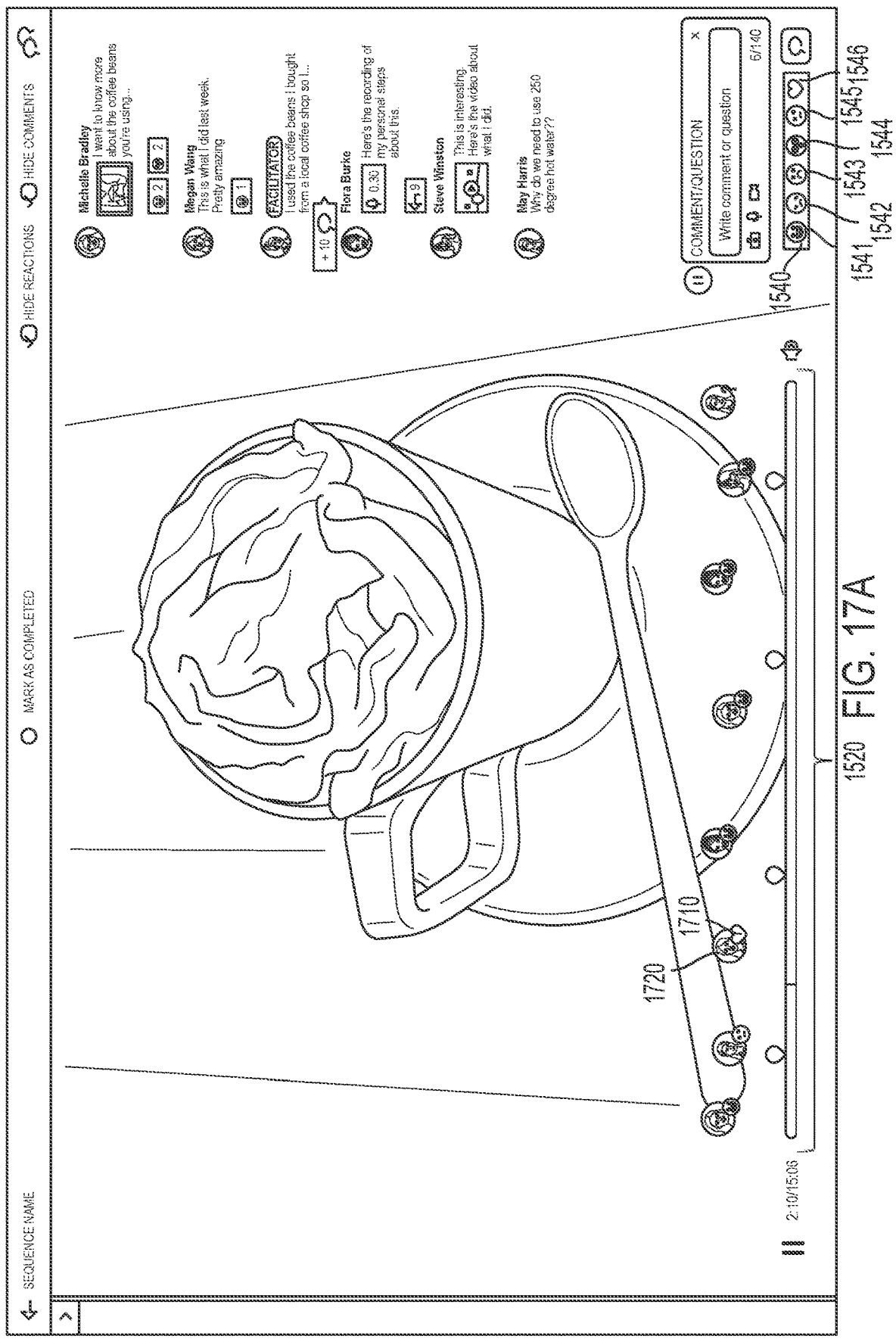

FIG. 21B

Understory

2400

Facilitating Sequences

Coffee Brewing: Stumptown  3 CONVERSATION ⊕

| CONVERSATION | TYPE | USERS | LAST ACTIVITY | NEW INTERACTIONS | | OPEN QUESTIONS | NEW QUIZZES |
|---|---|---|---|---|---|---|---|
| Monday Group | PRIVATE | 91 ( ◉ 9 ◉ 4 ) | 4/13/17 | ⊖ 120 | ✻ 11 | 27 | 10 |
| Tuesday Group | PUBLIC | 74 ( ◉ 9 ◉ 4 ) | 4/13/17 | ⊖ 198 | ✻ 11 | 33 | 33 |
| Wednesday Group | PRIVATE | 120 ( ◉ 9 ◉ 4 ) | 4/13/17 | ⊖ 214 | ✻ 21 | 12 | 72 |

Eating healthy and smart  4 CONVERSATION ⊕

| CONVERSATION | TYPE | USERS | LAST ACTIVITY | NEW INTERACTIONS | | OPEN QUESTIONS | NEW QUIZZES |
|---|---|---|---|---|---|---|---|
| Atlanta Hawks | PRIVATE | 230 ( ◉ 23 ◉ 11 ) | 4/20/17 | ⊖ 302 | ✻ 132 | 31 | 29 |
| Atlanta United FC | PUBLIC | 121 ( ◉ 9 ◉ 4 ) | 4/28/17 | ⊖ 112 | ✻ 96 | 27 | 71 |
| Atlanta Falcons | PUBLIC | 369 ( ◉ 31 ◉ 21 ) | 4/29/17 | ⊖ 398 | ✻ 222 | 52 | 57 |
| Atlanta Braves | PRIVATE | 291 ( ◉ 41 ◉ 6 ) | 4/21/17 | ⊖ 88 | ✻ 31 | 21 | 45 |

Stephanie Czajkowski

PLAY
CREATE
GROUPS
REPORTING
ADMINS
FACILITATOR

QUESTION 1
What is the problem you are trying to solve, in 7 words or less?

*What do you think about Scott's response of "Entrepreneurs' imaginations are too thin.?"*

VIEW GROUP DISCUSSION

3605 close

 Scott Kingsley
Entrepreneurs' imaginations are too thin.
Reply

 Caroline Jones
Consistency in volunteer acquisition and retention.
Reply

 Hannah Williams
Decrease supply errors and waste in product development.
Reply

 Bob Smith
Building the best management team as sales grow.
Reply

 Patty Wyngaard
Write your response here

FIG. 34A

DATA PROCESSING SYSTEM FOR MANAGING ACTIVITIES LINKED TO MULTIMEDIA CONTENT

CROSS-REFERENCE TO RELATED APPLICATIONS

This application is a continuation-in-part of U.S. patent application Ser. No. 15/988,878, filed May 24, 2018, which is a continuation of U.S. patent application Ser. No. 15/785,002, filed Oct. 16, 2017, now U.S. Pat. No. 9,984,426, issued May 29, 2018, which is a continuation of U.S. patent application Ser. No. 15/619,481, filed Jun. 10, 2017, now U.S. Pat. No. 9,852,480, issued Dec. 26, 2017, which claims priority to U.S. Provisional Patent Application Ser. No. 62/448,674, filed Jan. 20, 2017; and U.S. Provisional Patent Application Ser. No. 62/348,555, filed Jun. 10, 2016, the disclosures of which are hereby incorporated by reference in their entirety.

BACKGROUND

Creators of content and consumers of the content (e.g., lessons, video, presentations, news articles, questionnaires, etc.) may desire better ways to collaborate with other content creators and consumers. Content creators may further desire to receive more detailed feedback from consumers of their content in order to improve the content. Accordingly, there is a need for improved systems and methods that address these and other desires.

SUMMARY

In any embodiment described herein, a computer-implemented data processing method for electronically managing a conversation that is linked to one or more segments of multimedia content that is divided into a plurality of segments, and for filtering the displayed conversation based on various criteria, comprises the steps of (1) determining, by one or more processors, one or more throttling criteria associated with a first viewer, (2) at least partially in response to determining one or more throttling criteria for the first viewer, identifying, by one or more processors, one or more of the electronic data records that are associated with segments of the multimedia content based at least in part on the one or more filtering criteria, and (3) displaying, by one or more processors, on a display interface the identified one or more of the plurality of activities as a segment of the multimedia content associated with the identified one or more of the plurality of activities is displayed to the first viewer. In various embodiments, the identified one or more of the plurality of activities are activities associated with one or more viewers preselected by the first viewer. In other embodiments, the identified one or more of the plurality of activities are activities associated with one or more viewers that belong to a group to which the first viewer belongs. In still other embodiments, the identified one or more of the plurality of activities are activities associated with one or more viewers that have previously influenced the first viewer. In some embodiments, a viewer previously influences the first viewer when the first viewer previously submitted an activity in response to another viewer's activity. In still other embodiments, the identified one or more of the plurality of activities are activities that contain subject matter that are similar to the subject matter of the first viewers activities that have been previously submitted by the first viewer. In some embodiments, the method further comprises the step of allowing the first viewer to switch to a display view where the first viewer can view all of the activities associated with a particular segment of the multimedia content. In yet other embodiments, filtering the plurality of electronic data records based at least in part on the one or more activity display criteria further comprises limiting the number of activities that are displayed for a particular segment of the multimedia content to a predefined threshold value.

A computer-implemented data processing method for electronically mapping one or more user or activities to a respective segment of a piece of media content and electronically displaying the one or more activities in association with the respective segment of the piece of media content, according to various embodiments, comprises: (1) providing a user interface for submitting the one or more user activities regarding the piece of media content, the one or more user activities comprising a first activity and a second activity; (2) identifying a plurality of segments that make up the piece of media content; (3) electronically receiving, via the user interface, the first activity at a first time; (4) processing the first activity; (5) displaying, at a second time subsequent to the first time the first activity in association with the first segment of the piece of media content; (6) electronically receiving, via the user interface, the second activity at a third time, wherein the third time is subsequent to the first time; (7) processing the second activity; (8) displaying, at a fourth time subsequent to the second time and the third time, the first activity in association with the first segment of the piece of media content and the second activity in association with the second segment of the piece of media content.

In some embodiments, processing the first activity comprises: (1) digitally storing the first activity in memory; (2) mapping the first activity to a first segment of the plurality of segments based at least in part on the first activity; and (3) electronically associating the first activity, the first segment, and the piece of media content in memory. In various other embodiments, processing the second activity comprises: (1) digitally storing the second activity in memory; (2) mapping the second activity to a second segment of the plurality of segments based at least in part on the first activity; and (4) electronically associating the second activity, the second segment, and the piece of media content in memory.

In particular embodiments, the plurality of segments comprise one or more time segments and/or one or more location segments. In some embodiments, the second activity comprises a response and/or a reply to the first activity.

A computer-implemented method of providing one or more activities to subsequent viewers of a piece of multimedia in a time-shifted manner according to an activity map, according to various embodiments comprises: (1) identifying, by one or more activity management servers, a plurality of segments that make up a piece of multimedia; (2) receiving, by the one or more activity management servers, a plurality of activities from one or more users prior to a first time, each particular activity of the plurality of activities being associated with a respective particular segment of the plurality of segments; (3) generating, by the one or more activity management servers, an activity map for the piece of multimedia based at least in part on the plurality of segments. In particular embodiments, the activity map is configured to indicate: (1) the association between each particular activity of the plurality of activities and the respective particular segment of the plurality of segments; and (2) one or more associations between one or more particular activities of the plurality of activities and one or more other activities of the plurality of activities.

In some embodiments, the method further comprises: (1) receiving, by the one or more activity management servers, one or more additional activities at one or more times subsequent to the first time, each particular one of the one or more additional activities being associated with a respective particular segment of the plurality of segments; (2) as the system receives each particular one of the one or more additional activities, substantially continuously updating, by the one or more activity management servers, the activity map to indicate: (A) the association between each particular one of the one or more additional activities and the respective particular segment; and (B) one or more associations between the one or more additional activities and the plurality of activities.

In various embodiments, the method further comprises providing, by the one or more activity management servers: (1) first data indicating each particular segment of the plurality of segments that is associated with at least one activity of the plurality of activities or the one or more additional activities; and (2) second data indicating the one or more associations between the one or more particular activities of the plurality of activities and the one or more other activities of the plurality of activities and the one or more associations between the one or more additional activities and the plurality of activities In further embodiments, the method further comprises: (1) receiving, at the first time, by the one or more activity management servers, from a client device, a first request to display one or more activities associated with the piece of multimedia; (2) in response to the first request, providing, by the one or more activity management servers, the plurality of activities for display on the client device along with the piece of multimedia according to the activity map; (3) receiving, at a second time subsequent to the first time, by the one or more activity management servers, from a client device, a second request to display the one or more activities associated with the piece of multimedia; and (4) in response to the second request, providing, by the one or more activity management servers, the plurality of activities and the one or more additional activities received prior to the second time for display on the client device along with the piece of multimedia according to the activity map.

A computer-implemented method of facilitating asynchronous conversation between one or more consumers of a plurality of pieces of multimedia, in various embodiments, comprises storing a plurality of activities, each of the plurality of activities being associated, in memory, with a segment identifier identifying a particular segment of a particular one of the plurality of pieces of multimedia; (2) receiving a first activity associated with a first piece of multimedia of the plurality of pieces of multimedia; and (3) performing one or more actions in response to receiving the first activity. In various embodiments, the one or more actions comprise: (1) digitally storing the first activity in memory; (2) mapping the first activity to a first segment of the first piece of multimedia; and (3) electronically associating the first activity, the first segment, and the first piece of multimedia in memory. In some embodiments, the plurality of pieces of multimedia comprise a plurality of pieces of multimedia that are at least partially related to one another. For example, the plurality of pieces of media may comprise a plurality of different types of multimedia that form a single piece of multimedia. In other embodiments, the plurality of pieces of multimedia may make up a particular lesson or course (e.g., online course, class, etc.).

A computer-implemented method of facilitating asynchronous conversation between one or more consumers of multimedia, according to various embodiments, comprises storing a plurality of activities, each of the plurality of activities being associated, in memory, with a segment identifier identifying a particular segment of the multimedia. In some embodiments, the plurality of activities comprise a first activity associated with a first segment of the multimedia. In such embodiments, the method may further comprise: (1) receiving a second activity, the second activity being associated with the first segment and comprising a reply to the first activity; (2) generating one or more alerts; (3) transmitting the one or more alerts to one or more individuals; and (4) enabling the one or more individuals to view the second activity without having to view the multimedia. In various embodiments, the one or more individuals may include, for example: (1) a facilitator of the multimedia; (2) a creator of the multimedia (e.g., a content creator); (3) a user that submitted the first activity; (4) one or more individuals that had previously consumed (e.g., viewed, watched, read, etc.) the multimedia). In various embodiments, the method further comprises enabling the one or more individuals to respond to the second activity without viewing the multimedia.

A computer-implemented data processing method of facilitating a plurality of asynchronous conversations between/among one or more consumers of multimedia and displaying a graphical representation of the plurality of conversations, in various embodiments, comprises: (1) storing a plurality of activities, each of the plurality of activities being associated, in memory, with a particular segment identifier identifying a particular segment of a plurality of segments that make up the multimedia; (2) generating a graphical display of activity associated with the multimedia, wherein generating the graphical display comprises determining the activity based at least in part one: (A) an activity density for each of the plurality of segments; (B) a type of activity that makes up the activity density for each of the plurality of segments; and/or (C) any other suitable factor.

In various embodiments, the computer-implemented data processing method of facilitating a plurality of asynchronous conversations between/among one or more consumers of multimedia and displaying a graphical representation of the plurality of conversations, further comprises: (1) a request to view one or more activities associated with a particular segment; and (2) in response to the request, displaying the one or more activities associated with the particular segment. In other embodiments, the method comprises: (1) receiving a request to filter the graphical display based at least in part on an activity term; (2) in response to the response to the request, identifying one or more of the plurality of activities that comprise the term; and (3) displaying, adjacent the graphical display, each of the identified activities that comprise the term in association with an associated particular segment. In still other embodiments, the method comprises: (1) receiving selection of a particular user; (2) in response to the response to the request, identifying one or more of the plurality of activities made by the particular user; (3) modifying the graphical display to reflect only those one or more of the plurality of activities made by the particular user; and (4) displaying, adjacent the modified graphical display, each of the one or more of the plurality of activities made by the particular user.

In various embodiments, a computer-implemented data processing method for electronically linking one or more activities to a respective segment of multimedia content so that at least two users can create an asynchronous conversation that is linked to the segments of the multimedia content. The method comprises the steps of (1) providing, by an activity management system, a first graphical user interface comprising a first segment display, wherein each segment on the first segment display is associated with a respective segment of multimedia content being viewed by a first viewer, (2) receiving at a first time, via the first graphical user interface, a first activity from the first viewer of the multimedia content, (3) electronically linking, by the activity management system, the received first activity to a first segment of the multimedia content, (4) creating a first electronic record that comprises one or more of the first activity, a multimedia identifier for the multimedia content, a first viewer identifier, and a first segment identifier for the first segment, and digitally storing the first electronic record, and (5) presenting, on the first graphical user interface, a first representation of the first activity on the first segment display in association with a point on the first segment display corresponding to the first segment of the multimedia content.

In various embodiments, the step of electronically linking, by the activity management system, the received first activity to a first segment of the multimedia content further comprises one of (1) linking the first activity with a particular segment being viewed by the first viewer when the first viewer begins to enter the first activity, (2) linking the first activity with (a) a first particular segment being viewed by the first viewer when the first viewer begins to enter the first activity, (b) a second particular segment being viewed by the first viewer when the first viewer submits the first activity, or (c) all segments positioned intermediate the first particular segment and the second particular segment, and (3) linking the first activity with a first particular segment that is determined by (a) counting the number of segments from a segment being viewed when the first viewer begins to enter the first activity to a segment being viewed when the first viewer submits the first activity, (b) determining a predefined percentage of the counted number of segments, and (c) calculating the first particular segment by subtracting the predefined percentage of the of the counted number of segments from the segment being viewed when the first viewer began to enter the first activity, or (4) linking the first activity with a first particular segment that is manually selected by the first user.

In preferred embodiments, the first segment display comprises (1) a first plurality of segments, wherein each one of the first plurality of segments represent a unit of time of video or audio file contained as part of the multimedia content, and (2) a second plurality of segments, wherein each one of the second plurality of segments represent a position in a document. In some embodiments, the document is selected from a group consisting of a word processing file, a spreadsheet file, an image file, a portable document format (PDF) file, or a website page.

In various embodiments, the method further comprises the steps of presenting, at a second time that occurs before the first time, on the first graphical user interface a representation of one or more activities received from other users, wherein each of the one or more activities is linked to a respective segment of the multimedia content, and each of the one or more activities is also associated with the first viewer. In some embodiments, the first activity is an activity selected from a group consisting of (1) a reply to a particular one of the one or more activities, (2) a question entered via the first user interface in free form text, and (3) a reaction entered via the first user interface, wherein a reaction further comprises an emoticon selected from one or more emoticons displayed on the first user interface. In particular embodiments, when the first activity is a reply to a particular one of the one or more activities, the first electronic record further comprises an identifier for the particular one of the one or more activities, and the first segment identifier is the same as a segment identifier for the respective segment linked to the particular one of the one or more activities. In other embodiments, at least one of the one or more activities is selected from a group consisting of (1) a pre-seeded question, comment or reply that is presented to elicit a response from the first viewer, (2) pre-seeded surveys, and (3) a discussion point pre-seeded by the multimedia content owner.

In various embodiments, the method further comprises the steps of (1) generating, by the activity management system, a plurality of segment displays, each one of the plurality of segment displays being presented on a respective one of a plurality of graphical user interfaces, wherein each segment on each of the plurality of segment displays is associated with a corresponding segment of the multimedia content being viewed by a plurality of viewers, (2) presenting on each one of the plurality of graphical user interfaces the first representation of the first activity at a point on each one of the plurality of segment displays that corresponds to the segment of the multimedia content that is associated with the first activity, (3) receiving at a plurality of times that are each after the first time, via each respective one of the plurality of graphical user interfaces, one or more activities from each one of the plurality of viewers of the multimedia content, (4) electronically linking, by the activity management system, each received one or more activities to a respective segment of the multimedia content, (5) creating a corresponding electronic record for each received one or more activities from the plurality of viewers, each corresponding electronic record comprising a respective activity from the one or more activities, the multimedia identifier for the multimedia content, an identifier of the viewer from the plurality of viewers, and a segment identifier for the respective segment linked to the respective activity, and digitally storing each corresponding electronic record, and (6) presenting, on each one of the plurality of graphical user interfaces, a representation of each one of the one or more activities at a point on the plurality of segment displays that corresponds to the respective segment of the multimedia content that is linked with each respective activity. In some embodiments, at least one of the one or more activities from the plurality of viewers is a reply to the first activity. In other embodiments, the electronic record for the at least one of the one or more activities further comprises an identifier for the first activity, and the segment identifier for the at least one of the one or more activities is the same as the first segment identifier for the first activity.

In various embodiments, the method further comprises the steps of (1) receiving at one or more times that are each after the first time, via the first graphical user interface, one or more activities from the first viewer, (2) electronically linking, by the activity management system, each received one or more activities to a respective segment of the multimedia content, (3) creating a plurality of electronic records for each received one or more activities, each one of the plurality of electronic records comprising one or more of the respective activity of the one or more activities, the multimedia identifier for the multimedia content, an identifier of the viewer, and segment information associated with the respective activity, and digitally storing each one of the plurality of electronic records, and (4) presenting, on the first graphical user interface, a representation of each one of the one or more activities at a point on the segment display that corresponds to the respective segment of the multimedia content that is associated with each respective activity of the one or more activities. In some embodiments, each one of the one or more activities is selected from a group consisting of (a) a predefined text activity that the first viewer can select via the first graphical user interface, (b) a custom text entry that is entered by the first viewer via the first graphical user interface, and (c) a plurality of reactions that the first viewer can select from via the first graphical user interface. In these embodiments, the computer-implemented data processing method further comprises the steps of (1) generating a sentiment value for each one of the one or more activities, wherein each predefined text activity is assigned a corresponding predefined sentiment value, each type of reaction from the plurality of reactions has a corresponding predefined sentiment value and each custom text entry is passed through a sentiment filter that determines a sentiment value based on the contents of the custom text, and (2) transforming the sentiment value for each of the one or more activities into a sentiment score for the first viewer.

In various embodiments, the method further comprises the steps of (1) receiving at a plurality of times that are after the first time, via the first graphical user interface, one or more additional activities from the first viewer of the multimedia content, (2) electronically linking, by the activity management system, each of the received one or more additional activities to a respective one or more segments of the multimedia content that is associated with each of the received one or more activities, (3) and creating a corresponding electronic record for each of the one or more activities, wherein each corresponding electronic record comprises a respective additional activity, the multimedia identifier for the multimedia content, an identifier of the first viewer, and a segment identifier for the respective one or more segments of the multimedia content that is linked with the respective activity, and digitally storing each corresponding electronic record. In some embodiments, the method further comprises one or more steps selected from a group consisting of (a) determining a length of time that the first viewer spends viewing each segment of the multimedia content, (b) determining a total number of activities submitted by the first viewer for the multimedia content, (c) determining a total number of activities submitted by the first viewer for all multimedia content viewed by the first viewer, (d) determining a total number of activities submitted by the first viewer for each type of content that is contained in the multimedia content, wherein the type of content comprises one or more of audio content, video content, and documents, (e) determining a total number of activities submitted by the first viewer that elicited a conversation with one or more other viewers, (f) determining a total number of activities submitted by the first viewer that were in reply to an activity submitted by another viewer, (g) determining a total number of activities submitted by the first viewer that were questions, (h) determining a total number of activities submitted by the first viewer that were questions that elicited a response from other viewers, (i) determining a total number of reactions and/or type of reactions that were elicited from other viewers in response to activities submitted by the first viewer, (j) determining a total number of reactions and/or type of reactions that were submitted by the first viewer, (k) determining a total number of reactions and/or types of reactions that were submitted by other users, (l) determining a day and/or a time of day for each activity submitted by the first viewer, (m) determining a total number of words in each activity submitted by the first viewer, (n) assigning a sentiment value to each one of the activities, wherein (i) each predefined text activity is assigned a corresponding predefined sentiment value, (ii) each type of reaction from the plurality of reactions has a corresponding predefined sentiment value, and (iii) each custom text entry is passed through a sentiment filter that determines a sentiment value based on the contents of the custom text, and (o) determining a total number of activities submitted for each segment of content for the multimedia content. In various embodiments, the system can calculate an engagement score for the first viewer from one or more of the above data points. In various embodiments, the system can also calculate an influence score for the first viewer based on one or more of the above data points, in addition to other activities.

In various embodiments, the system may be configured to determine the learning characteristics of the first viewer based on one or more of (1) the length of time that the first viewer spends viewing each segment of multimedia content, (2) the day and/or the time of day for each activity submitted by the first viewer, (3) the number of activities submitted by the first viewer for each type of content that was viewed by the first viewer, (4) the number of activities submitted by the first viewer for each segment of multimedia content viewed by the first viewer, (5) the total number of activities submitted by the first viewer that were in reply to an activity submitted by another viewer, and (6) the total number of activities submitted by the first viewer that were questions. The learning characteristics for the first viewer may comprise (1) the type of content that best suits the learning style of the first viewer, wherein the types of content are selected from a group consisting of audio content, video content, documents, image content, and logical problem content, (2) the day and/or time of day that the first viewer is most engaged, and (3) whether the first viewer is easily influenced by others.

In preferred embodiments of a computer-implemented data processing method for electronically managing a conversation that is linked to one or more segments of multimedia content that is divided into a plurality of segments, and for electronically analyzing the activities that make up the conversation, the method comprises (1) selecting one or more electronic data records from a plurality of electronic data records that are linked to one or more segments of a particular multimedia content, wherein each one of the selected one or more electronic data records comprises activity information that is part of a conversation related to one or more segments of a particular multimedia content, an identifier of the particular multimedia content and one or more data fields selected from a group consisting of (i) an identifier of the viewer that submitted the activity, (ii) segment information for a segment of the particular multimedia content associated with the activity, (iii) an identifier of a type of activity, (iv) an identifier for a related activity, (v) a time stamp for when the activity was initiated, (vi) a time stamp for when the activity was submitted, (vii) a length of the activity, (viii) a reaction type, (ix) a reply count, (x) an activity count, (xi) a question flag, (xii) an answer flag, and (xiv) an activity type, (2) generating a sentiment value for each one of the one or more electronic data records selected from the plurality of electronic data records, and (3) transforming the sentiment values for the one or more electronic data records into at least one sentiment score. In some embodiments, generating a sentiment value for each one of the one or more electronic data records further comprises (a) evaluating the activity information for each particular one of the one or more electronic data records to determine the type of activity contained therein, wherein the type of activity is selected from a group consisting of (i) a predefined text activity that the first viewer can select via the first graphical user interface, (ii) a plurality of reactions that a viewer can select from via a graphical user interface when viewing the particular multimedia content, and (iii) a custom text entry that is entered by the viewer via the graphical user interface in response to the content of the particular multimedia content or to an activity made by another viewer, and (b) calculating a sentiment value for each activity type, wherein (i) each predefined text activity is assigned a corresponding predefined sentiment value, (ii) each type of reaction from the plurality of reactions has a corresponding predefined sentiment value, and (iii) each custom text entry is passed through a sentiment filter that determines a sentiment value based on the contents of the custom text. In some embodiments, the step of selecting one or more electronic data records from a plurality of electronic data records that are linked to one or more segments of a particular multimedia content further comprises selecting the one or more electronic data records for a particular viewer. Additionally, the step of transforming the sentiment values for the one or more electronic data records into at least one sentiment score further comprises generating a sentiment score for each segment of the particular multimedia content based on each of the one or more electronic data records linked to the respective each segment of the particular multimedia content.

In particular embodiments, the method further comprises one or more steps selected from a group consisting of (a) determining, from the selected one or more electronic data records for the particular viewer, a length of time that the particular viewer spends viewing each of the one or more segments of the particular multimedia content, (b) determining, from the selected one or more electronic data records for the particular viewer, a total number of activities submitted by the particular viewer for the particular multimedia content, (c) determining, from the selected one or more electronic data records for the particular viewer, a total number of activities submitted by the particular viewer for each type of content that is contained in the particular multimedia content, wherein the type of content comprises one or more of audio content, video content, and documents, (d) determining, from the selected one or more electronic data records for the particular viewer, a total number of activities submitted by the particular viewer that elicited a conversation with one or more other viewers, (e) determining, from the selected one or more electronic data records for the particular viewer, a total number of activities submitted by the particular viewer that were in reply to an activity submitted by another viewer, (f) determining, from the selected one or more electronic data records for the particular viewer, a total number of activities submitted by the particular viewer that were questions, (g) determining, from the selected one or more electronic data records for the particular viewer, a total number of activities submitted by the particular viewer that were questions that elicited a response from other viewers, (h) determining, from the selected one or more electronic data records for the particular viewer, a total number of reactions and/or type of reactions that were elicited from other viewers in response to activities submitted by the particular viewer, (i) determining, from the selected one or more electronic data records for the particular viewer, a total number of reactions and/or type of reactions that were submitted by the particular viewer, (j) determining, from the selected one or more electronic data records for the particular viewer, a day and/or a time of day for each activity submitted by the particular viewer, and (k) determining, from the selected one or more electronic data records for the particular viewer, a total number of words in each activity submitted by the particular viewer. In some of these embodiments, the system can calculate an engagement score for the particular viewer with respect to the particular multimedia content based on one or more of the above data points. In some of these embodiments, the system can calculate an influence score for the particular viewer based on one or more of the above data points.

In various embodiments, the method further comprises the steps of (1) filtering the selected one or more electronic data records by a segment identifier for one segment of the particular multimedia content, (2) generating a sentiment value for each electronic data record of the filtered, selected one or more electronic data records, and (3) transforming the generated sentiment values for each electronic data record of the filtered, selected one or more electronic data records into a sentiment score for the one segment of the particular multimedia content. In other embodiments the method further comprises (1) separating the selected one or more electronic data records into a first plurality of electronic data records that are associated with a first segment of the particular multimedia content, and a second plurality of electronic data records that are associated with a second segment of the particular multimedia content, (2) generating a sentiment value for each electronic data record in the first plurality of electronic data records and each electronic data record in the second plurality of electronic data records, (3) transforming the sentiments values for the first plurality of electronic data records into a first sentiment score, and the second plurality of electronic data records into a second sentiment score, and (4) displaying the first sentiment score and the second sentiment score on a graphical user interface. In some of these embodiments, the step of displaying the first sentiment score and the second sentiment score on a graphical user interface further comprises generating a histogram of the first and second sentiment scores versus the corresponding first and second segments.

Preferred embodiments of an electronic data processing system for electronically managing a conversation that is linked to one or more segments of multimedia content divided into a plurality of segments, and for electronically analyzing the activities that make up the conversation comprises (1) one or more processors, (2) one or more databases coupled to the one or more processors, and (3) a plurality of electronic data records stored in the one or more databases, each one of the plurality of electronic data records corresponding to an activity submitted by a viewer and comprising a content of the activity, an identifier for the multimedia content, an identifier for the viewer who submitted the activity, and one or more data fields selected from a group consisting of (i) a time stamp for when the activity was initiated, (ii) a time stamp for when the activity was submitted, (iii) a length of the activity, (iv) a reaction type, (v) a reply count, (vi) an activity count, (vii) a question flag, (viii) an answer flag, (ix) an activity type, and (x) an identifier for a related activity. In preferred embodiments, the one or more processors are configured for (a) evaluating the activity information for each of one or more of the plurality of electronic data records to determine the type of activity contained therein, wherein the type of activity is selected from a group consisting of (i) a predefined text activity that the first viewer can select via the first graphical user interface, (ii) a plurality of reactions that a viewer can select from via a graphical user interface when viewing the particular multimedia content, and (iii) a custom text entry that is entered by the viewer via the graphical user interface in response to the content of the particular multimedia content or to an activity made by another viewer, (b) calculating a sentiment value for each activity type, wherein (i) each predefined text activity is assigned a corresponding predefined sentiment value, (ii) each type of reaction from the plurality of reactions has a corresponding predefined sentiment value, and (iii) each custom text entry is passed through a sentiment filter to determine a sentiment value based on the contents of the custom text, and (c) transforming the generated sentiment values for the one or more of the plurality of electronic data records into one or more sentiment scores.

In some preferred embodiments, the one or more of the plurality of electronic data records belong to either a first plurality of electronic data records linked to a first segment of the multimedia content or to a second plurality of electronic data records linked to a second segment of the multimedia content. In some of these embodiments, (a) the step of transforming the generated sentiment values for the one or more of the plurality of electronic data records into one or more sentiment scores further comprises calculating (i) a first sentiment score for the first segment of the multimedia content, and (ii) a second sentiment score for the second segment of multimedia content, and (b) wherein the one or more processors are further configured to display a graph of the first sentiment score and the second sentiment score versus the first and second segment. In some embodiments, the first and second pluralities of electronic data records are linked to a particular viewer. In other embodiments, the first and second pluralities of electronic data records are for all viewers of the multimedia content. In still other embodiments, the first and second pluralities of electronic data records are linked a particular group of viewers.

In an embodiment of a computer-implemented method of facilitating asynchronous conversation between one or more consumers of a plurality of pieces of multimedia, the method comprises the steps of (1) storing a plurality of activities, each of the plurality of activities being associated, in memory, with a segment identifier identifying a particular segment of a particular one of the plurality of pieces of multimedia, (2) receiving a first activity associated with a first piece of multimedia of the plurality of pieces of multimedia, (3) in response to receiving the first activity (a) digitally storing the first activity in memory, (b) mapping the first activity to a first segment of the first piece of multimedia, and (c) electronically associating the first activity, the first segment, and the first piece of multimedia in memory, wherein the plurality of pieces of multimedia comprise a plurality of pieces of multimedia selected from the group consisting of (i) a plurality of different types of multimedia, and (ii) a plurality of different pieces of multimedia that make up a particular lesson or course.

In an embodiment of a computer-implemented method of facilitating asynchronous conversation between one or more consumers of multimedia, the method comprising (1) storing a plurality of activities, each of the plurality of activities being associated, in memory, with a segment identifier identifying a particular segment of the multimedia, wherein the plurality of activities comprise a first activity associated with a first segment of the multimedia that was received from a first user, (2) receiving a second activity from a user, the second activity being associated with the first segment and comprising a reply to the first activity, (3) generating one or more alerts, (4) transmitting the one or more alerts to one or more individuals selected from the group consisting of (i) a facilitator of the multimedia, (ii) a creator of the multimedia, and (iii) the first user, and (5) enabling the one or more individuals to view the second activity without having to view the multimedia. In some embodiments, the method further comprises enabling the one or more individuals to respond to the second activity.

In an embodiment of a computer-implemented data processing method of facilitating a plurality of asynchronous conversations between/among one or more consumers of multimedia and displaying a graphical representation of the plurality of conversations, the method comprises (1) storing a plurality of activities, each of the plurality of activities being associated, in memory, with a particular segment identifier identifying a particular segment of a plurality of segments that make up the multimedia, and (2) generating a graphical display of activity associated with the multimedia, wherein generating the graphical display comprises determining the activity based at least in part on one or more factors selected from the group consisting of (i) an activity density for each of the plurality of segments, and (ii) a type of activity that makes up the activity density for each of the plurality of segments. In some of these embodiments the method further comprises (a) receiving a request to view one or more activities associated with a particular segment, and (b) in response to the request, displaying the one or more activities associated with the particular segment. In other embodiments, the method further comprises (a) receiving a request to filter the graphical display based at least in part on an activity term; (b) in response to the response to the request, identifying one or more of the plurality of activities that comprise the term, and (c) displaying, adjacent the graphical display, each of the identified activities that comprise the term in association with an associated particular segment. In other embodiments, the method further comprises (a) receiving selection of a particular user, (b) in response to the response to the request, identifying one or more of the plurality of activities made by the particular user, (c) modifying the graphical display to reflect only those one or more of the plurality of activities made by the particular user, and (d) displaying, adjacent the modified graphical display, each of the one or more of the plurality of activities made by the particular user.

In an embodiments of a computer-implemented data processing method of facilitating a plurality of asynchronous conversations between/among one or more consumers of multimedia and displaying at least a portion of one or more activities that make up the conversations along with the multimedia, the method comprises (1) storing a plurality of activities, each of the plurality of activities being associated, in memory, with a particular segment identifier identifying a particular segment of a plurality of segments that make up the multimedia, (2) receiving one or more activity display criteria, (3) filtering the plurality of activities based at least in part on the criteria, and (4) displaying the filtered activities along with the multimedia based at least in part on an associated segment identifier of each particular filtered activity.

In an embodiments of a computer-implemented data processing method of facilitating a plurality of asynchronous conversations between/among one or more consumers of multimedia, fragmenting the multimedia based in part on sentiment data derived from the conversations; and displaying one or more resulting fragments of the multimedia, the method comprises (1) storing a plurality of activities, each of the plurality of activities being associated, in memory, with a particular segment identifier identifying a particular segment of a plurality of segments that make up the multimedia, (2) generating one or more ratings for at least one of (i) a user viewing the multimedia, and (ii) one or more of the plurality of segments, (3) identifying one or more sequences based at least in part on the one or more ratings, (4) receiving, from the user, a request to view the multimedia on a client device, (5) providing, data indicating the identified one or more sequences, (6) receiving a request for sequences of the multimedia from the client device, the requested sequences corresponding to a first subset of the multimedia indicated in the data, and a second subset of the multimedia that is not indicated in the data, (8) providing the requested sequences to the client device for playback on the client device.

In various embodiments, an electronic data processing system for electronically managing a conversation that is linked to one or more segments of multimedia content divided into a plurality of segments, and for syncing certain activities to one or more segments of the multimedia content comprises (1) one or more processors, (2) memory coupled to the one or more processors, and (3) a plurality of electronic data records stored in the memory, each one of the plurality of electronic data records corresponding to an activity submitted by a viewer of a particular multimedia content and comprising an identifier for the particular multimedia content, information associated with the activity, information regarding the segment of the multimedia content the activity is associated with, and one or more data fields selected from a group consisting of text contained in the activity, a time stamp for when the activity was initiated, a time stamp for when the activity was submitted, a length of the activity, a number of words contained in the activity, a reaction type, a reply count, an activity count, a question flag, an answer flag, an activity type, an identifier for the viewer who submitted the activity, and an identifier for a related activity that is linked to the activity. In various embodiments, the one or more processors are configured for (a\) receiving one or more activity display criteria, (b) filtering the plurality of electronic data records based at least in part on the one or more activity display criteria, and (3) displaying activities associated with the one or more of the filtered electronic data records along with the multimedia based at least in part on an associated segment identifier of each of the one or more particular filtered electronic data records.

In some embodiments, receiving one or more activity display criteria further comprises determining one or more characteristics associated with a first viewer of the particular multimedia content. In various embodiments, filtering the plurality of electronic data records based at least in part on the one or more activity display criteria further comprises reducing the number of electronic data records to be displayed based on one or more characteristics selected from the group consisting of (1) a relationship between the first viewer and one or more other viewers that viewed the particular multimedia content, (2) one or more other viewers selected by the first viewer, (3) one or more other viewers whose activities the first viewer has reacted to in the past, and (4) one or more other viewers whose activities the first viewer has reacted to in a positive manner. In particular embodiments, the one or more processors are further configured for displaying an indicator that notifies the first viewer that the displayed activities are being filtered, and at least partially in response to the indicator being selected by the first viewer, displaying an unfiltered plurality of activities. In other embodiments, the displayed activities associated with the one or more of the filtered electronic data records comprise activities that are associated with other viewers of the particular multimedia content that are considered high influencers with respect to the particular multimedia content. In other embodiments, the displayed activities associated with the one or more of the filtered electronic data records comprise activities that are associated with other viewers of the particular multimedia content that the viewer has elected to follow. In still other embodiments, filtering the plurality of electronic data records based at least in part on the one or more activity display criteria further comprises limiting the number of activities that are displayed for a particular segment of the multimedia content to a predefined threshold value.

In another embodiment an electronic data processing system for electronically managing a conversation that is linked to one or more segments of multimedia content divided into a plurality of segments, and for throttling the displayed conversation based on various criteria comprises (1) one or more processors, (2) one or more databases coupled to the one or more processors, and (3) a plurality of electronic data records stored in the one or more databases. Each one of the plurality of electronic data records (a) are linked to one or more segments of multimedia content, (b) corresponds to an activity submitted by a viewer of the multimedia content, (c) comprises an identifier for the multimedia content, (d) comprises an identifier for the viewer who submitted the activity, and (e) comprises one or more data fields selected from a group consisting of (i) text associated with the activity when the activity is a comment submitted by the viewer, (ii) a time stamp for when the activity was initiated, (iii) a time stamp for when the activity was submitted, (iv) the number of words in the text associated with the activity, (v) a reply count, (vi) an activity count, (vii) a question flag, (viii) an answer flag, (ix) an activity type, and (xi) an identifier for a related comment. In various embodiments, in the one or more processors are configured for determining one or more filtering criteria associated with a first viewer, at least partially in response to determining the one or more filtering criteria for the first viewer, identifying one or more of the plurality of electronic data records that are associated with segments of the multimedia content and that satisfy the one or more filtering criteria, and displaying, on a display interface, an activity associated with each one of the identified one or more of the plurality of electronic data records as a respective segment of the multimedia content is displayed to the first viewer.

BRIEF DESCRIPTION OF THE DRAWINGS

Various embodiments of an activity Management System and Method are described below. In the course of this description, reference will be made to the accompanying drawings, which are not necessarily drawn to scale and wherein:

FIG. 10 depicts an exemplary screen display and GUI according to various embodiments of the system, which may display information associated with the system or enable access to or interaction with the system by one or more users.

FIGS. 24-31 depict exemplary screen displays and GUIs according to various embodiments of the system, which may display components and embodiments of the facilitator interface.

FIGS. 34A-34B depict exemplary screen displays and GUIs according to various embodiments of the system, which may display an alternate embodiment of the graphical user interface.

DETAILED DESCRIPTION OF VARIOUS EMBODIMENTS

Figure 1:
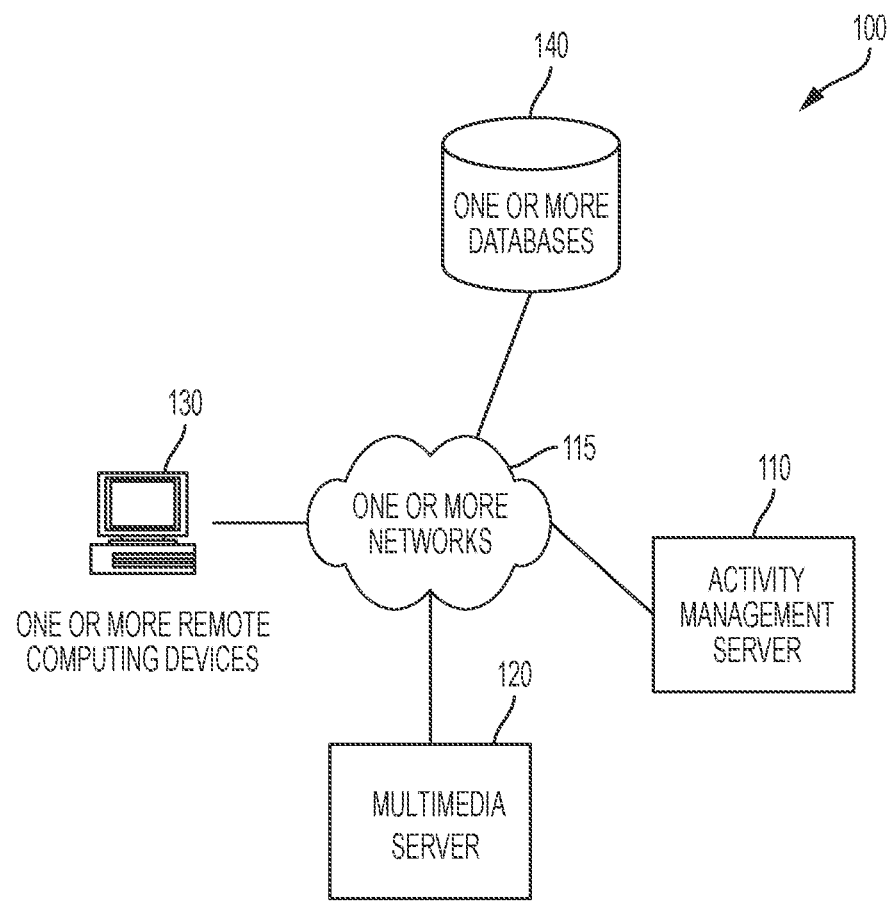
FIG. 1 depicts an activity Management System according to particular embodiments.

Various embodiments will now be described in greater detail. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Exemplary Technical Platforms

As will be appreciated by one skilled in the relevant field, the present systems may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of an activity Management System 100 according to a particular embodiment. In some embodiments, the Activity Management System 100 is configured to provide a platform for users to view multimedia content (e.g., audio files, video files, documents, etc.). The system may be further configured to enable content creators to provide multimedia content that is accessible to members of an organization and/or various groups. In particular embodiments, the Activity Management System 100 is configured to enable consumers of the multimedia content (e.g., end users, members of groups, members of the organization, etc.) to provide asynchronous conversations associated with the multimedia content from which the system is configured to derive viewer scoring and quality scoring for a particular piece of multimedia, for an overall group, for a multiple pieces of multimedia that are put together to form a course or lesson that is available to members within a particular group, etc.

As may be understood from FIG. 1, the Activity Management System 100 includes one or more computer networks 115, an activity Management Server 110, a Multimedia Server 120, one or more remote computing devices 130 (e.g., a desktop computer, laptop computer, tablet computer, smartphone, etc.), and one or more databases 140. In particular embodiments, the one or more computer networks 115 facilitate communication between the Activity Management Server 110, Multimedia Server 120, one or more remote computing devices 130 (e.g., a desktop computer, laptop computer, tablet computer, etc.), and one or more databases 140.

The one or more computer networks 115 may include any of a variety of types of wired or wireless computer networks such as the Internet, a private intranet, a public switch telephone network (PSTN), or any other type of network. The communication link between the Activity Management Server 110 and one or more databases 140 may be, for example, implemented via a Local Area Network (LAN) or via the Internet.

Figure 2:
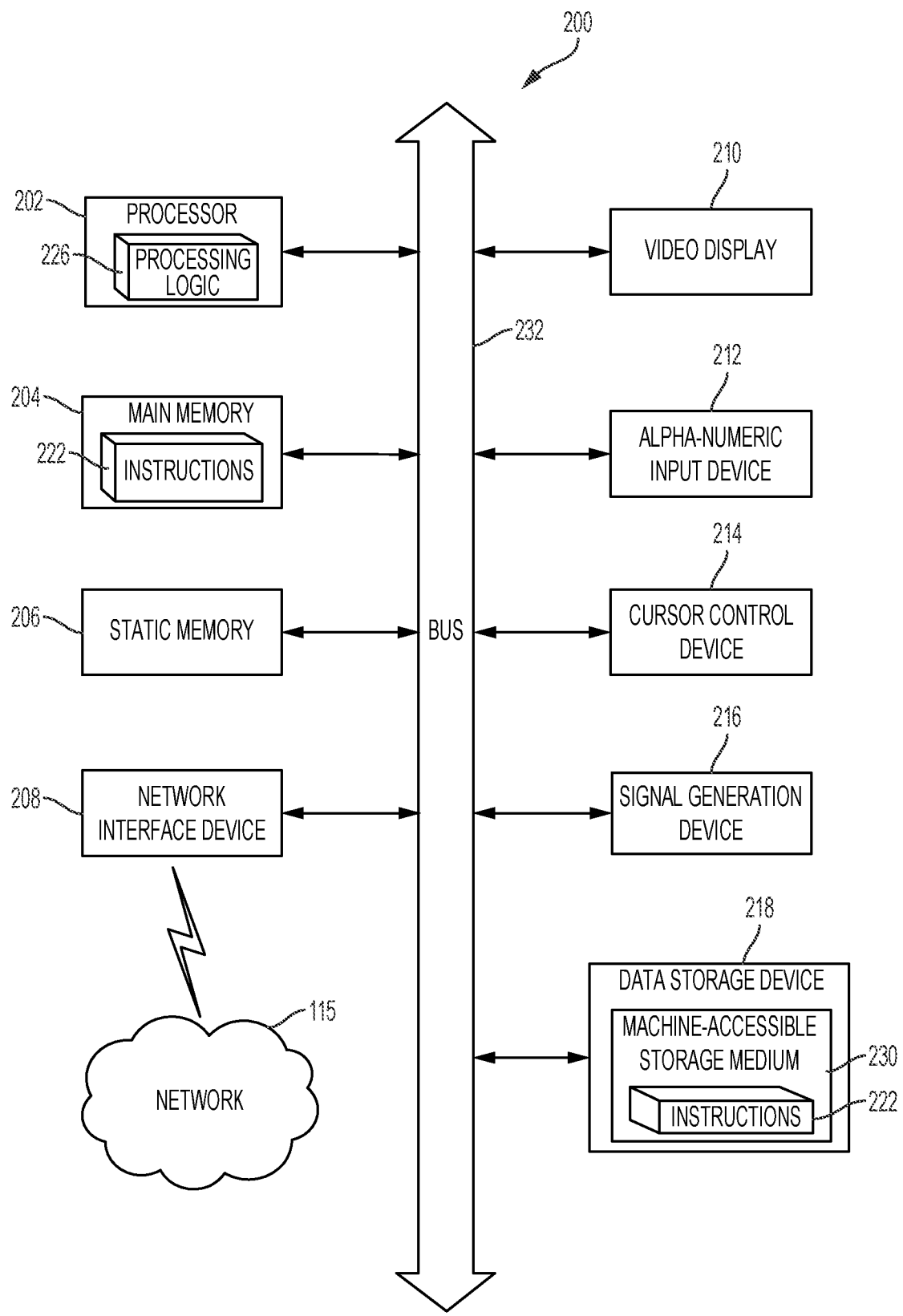
FIG. 2 is a schematic diagram of a computer (such as the Activity Management Server 110, or one or more remote computing devices 130, or the Media Server) that is suitable for use in various embodiments of the Activity Management System shown in FIG. 1.
Figure 3:
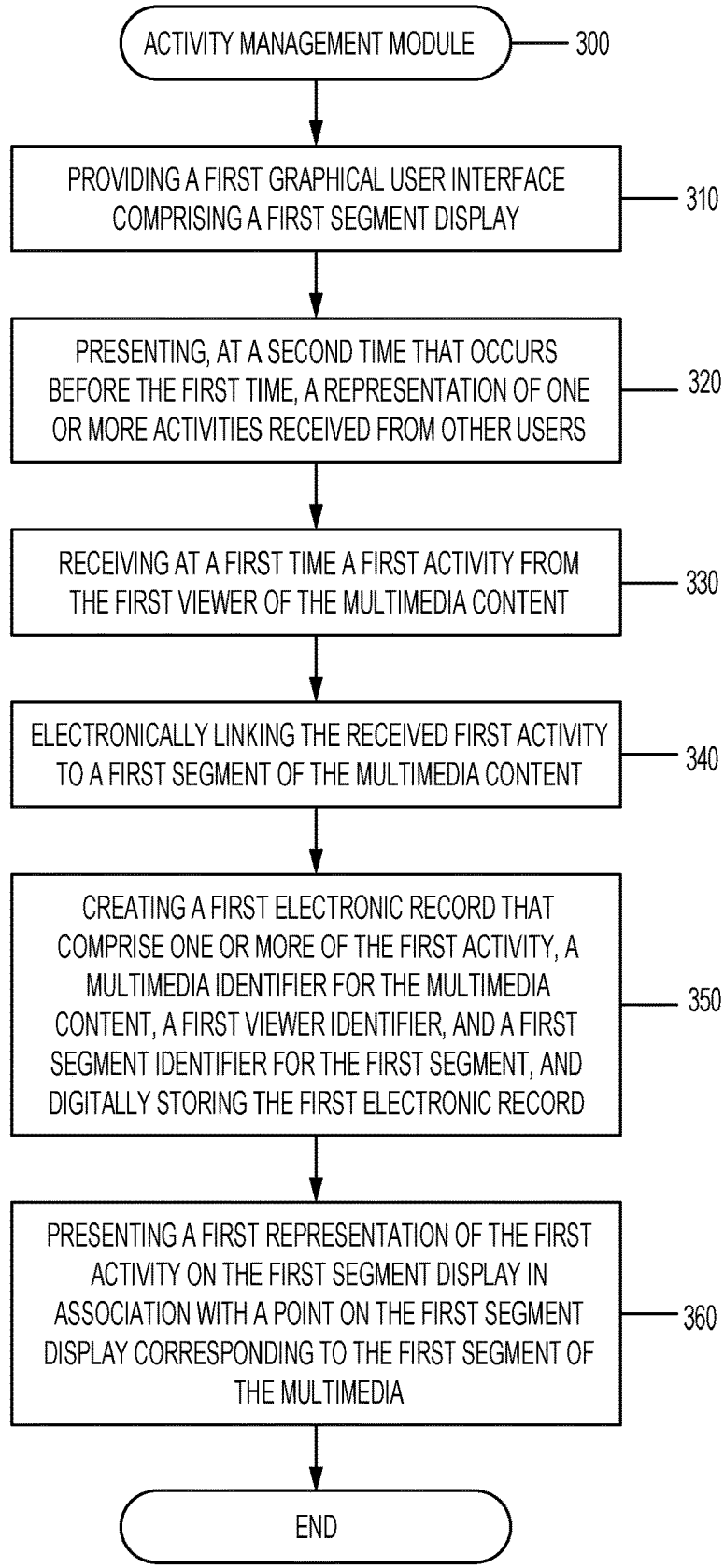
FIG. 3 depicts an exemplary flow chart of operations that make up an activity Management Module, according to particular embodiments, which the Activity Management System may be configured to execute.
Figure 4:
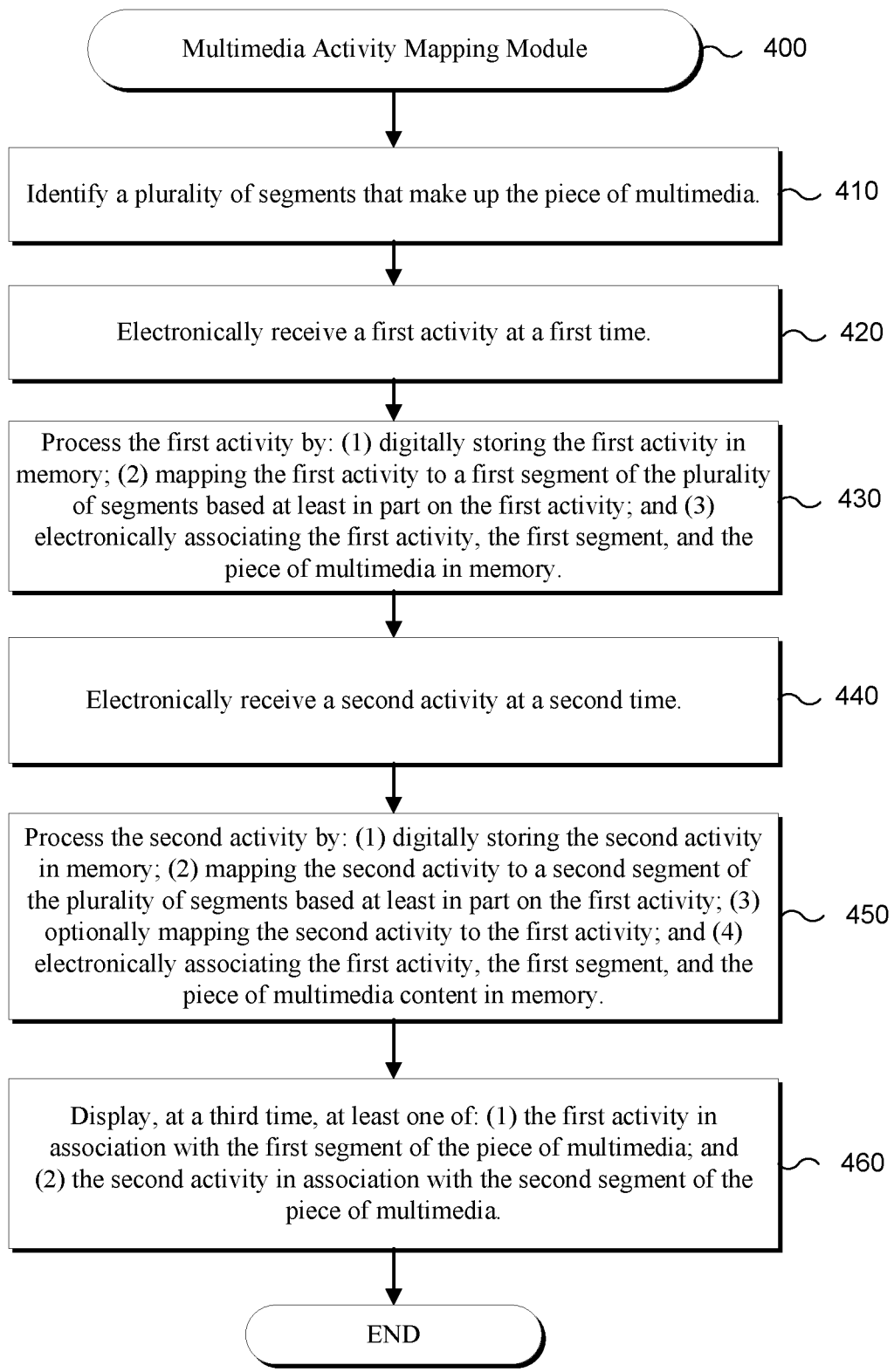
FIG. 4 depicts an exemplary flow chart of operations that make up a Multimedia activity Mapping Module, according to particular embodiments, which the Activity Management System may be configured to execute.
Figure 5:
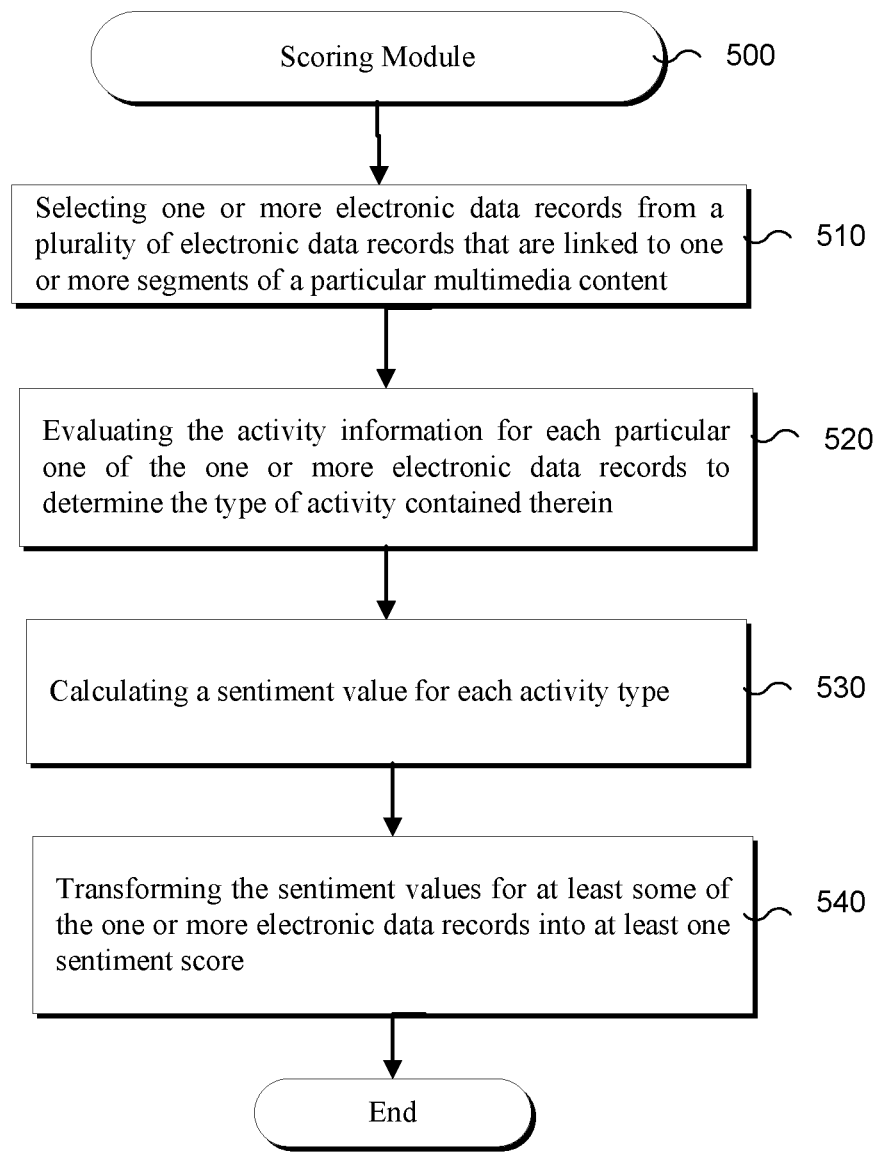
FIG. 5 depicts an exemplary flow chart of operations that make up a Scoring Module, according to particular embodiments, which the Activity Management System may be configured to execute.
Figure 6:
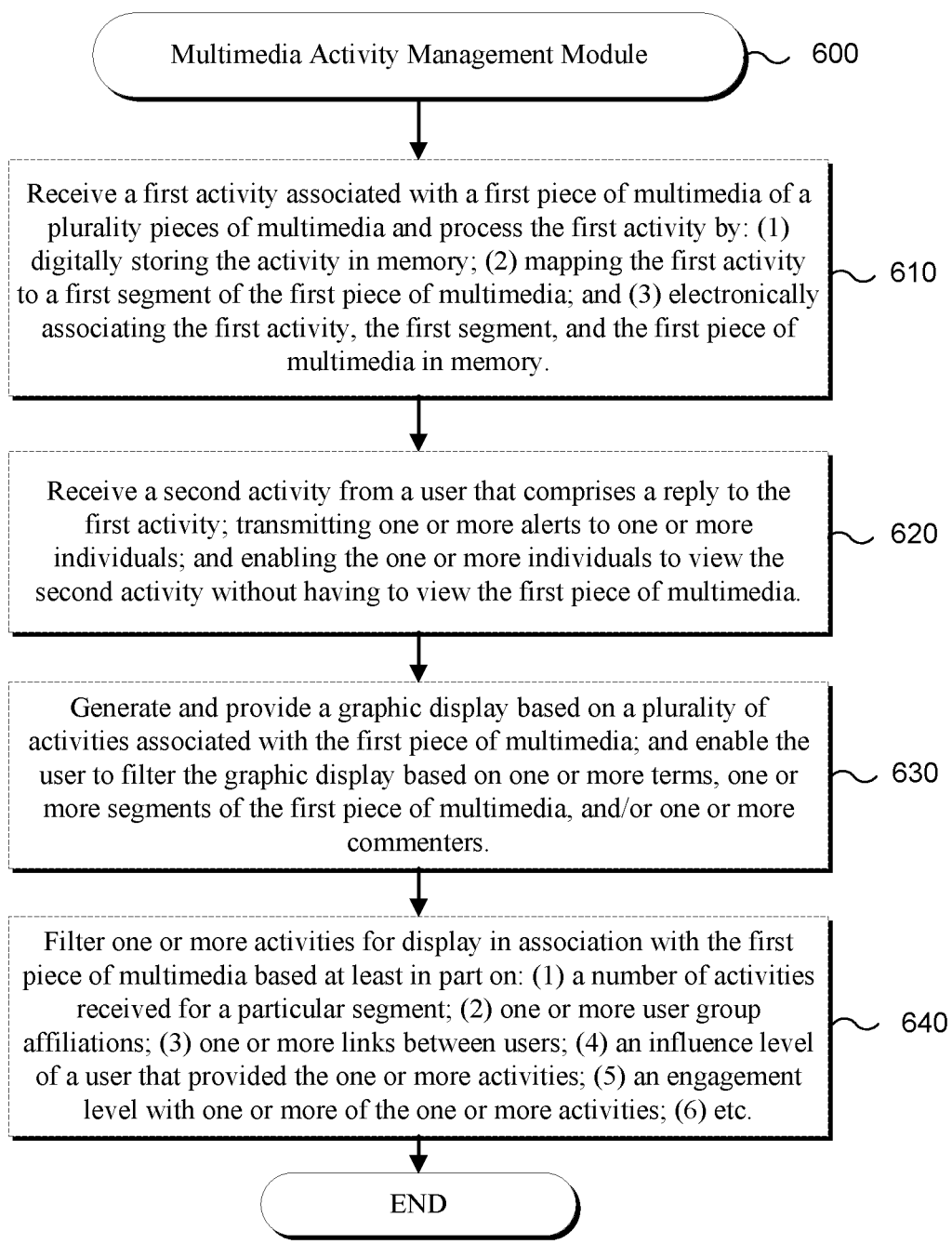
FIG. 6 depicts an exemplary flow chart of operations that make up a Multimedia activity Management Module, according to particular embodiments, which the Activity Management System may be configured to execute.
Figure 7:
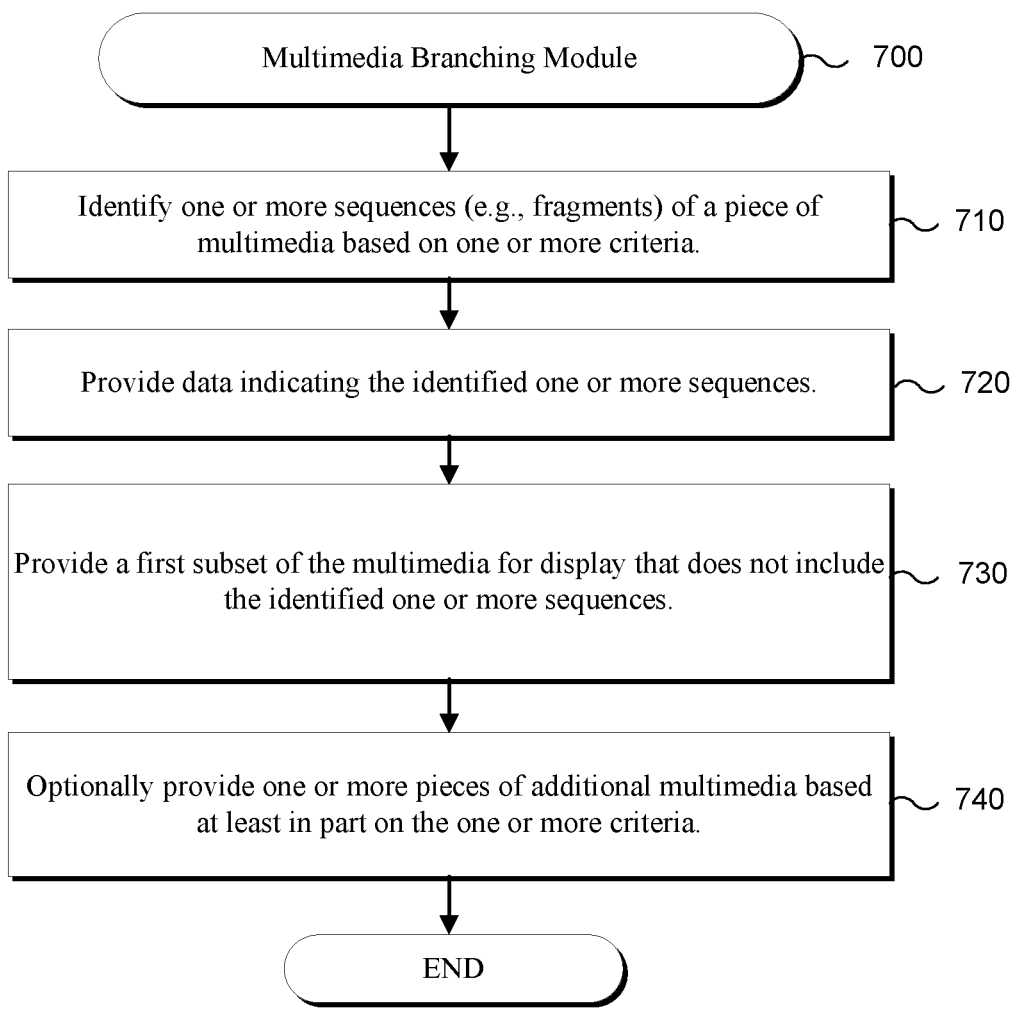
FIG. 7 depicts an exemplary flow chart of operations that make up a Multimedia Branching Module, according to particular embodiments, which the Activity Management System may be configured to execute.

FIG. 2 illustrates a diagrammatic representation of a computer 200 that can be used within the Activity Management System 100, for example, as a client computer (e.g., one or more remote computing devices 130 shown in FIG. 1), or as a server computer (e.g., Activity Management Server 110 or Multimedia Server 120 shown in FIG. 1). In particular embodiments, the computer 200 may be suitable for use as a computer within the context of the Activity Management System 100 that is configured to facilitate oversight of sentiment determination within the system.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200—main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Overview

An activity Management System, according to particular embodiments, is configured to provide a platform in which viewers may access multimedia content (e.g., one or more videos files, audio files, document files, image files, etc.). In various embodiments, particular viewers may be members of one or more organization, group, social networks, etc. that exist within the system. In other embodiments viewers do not need to be members of the system.

The Activity Management System is operable to present viewers with multimedia content (e.g., video, document, presentation, etc.) where the multimedia content is divided in to segments (e.g., time periods of video content, location coordinates of a document, individual slides of a slideshow, etc.). While a user is viewing or interacting with multimedia content, the user can provide one or more activities (e.g., comments, questions, replies, reactions, etc.) within a conversation area of a graphical user interface.

The Activity Management System is operable to electronically link the activity provided by (e.g., submitted by, or associated with) the user with the particular segment of multimedia content in which the activity was captured by the system. For example, if the multimedia content were a video, when a first user provides a first activity in the video at ten seconds, then the user's activity may be electronically linked to that particular segment of the video. In turn, when the same user or a different user views the multimedia content at a later time, the video will display the first user's activity when the multimedia presents the segment that is electronically linked to the first user's activity (i.e., ten seconds into the video). The user that watches the video at a later time can also provide activities or reactions to the first user's activities, as further described below. The Activity Management System is also operable to electronically link one or more activities associated with the user to one or more particular segments of multimedia content to which the activity is associated. For example, if the user is viewing the multimedia content and the user interface loses focus because the user clicked on a browser window to search the internet, the system will link the loss of focus to the one or more segments being viewed during the loss of focus.

The Activity Management System is also operable to provide a segment display for displaying a representation of each of the one or more segments of the multimedia content. Representations may be provided at points on the segment display that correspond to segments of the multimedia content associated with discussions among one or more users. Additionally, survey questions may be included along with particular segments of the multimedia content.

The Activity Management System also enables facilitators to provide and create multimedia content (e.g., videos, courses, lessons within courses, text files, slideshows, presentations, etc.) for viewers. The system enables facilitators to organize content for one or more groups of users. The facilitator may be enabled to see additional information regarding how particular users engage with the multimedia content. For example, the facilitator may be enabled to determine that a particular viewer is confused with respect to certain segments of the multimedia content.

The system is operable to display or provide one or more activities to a viewer that views the multimedia content after the one or more activities were made. This viewer is also enabled to provide activities with regard to the multimedia content. For example, the system may receive one or more activities, as previously described, from a first user while the user is viewing a video, and in turn the system may associate each activity from the first user with the particular video segment, as described above, in which it was provided. Further, the system may store each association in a database, and when a second user selects to view the video at a later time, the system will display the activities of the first user at the time that its associated segment of the multimedia is presented to a second user (which may be the first user viewing the multimedia content at a later time). Moreover, the second user can also provide activities with regard to the multimedia content, and when a current user (e.g., the first user, the second user, or a different user) views the multimedia content at a time after the second user provided their activities, the system will display the activities of the first user and the second user at the time that its associated segment of the multimedia is presented to the current user.

The system is also configured to determine a sentiment score for particular multimedia content, one or more segments of a particular multimedia content, a viewer, a group, or an organization, among others. The sentiment score may, for example, be related to determining a general mood (e.g., confused, happy, bored) of one or more viewers when viewing one or more particular segments of multimedia content. In turn, the sentiment score information may be provided to a facilitator or content creator to provide feedback on their content or enable them to update or improve particular segments of their multimedia content. For example, the system may store electronic data records that indicate viewer's activities with respect to multimedia segments provided to the viewers. The system may then calculate a sentiment value for each activity found in a respective electronic record. For example, when a survey questionnaire is presented, each potential answer of the survey questionnaire may be preassigned a sentiment value. Additionally, each type of reaction may have a corresponding predefined sentiment value assigned. In turn, the system is enabled to calculate a sentiment score for particular segments of multimedia content or for one or more particular viewers in relation to the multimedia content.

Further, the system may be configured to provide an alert to one or more individuals when a second activity is received by the system that is provided in reply to a first activity. For example, a first user may provide an activity in the form of a question that is associated with a particular segment of a video. In turn, the first user or another individual (e.g., the facilitator) may be provided with an alert (e.g., via a mobile computing application) when a user provides a reply to the first activity (i.e., the first user's question in the example). Additionally, after being provided with the alert, the system may enable the first user or other individual to view the reply to the first activity without being required to view the video (or other multimedia content) associated with the first activity. Further, the system may generate a graphic display (e.g., a visual representation) of the plurality of stored activities for the piece of multimedia, and the user may be enabled to filter the graphic display based on terms, segments, and/or particular viewers. Additionally, the system may throttle or otherwise limit the number of activities a given user may be presented with based on a number of activities received per segment, or the user's relationship or connection to the individuals providing activities (e.g., a social network connection), among others.

Moreover, the system may also be configured to automatically determine which sequences of a piece of multimedia content to display to a viewer and which sequences to skip, based on for example, a user's engagement score with the piece of multimedia content, or a sentiment score associated with the content, among others. For example, if a user is presented with a video, and with respect to one or more sequence of the video, the user has a low engagement score, the user is asking a lot of questions, or the user has struggled understanding that type of sequence in the past, among others, then the system may indicate the particular one or more sequences. In response, the system may add one or more additional pieces of multimedia (e.g., one or more sequences from one or more additional pieces of multimedia), or link to one or more additional pieces of multimedia to provide to the viewer.

In various embodiments, the Activity Management System 100 may be implemented to create synchronous or asynchronous conversations wherein each activity of the conversation is linked to respective segment of multimedia that makes up the multimedia content. For purposes of this disclosure, the term "multimedia content" should be broadly construed to mean any and all types of video files (e.g., standard video, 3D video, immersive video, spherical video, etc.), audio files, document files (e.g., word processing documents, spreadsheet documents, presentation documents, PDF documents, drawing documents, and any other suitable types of documents), image files, etc.

For purposes of this disclosure, the term "segment" should be broadly construed to mean dividing the multimedia in any suitable manner. For example, video content may be segmented by one or more of (1) discrete time segments (e.g., each second, each tenth of a second, by one or more video frames, etc.), (2) discrete time period segments (e.g., every 5 seconds), (3) location segments (e.g., by one or more of (a) x, y, and/or z-coordinate space, (b) by page, (c) by paragraph, (d) by line number, (e) by word, (f) by letter, (g) by pixel location, (h) etc.) or by any other suitable segmentation of the multimedia content.

Additionally, the term "activity" as used in this disclosure, should broadly be interpreted to include, for example: (1) one or more free form text comments (e.g., typed or otherwise provided by the first user); (2) one or more video comments (e.g., one or more videos recorded by the first user, one or more links to one or more videos, or any other suitable video comment); (3) one or more audio comments (e.g., one or more audio comments record by the first user, a link to one or more audio comments, or any other suitable audio comment; (4) one or more image comments (e.g., one or more uploaded images; one or more links to one or more images; one or more images created by the first user, etc.), which may include, for example, one or more graphics interchange format (GIF) images: (5) one or more predefined comments (e.g., one or more predefined text comments, one or more predefined image comments, one or more predefined video comments, one or more predefined audio comments, etc.); (6) one or more emoticons (e.g., one or more smilies, one or more emoticons, one or more ideograms, etc.), which may, for example, comprise one or more predefined emoticons and/or one or more user-submitted emoticons; (7) an initial comment made by a viewer with regard to multimedia being viewed by the viewer, (8) a question submitted by a viewer regarding the content of multimedia being viewed by the viewer, (9) a reaction (e.g., a predefined comment that expresses a viewer's sentiment such as like, dislike, agree, disagree, confusion, anger, etc.) to multimedia being viewed by the viewer, (10) a reply in the form of an comment, question or reaction to one or more comments, questions or reactions submitted by a prior viewer of the multimedia content, (11) one or more user activities when they are interacting with the video content including, but not limited to, mouse and/or touch events (e.g., mouse is moving, not moved, etc.), content viewing events (e.g., pausing, seeking, rewinding, stopping, playing the video content, etc.), user interface changes (e.g., loss of focus, resizing the user interface, muting the client device, etc.), change of orientation of the client device on which the user interface is being display, and/or (12) any other suitable viewer comment, activity, type of activity, combination of activities, or combination of activity types.

Finally, the term "user" as used in the present disclosure should be broadly interpreted to include any one or more of (1) content creators, (2) organizations, (3) facilitators, (4) groups of viewers, (5) individual viewers, (6) advertisers, and/or (7) other businesses or individuals associated with multimedia content as presented herein.

Exemplary embodiments of the Activity Management System 100 are discussed more fully below.

Exemplary System Platform

Various embodiments of an Activity Management System 100 may be implemented in the context of any suitable system (e.g., a mobile computing system, a desktop computing system, etc.) that allows users (e.g., content creators, organizations and their end users (e.g., employees, members, etc.), facilitators (e.g., users that facilitate the viewing of one or more pieces of multimedia content by answering questions and ensuring that viewer questions, activities or concerns are addressed), advertisers, and others associated with multimedia content) to create asynchronous conversations between consumers of the multimedia content so that the users of the system can facilitate collaborative experiences when consuming the multimedia content.

For example, a business may want to have their sales staff take a course on selling. In various embodiments, the Activity Management System 100 is configured to provide a platform in which the business may enable access to content (e.g., courses) to one or more end users (e.g., sales staff). In various embodiments, the system comprises a plurality of organizations, each having its own end users. In various embodiments, particular end users may be members of more than one organization within the system. In various embodiments, each end user may have a unique login to the system for each organization of which they are a member. In other embodiments, each particular user may utilize a universal system login to access each organization of which they are a member.

Advantages of the Activity Management System 100 described herein include, but are not limited to, the linking of conversations and activities to segments of multimedia content being viewed. For example, the Activity Management System 100 allows for collaborative remote learning by building a conversation around the viewing of (1) a live streamed event (e.g., multimedia content), (2) a time-shifted live streamed event, or (3) prerecorded multimedia content. In various embodiments, activities that are submitted during live streaming of the event are linked to the relevant segments of the event associated with the activity. The activities form a live conversation between at least two participants of the event (e.g., two viewers, a viewer and a presenter, a viewer and a facilitator of the live event, etc.). Moreover, when a viewer views the event at a time after the live streaming of the event (e.g., time shifted) the viewer can participate in an asynchronous conversation that produces a collaborative viewing experience for the viewer. If the later viewer submits activity (e.g., comments, reactions, replies to prior comments, etc.) participants of the live streaming event can be notified of later activities and review and respond to the later submitted activities, as described in greater detail below. Other advantages of the Activity Management System 100 include, but are not limited to, providing the opportunity for remote interactive learning, remote interactive learning that can be conducted by the viewer at their own pace, the ability of content creators to obtain feedback on multimedia content through asynchronous conversations, etc.

Figure 8:
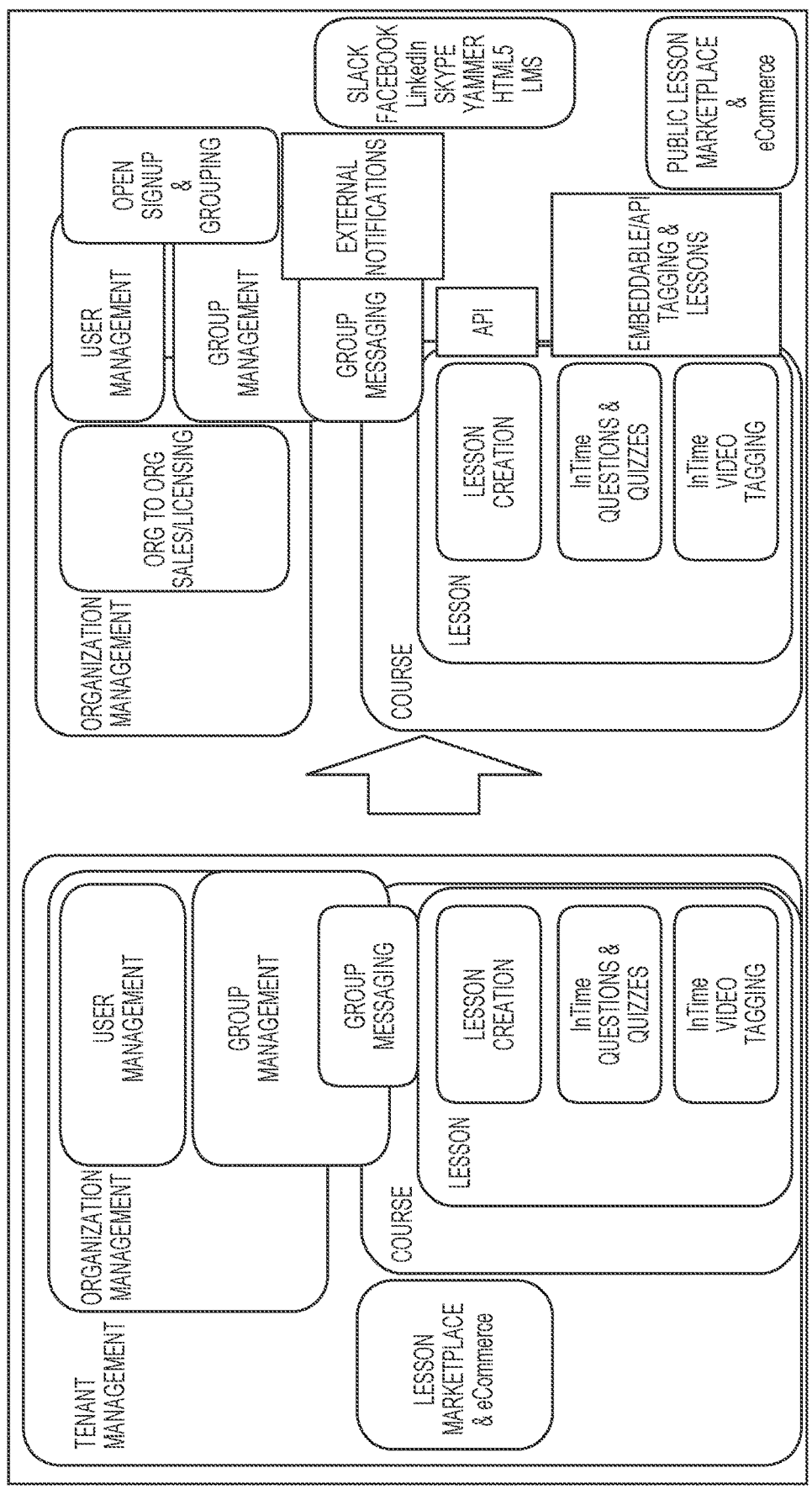
FIG. 8 depicts a diagram of an exemplary organization structure for the Activity Management System.

FIG. 8 depicts an exemplary organization structure of users according to a particular embodiment. As may be understood from FIG. 8, an organization may comprise one or more end users that are managed by the organization. An organization may, for example, add users, remove users, etc. The organization may further comprise one or more groups (e.g., sales staff, marketing staff, engineers, etc.) that, in various embodiments, are managed by the organization. In particular embodiments, the organization may include a plurality of groups to which one or more end users may be assigned.

Figure 9:
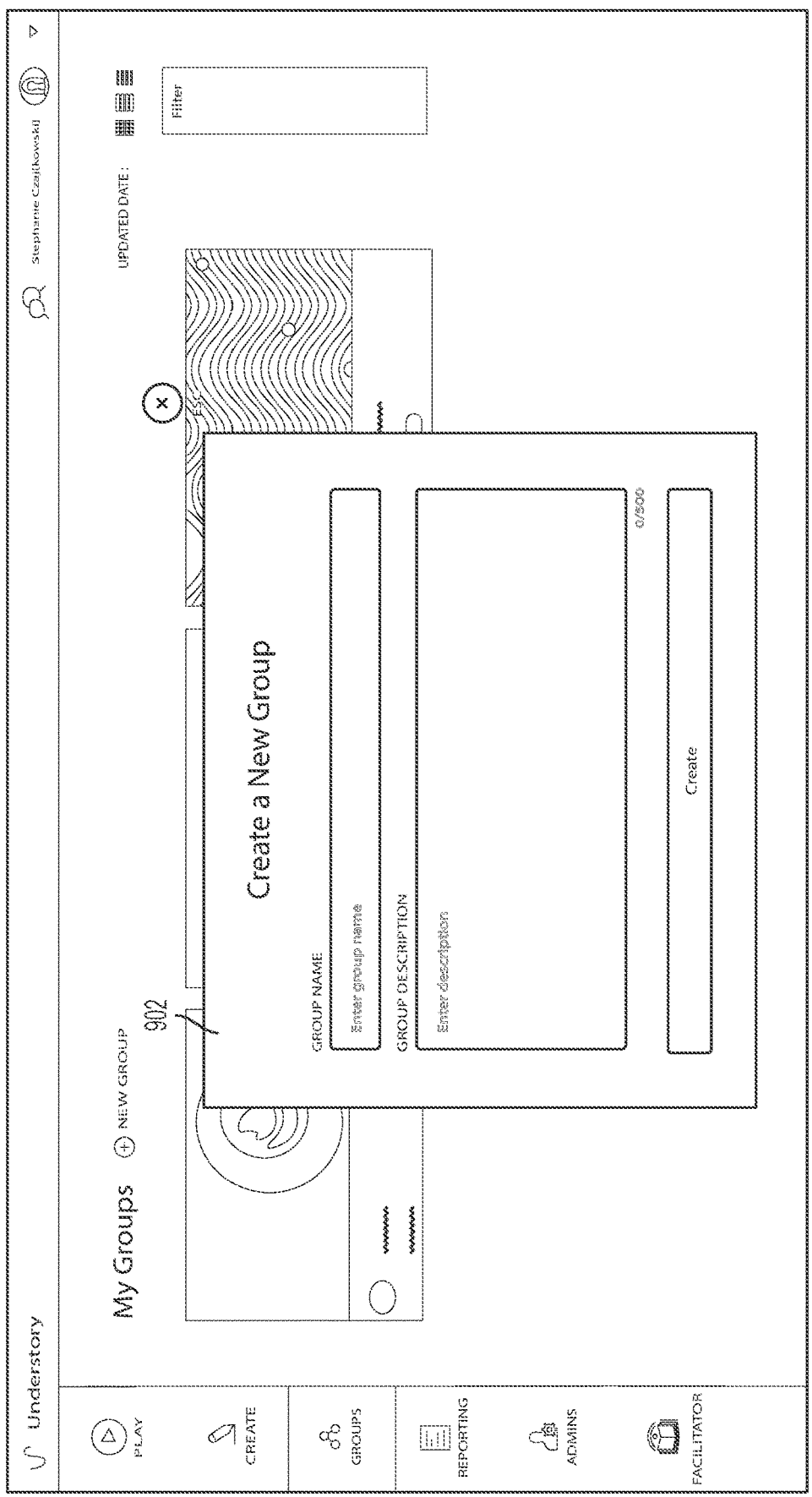
FIG. 9 depicts an exemplary screen display and graphical user interface (GUI) according to various embodiments of the system, from which an organizational administrator can add a group to the organization.

FIG. 9 depicts a user interface 902 from which an organizational administrator can add a group to the organization. The organizational administrator may, for example, provide a group name and registration dates via the interface. The system may then, in response to receipt of a new group name and registration dates: (1) start a new group bearing the group name; and (2) make the group available for end users that are members of the organization during a registration period. In various embodiments, each of the one or more end users may be assigned to, or registered for, the one or more groups within the organization to which they belong. In particular embodiments, each particular one of the one or more groups may be associated with multimedia content (e.g., media content such as one or more presentations, one or more videos, one or more questionnaires, one or more documents, one or more images, etc.) that form courses, lessons, teaching material, etc. that each respective end user assigned to the particular group may access. In various embodiments, the multimedia content is a course that comprises one or more lessons. In particular further embodiments, the system is configured to enable lesson creation, for example, via a suitable user interface, by enabling a content creator (e.g., lesson creator) to upload a created course or one or more pieces of content for a created lesson, etc.

In various embodiments, the system is configured to provide a collaborative platform for members of a particular group or organization in which, for example: (1) the system facilitates group conversations between or among group members; (2) the system enables collaboration between/among users within the group (e.g., create a synchronous and/or asynchronous conversation that is linked to the multimedia content); (3) the system tracks activity performed by each member of the group and makes this activity data available to other members of the group (e.g., by displaying which members of the group have viewed particular content, displaying activities left by other members of the group for particular pieces of content, the sentiment of each viewer, how engaged a viewer is with the multimedia content, how one viewer influences another viewer, etc.); (4) the system enables collaboration between end users of a first group that are subscribed to particular content (e.g., lessons) with other end uses that are subscribed to the same content but not part of the first group; (5) etc.

Figure 10:
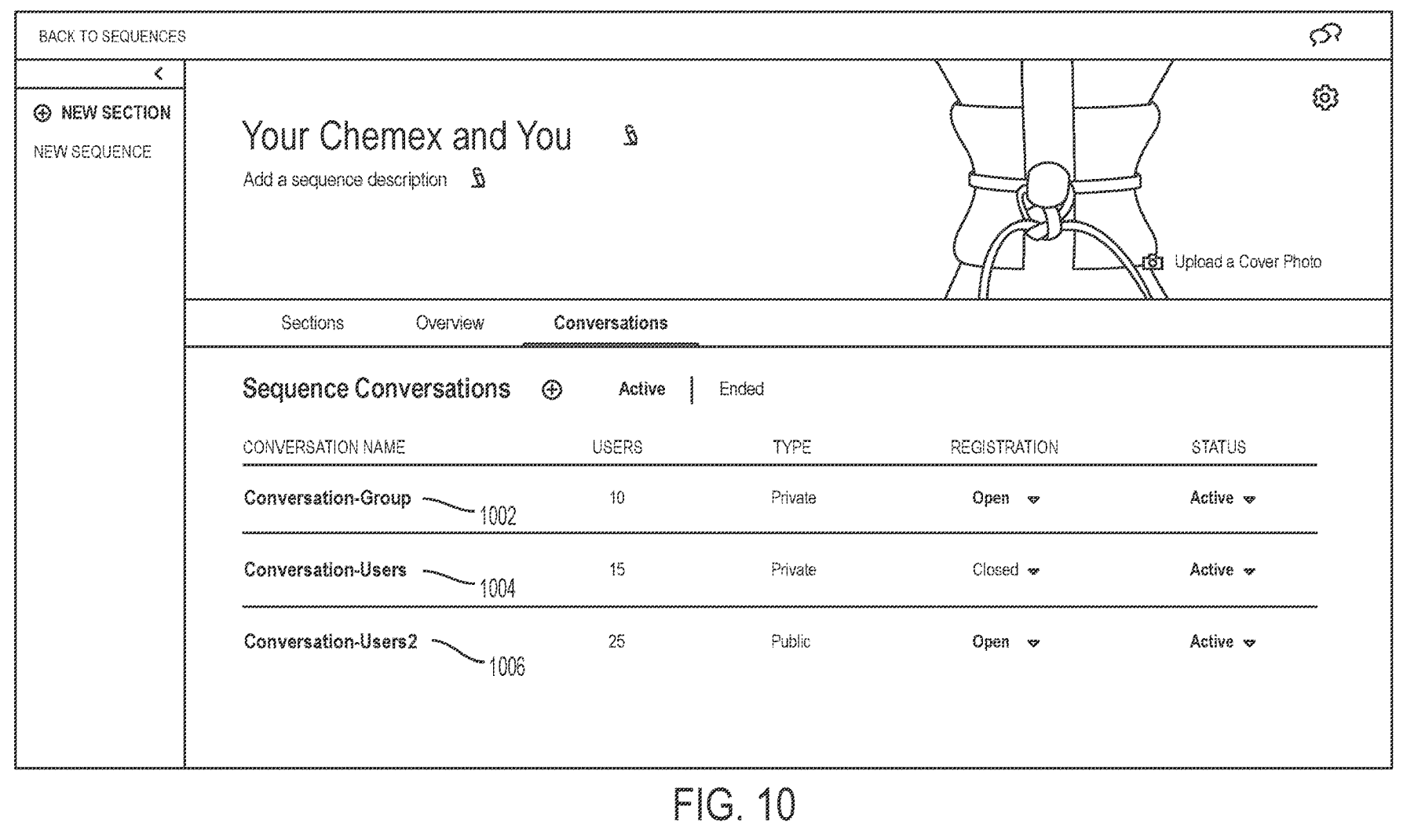

In various embodiments, the system is configured to arrange particular media content into courses or lessons (e.g., for consumption by one or more particular groups). In various embodiments, the system is configured to enable a content creator to organize course content (e.g., to organize various pieces of multimedia content in a particular order) for consumption by the one or more end users in the group. FIG. 10 is an exemplary user interface that depicts three groups 1002, 1004, 1006 that have access to a particular course called "Your Chemex and You." In some implementations, the information provided in the user interface may only be provided to the content creator, and the one or more end users in each group may not be enabled to access the information provided in the user interface. As shown in this figure, the user interface may include information for the content (e.g., course) that includes the groups subscribed to or signed up for the content, a number of users in each group, the type of group (e.g., private or public), whether registration for the group is open or closed, the status of the group, etc.

Figure 28:
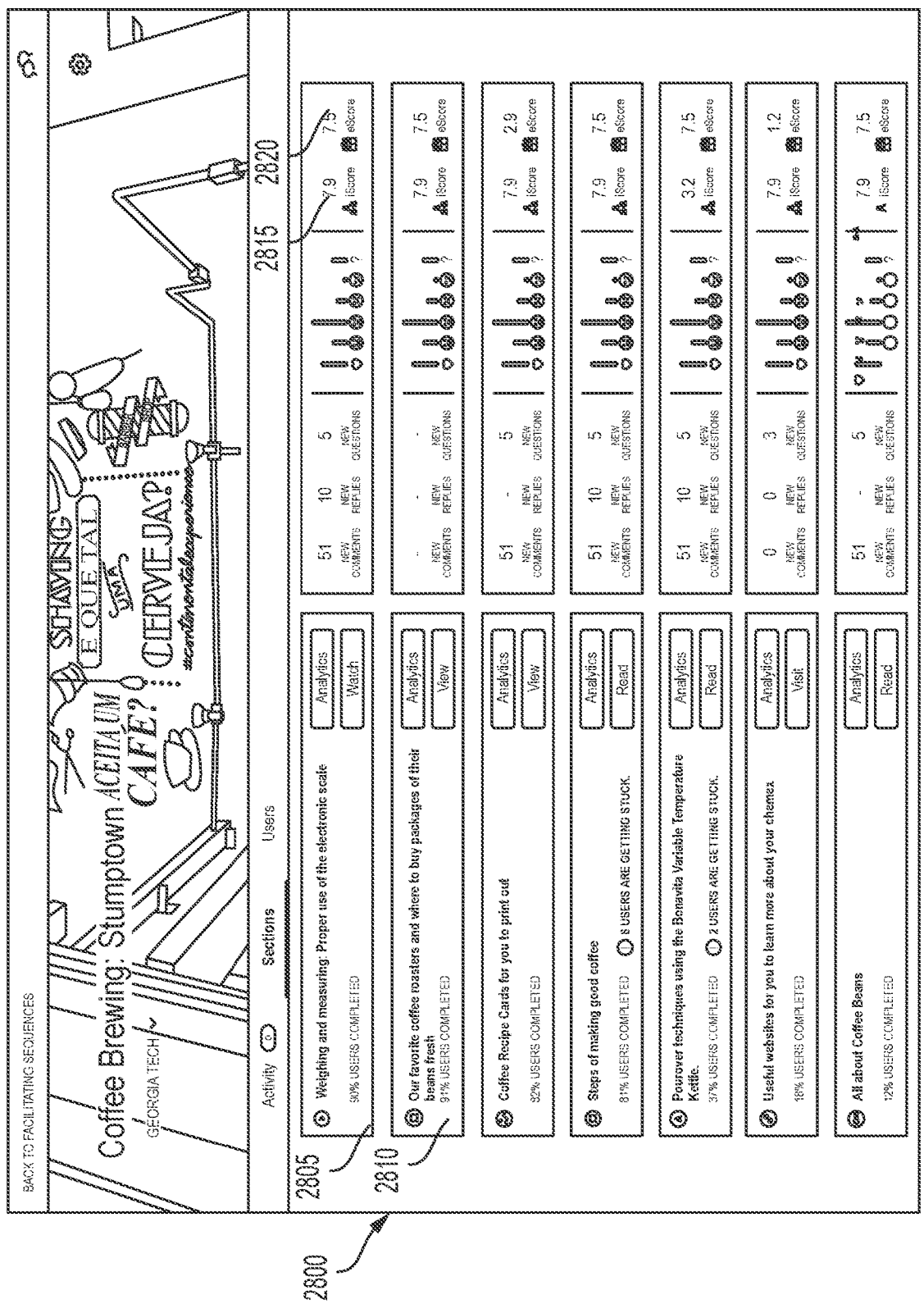
Figure 29:
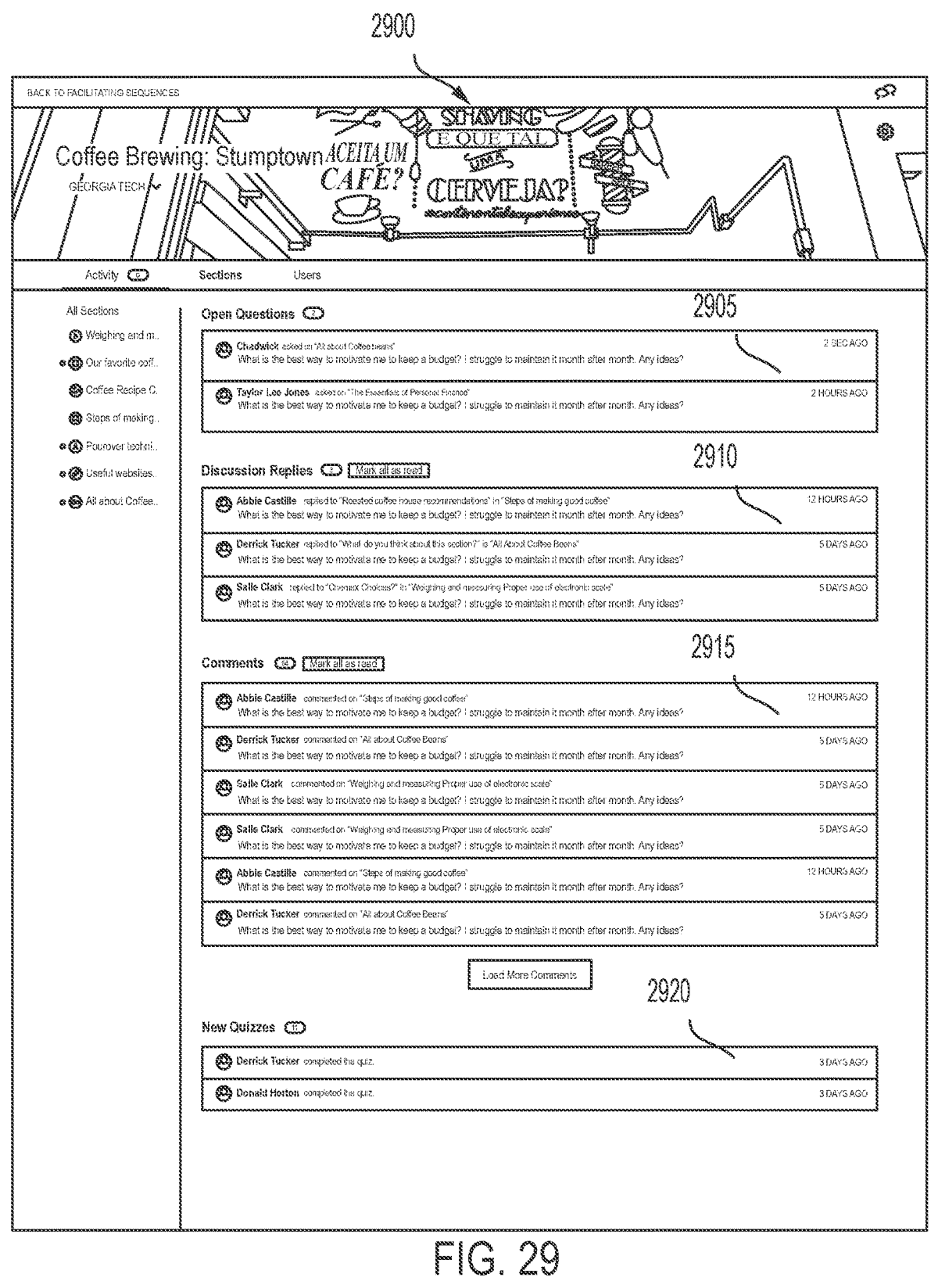
Figure 30:
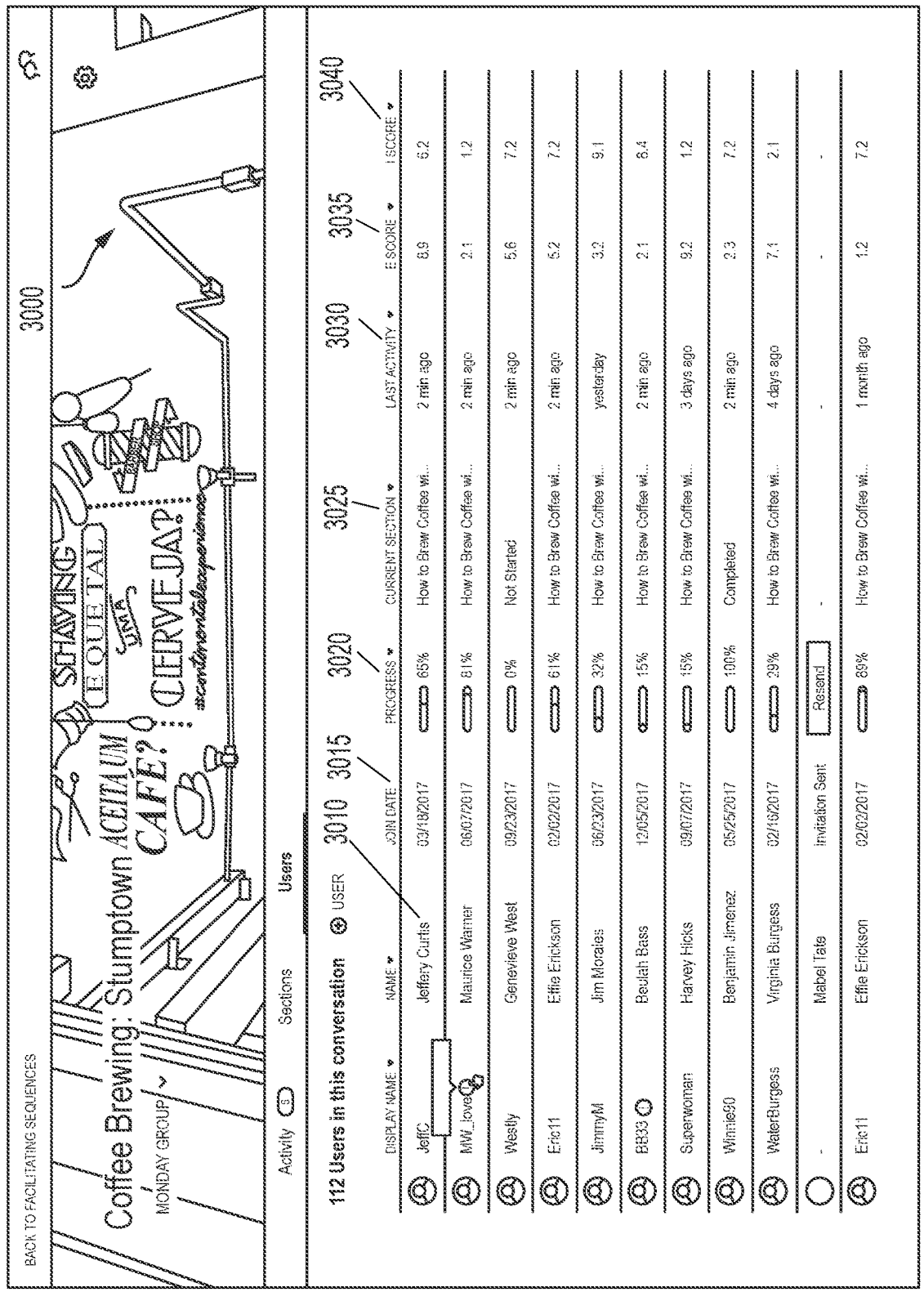
Figure 31:
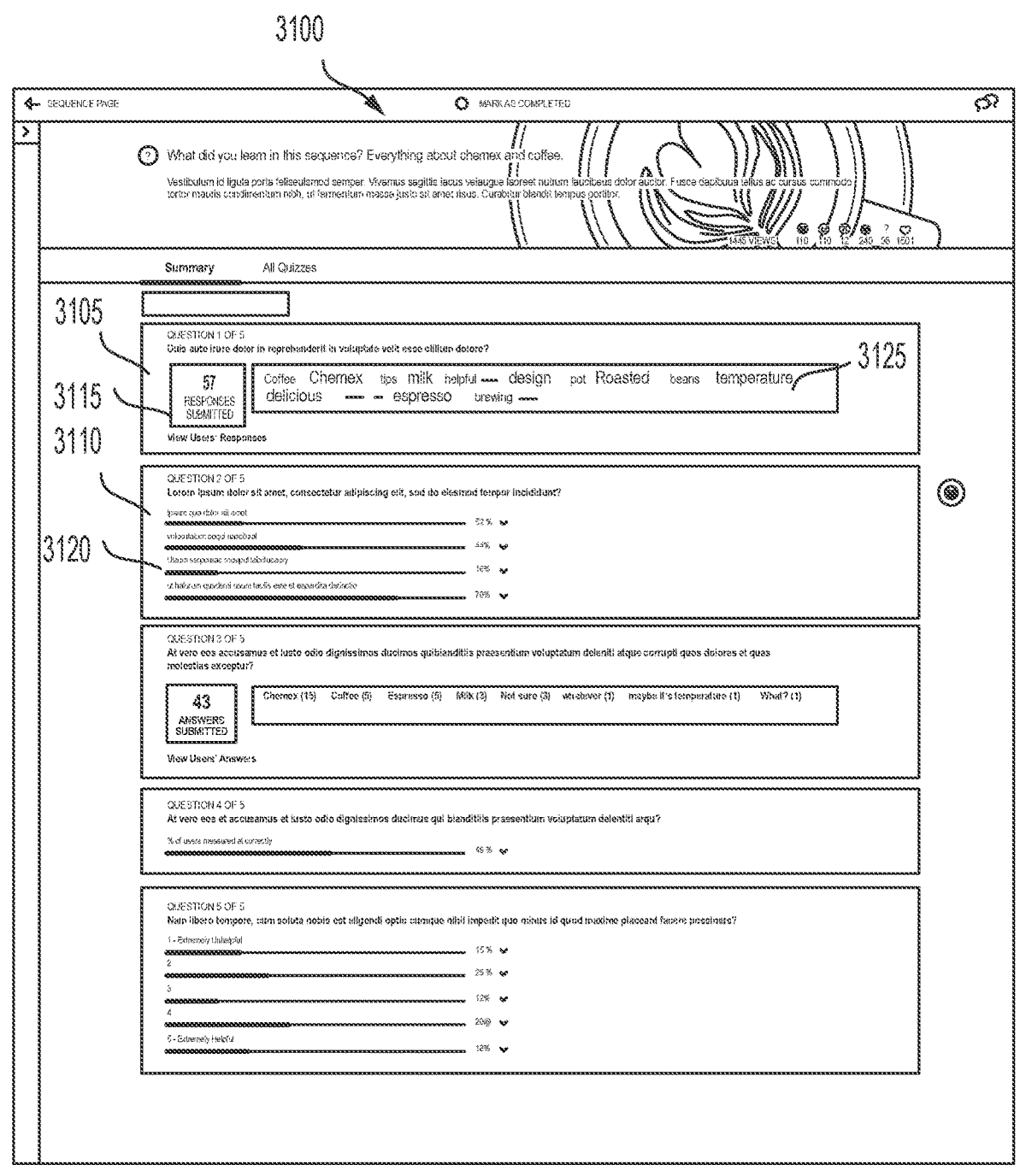

FIGS. 24, 28, 29, 30 and 31 depicts various user interface that can be used by a facilitator of the multimedia content. For example, FIG. 24 specifically depicts a user interface 2400 that shows the courses (e.g., sequences) to which the facilitator is assigned. The interface 2400 tells the facilitator the name of the course, the groups assigned to the course, how many new interactions have occurred in a conversation associated with the group, if there are any open questions and the number of new quizzes. The user interface 2800 shown in FIG. 28 provides the facilitator of a course with information that is specific to lessons (e.g., 2805 and 2810) in a course. Some information includes, but is not limited to, the number of new comments, new replies, new questions, the number and type of reactions and scores (influence scores 2815 and engagement scores 2820) associated with the lesson. The user interface 2900 depicted in FIG. 9 provides a facilitator with detailed information about open questions 2905, unread discussion replies 2910, unread comments, 2915 and new quiz results 2920. The user interface 3000 shown in FIG. 30 provides a facilitator with specific user information for all users assigned to a particular multimedia content. The user interface 3000 provides a facilitator with each user's name 3010, the date the joined 3015, the progress 3020 that they have made through the particular multimedia content, the current section 3025 they are in, the time 3030 of their last activity, the user's engagement score 3035 and influence score 3040 for the particular multimedia content. Finally, user interface 3100 of FIG. 31 provides the facilitator with a summary of quiz questions (e.g., 3105 and 3110) and the related answers received by the system. In some embodiments, the user interface 3100 will notify the facilitator of the number of answers 3115 received for questions with free form text answers 3105 and a distribution 3120 for questions 3110 with predefined answers. For questions with free form text answers 3105, the system may also provide a summary 3125 of keywords most often found in the answers.

Figure 11:
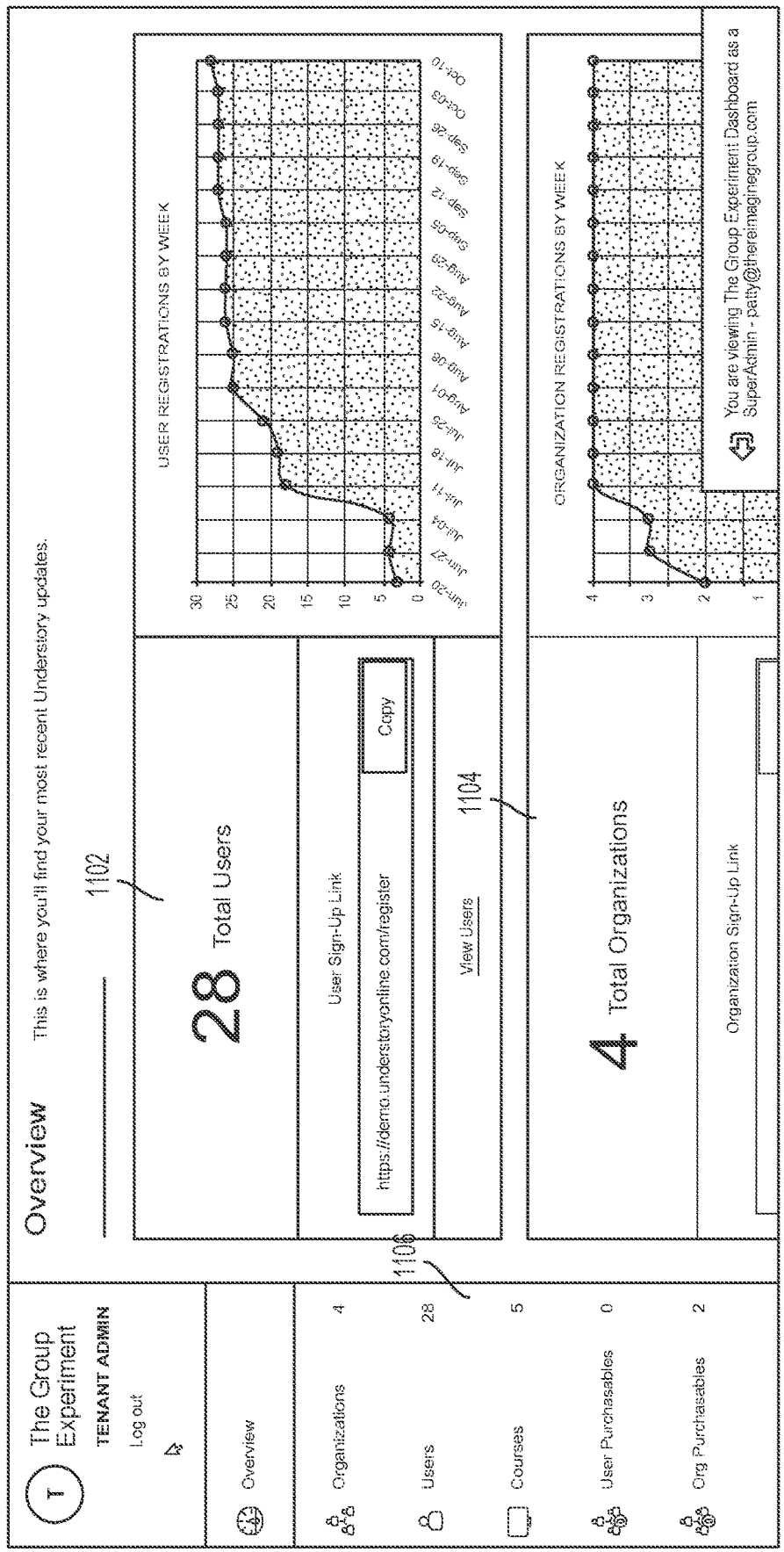
FIGS. 11, 12A, and 12B depict exemplary screen displays and GUIs according to various embodiments of the system, which may enable a content creator to create content or view information related to the content created of the content creator.
Figure 12A:
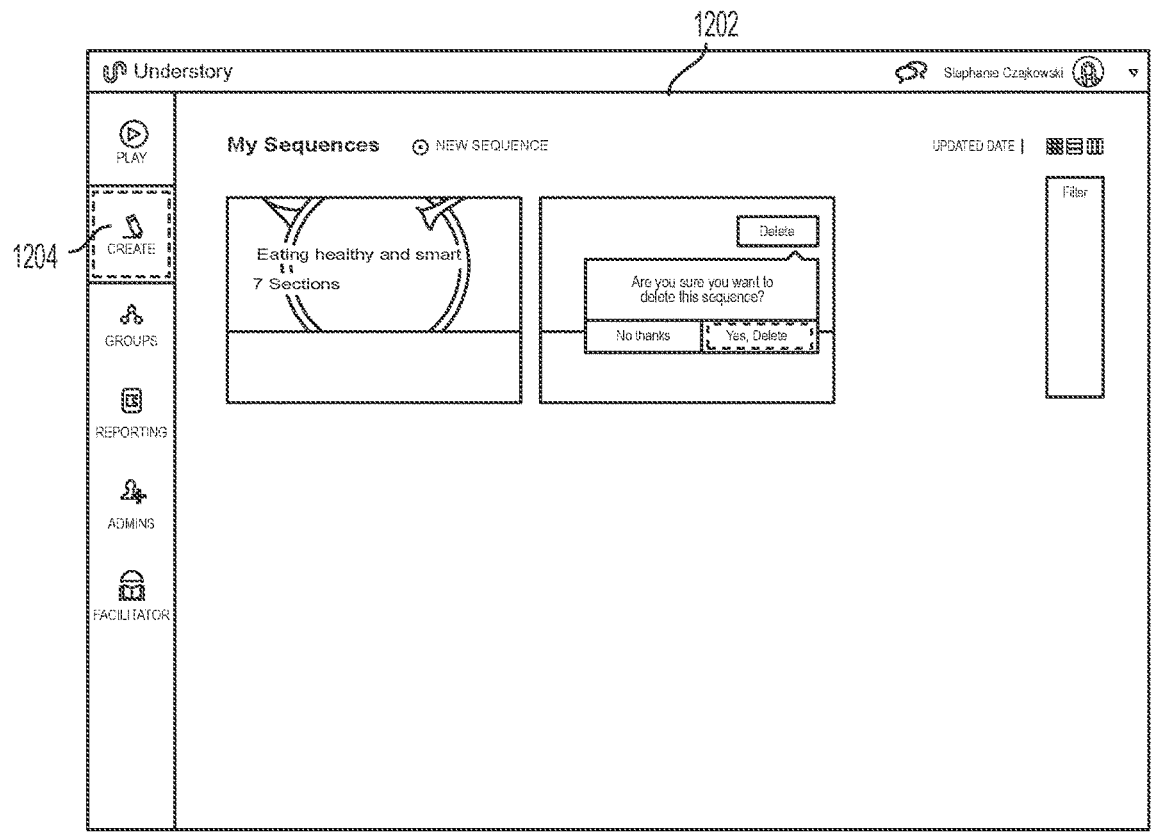
Figure 12B:
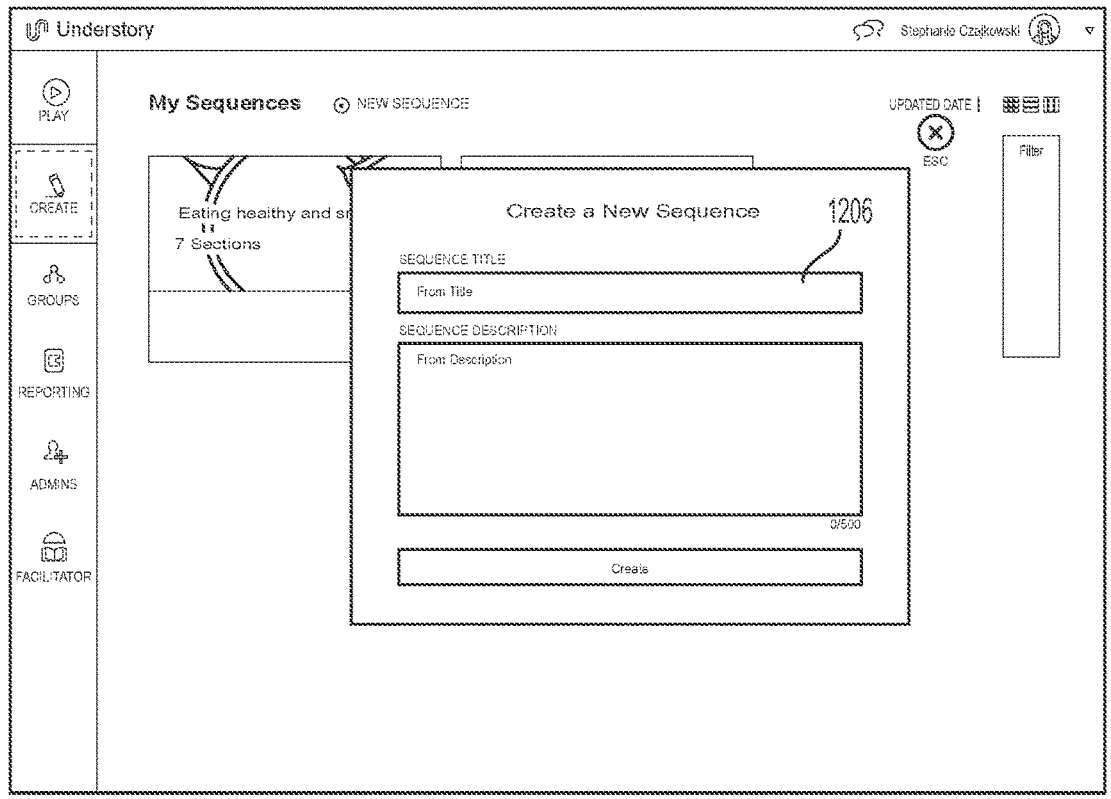

FIG. 11 depicts a user interface via which a content creator may view information related to a number of total users 1102 signed up for courses offered by the content creator, a number of total number of organizations 1104 that are subscribed to at least one of the creator's courses, a number of courses made available by the particular content creator 1106, etc. The user interface further shows changes in the number of users and organizations over time. FIG. 12A depicts a user interface 1202 via which a content creator may create a new lesson (e.g., a sequence) by selecting a "create" button 1204, where the new lesson may be included in a course. As shown in FIG. 12B, the content creator can provide, via a "create new sequence" interface 1206, a sequence name and a sequence description, etc. In response to a content creator providing new sequence information via the user interface, the system may be configured to create a new lesson having the provided attributes, and for example, store the lesson in memory.

Figure 13:
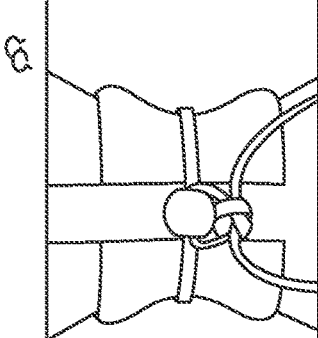
FIG. 13. depicts an exemplary screen display and GUIs according to various embodiments of the system, which a viewer may experience when accessing particular multimedia content.

FIG. 13 depicts a user interface according to a particular embodiment, which a viewer may experience when accessing particular multimedia content (e.g., a course entitled Your Chemex and You). As shown in this figure, the course may be broken into lesson (e.g., 1. Weighing and measuring: Proper use of the electronic scale 1302 . . . 5. Pourover techniques using the Bonavita variable Temperature Kettle 1304, etc.). As may be understood from this figure, an end user (e.g., a viewer) may select a particular lesson from the course in order to view the lesson's content, which may include, for example, one or more pieces of multimedia content such as one or more videos, one or more presentations, one or more documents, one or more images, one or more quizzes, one or more questionnaires, one or more webpages, etc. In various embodiments, the system is configured to mark activities that can be read, visited or answered as completed 1306 (e.g., by greying out activities that the user has already completed as part of the lesson, by changing the indicator from "play", "view" or "read" to "completed", or by any other suitable method).

Figure 14:
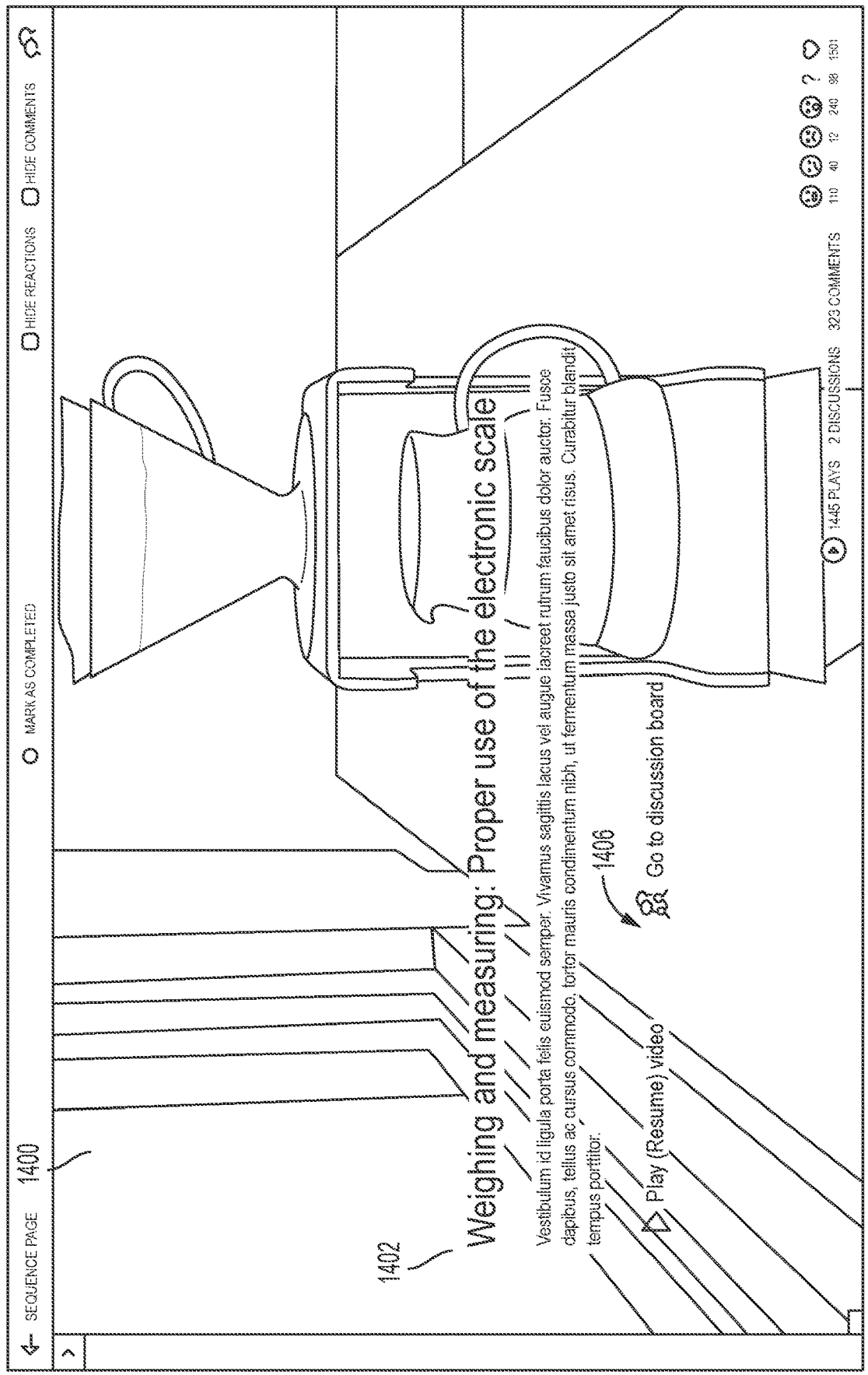
FIG. 14. depicts an exemplary screen display and GUIs according to various embodiments of the system, which provides an overview of a particular lesson to a user.

FIG. 14 depicts an interface 1400 for an overview of a particular lesson 1402 (e.g., Weighing and measuring: Proper use of the electronic scale (from FIG. 9)) within an exemplary course (e.g., Your Chemex and You (from FIG. 10)). As shown in this figure, the overview contains a description of the lesson 1404 and shows indicia 1406 that indicate activities (e.g., play the video, go to the discussion board, etc.) that make up part of the lesson.

System Modules

Various aspects of the system's functionality may be executed by certain system modules, including an activity Management Module 300, a Multimedia Activity Mapping Module 400, a Sentiment Scoring Module 500, a Multimedia Activity Management Module 600, or Multimedia Branching Module 700. These modules are discussed in greater detail below. Although these modules are presented as a series of steps, it should be understood in light of this disclosure that various embodiments of the modules described herein may perform the steps described below in an order other than in which they are presented. In still other embodiments, the module may omit certain steps described below. In various other embodiments, the module described herein may perform steps in addition to those described in the various system modules.

Activity Management Module

Providing a First Graphical User Interface to a User on a Client Device

Figure 15:
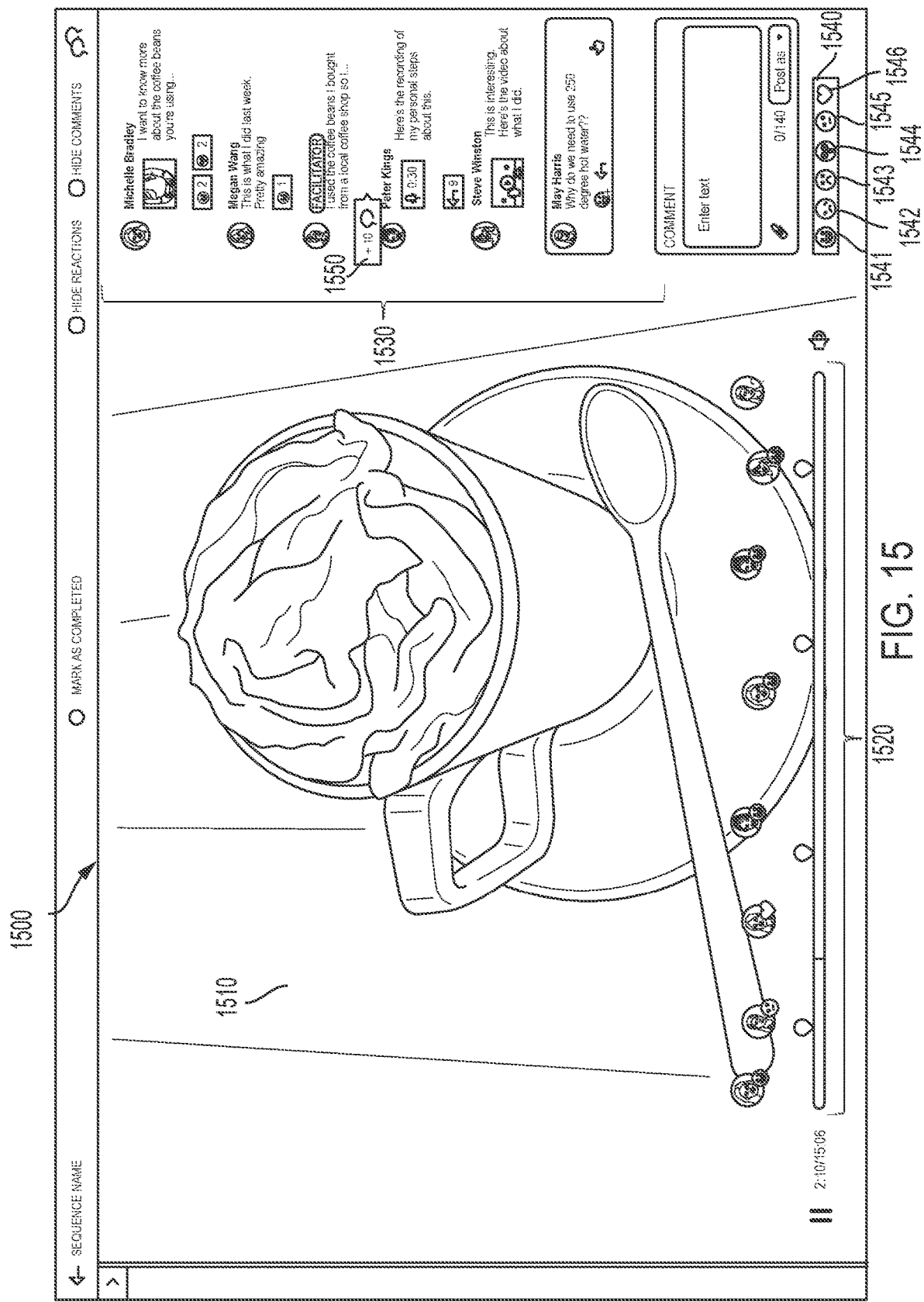
FIGS. 15-23B depict exemplary screen displays and GUIs according to various embodiments of the system, which may display and enable users to view and provide activities and/or reactions to multimedia content presented to the user where the system and the user are enabled to modify the activities and/or reactions presented to the user.

In particular embodiments, when executing the Activity Management Module 300, the system begins, at Step 310, by providing a first graphical user interface (e.g., graphical user interface 1500 (FIG. 15)) to a user (e.g., a first viewer) on a client device (e.g., the one or more remote computing devices 130). In various embodiments and referring to FIG. 15, the graphical user interface 1500 may comprise a media player 1510 for playing the multimedia content, a segment display 1520 (e.g., a first segment display) for displaying a representation of each one of the one or more segments of the multimedia content (e.g., a time line for video or audio content, location information for documents, etc.) and a conversation area 1530 for displaying activities that are part of the conversation.

In various embodiments, the graphical user interface 1500 may be part of a client application that runs on the client device 130. In other embodiments, the graphical user interface 1500 may be a client-server software application in which the graphical user interface runs in a web browser. In still other embodiments, the graphical user interface 1500 may be a browser plugin that acts as an add-on to a web browser and gives the browser additional functionality.

In particular embodiments where the activity management system 100 manages activities related to third party multimedia content (e.g., YouTube® videos, etc.), the graphical user interface 1500 may by in the form of browser plugin that creates a graphical user interface overlay for a webpage so that multimedia can be played by a third party media player, where the graphical user interface containing the segment display 1520, the conversation area 1530 and other features of the graphical user interface 1500 overlay on the third party media player. In these embodiments, the segment display 1520 contains representations of segments that are related to (e.g., the same as) the native segmenting of the third party multimedia content. Continuing with the YouTube® video example, the segment display contains a segment representation (e.g., a time line display) that matches the time line display of the YouTube® video. In other embodiments, the segment display 1520 may be different as compared to native segment display. For example, the segment display for the graphical user interface may show discrete time period representations of, for example, 5 seconds, while the native time line for the third party multimedia content is shown in tenths of a second segments.

Presenting, at a Second Time that Occurs Before the First Time, a Representation of One or More Activities Received From Other Users In particular embodiments, the system continues to Step 320 at which the system 100 prepopulates the conversation area 1530 and the segment display 1520 with one or more representations of activities that were received by the system prior to the time when the current viewer is viewing the multimedia content. In various embodiments, the one or more activities may comprise an activity made by a prior viewer, one or more comments, one or more questions, one or more discussions, one or more reactions selected from a group of emoticons 1540 consisting of a smiley face 1541 to convey sentiment of agreement, an annoyed face 1542 to convey the sentiment of disagreement, a sad face 1543 to convey the sentiment of dislike, a surprised face 1544 to convey the sentiment of surprise, a confused faced 1545 to convey the sentiment of confusion, and a heart 1546 to convey the sentiment of liking something, one or more replies, one or more discussions, or any other suitable communications that can be part of a conversation. It should be understood that the reactions are predefined activities that the viewer may select and submit while watching the multimedia content.

Figure 16:
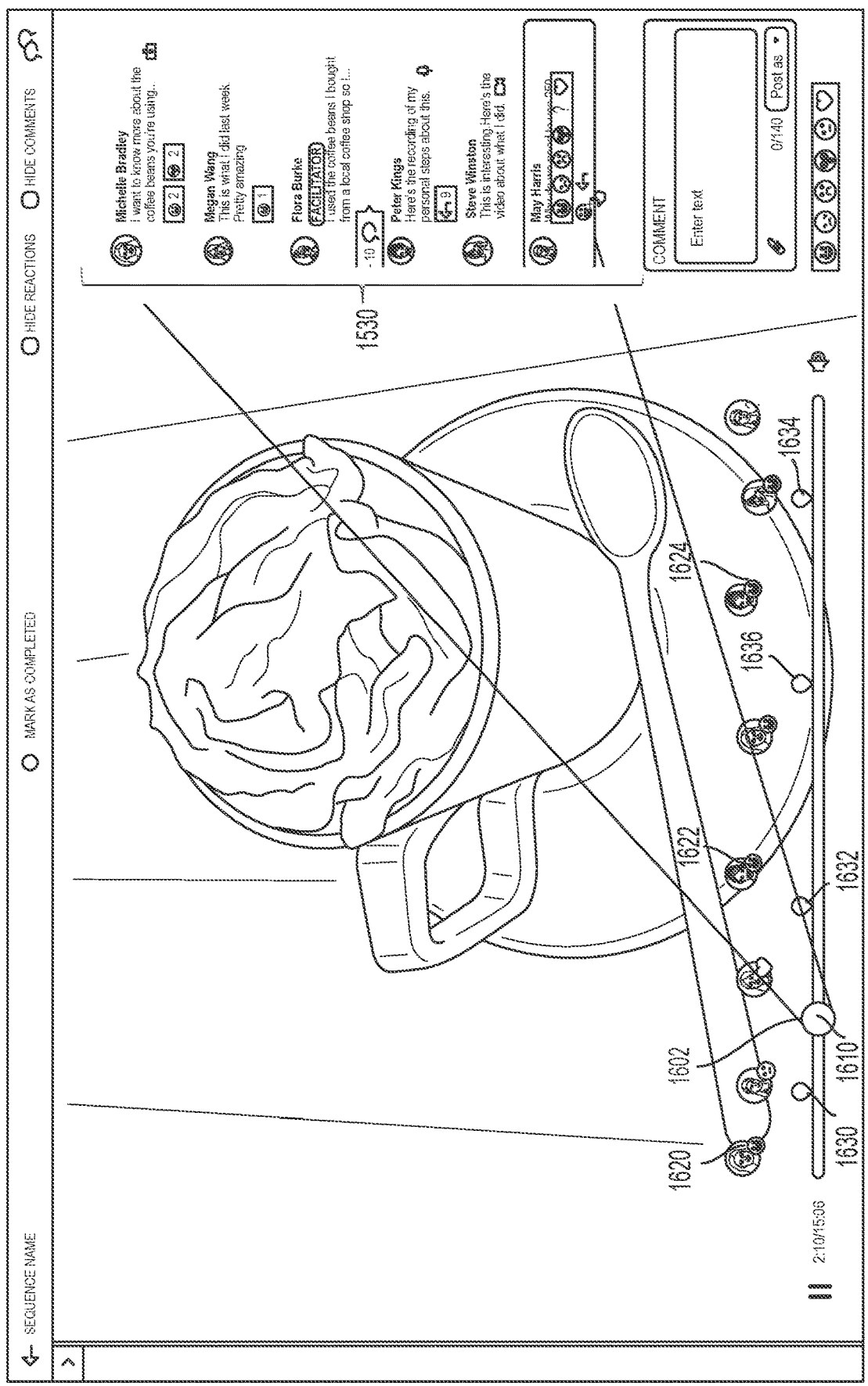

In various embodiments, and referring to FIG. 16, the activities that are displayed in the conversation area 1530 are associated with one or more segments of the multimedia content that is being displayed, was previously displayed or is about to be displayed, as indicated on the segment display at point 1610. That is, the conversation area 1530 may be populated with prior activities (e.g., comments and/or reactions) that were received by other viewers as the current viewer consumes the multimedia content so that the current viewer can view activities that are related to one or more segments of the multimedia content that were just viewed, being viewed or about to be viewed. It should be understood that the activities populating in the conversation area 1530 may comprise one or more activities selected from a group consisting of comments, questions, replies to comments, replies to questions, and reactions to comments, questions and/or replies.

Additionally, in various embodiments, representations of reactions 1622, 1624, among others, that were submitted by prior viewers are displayed along the timeline proximate to a respective segment of the display segment that corresponds to the segment of the multimedia content that was being displayed when the prior viewer submitted the reaction. In addition to a representation of the reaction, the system may be configured to display an avatar associated with the viewer who submitted the reaction. The avatar may include a picture of the viewer or any other representation associated with the viewer. Finally, discussions that are associated with the multimedia content are displayed by representations 1630, 1632, 1634, and 1636 at points on the segment display that correspond to (electronically linked) segments of the multimedia content associated with the discussions.

Receiving, at a First Time that Occurs After the Second Time, an Activity From the Current Viewer of the Multimedia Content The system 100 continues at Step 330 by receiving, at a first time that occurs after a second time, an activity (e.g., the first activity) from the current viewer (e.g., the first viewer) of the multimedia content. In various embodiments, the activity may be an activity to the multimedia content that is currently being viewed by the viewer. In various embodiments, the activity may be a reply to another viewer's comment, an activity submitted as part of a discussion, a question, a reaction to the multimedia content, a reaction to another viewer's activity, a reaction to another viewer's reply, or any other suitable communication.

For example and referring to FIG. 17A, in various embodiments, the viewer may submit a reaction to the segment of the multimedia content that they are currently viewing by selecting a reaction emoticon from a group of emoticons 1540. For example, if the viewer likes the message that is being conveyed by the currently viewed segment of the multimedia content, the viewer selects the heart reaction emoticon 1546, and a representation 1710 of the heart is associated with a segment in the segment display 1520 associated with current segment of multimedia content being viewed. In addition to the representation of the reaction 1710, an avatar 1720 may also be displayed so that the next viewer can easily identify the viewer associated with a reaction.

Figure 17B:
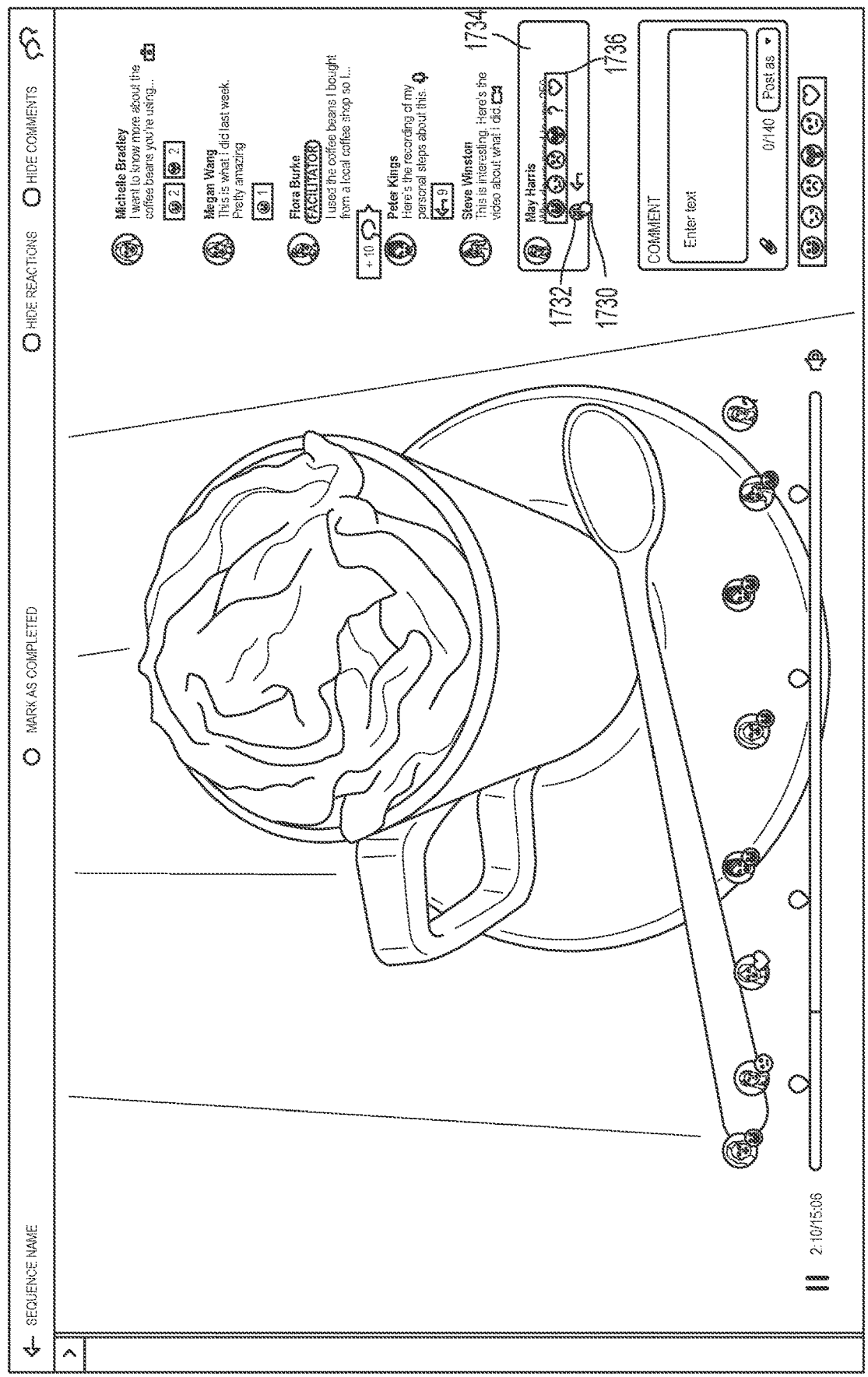
Figure 17C:
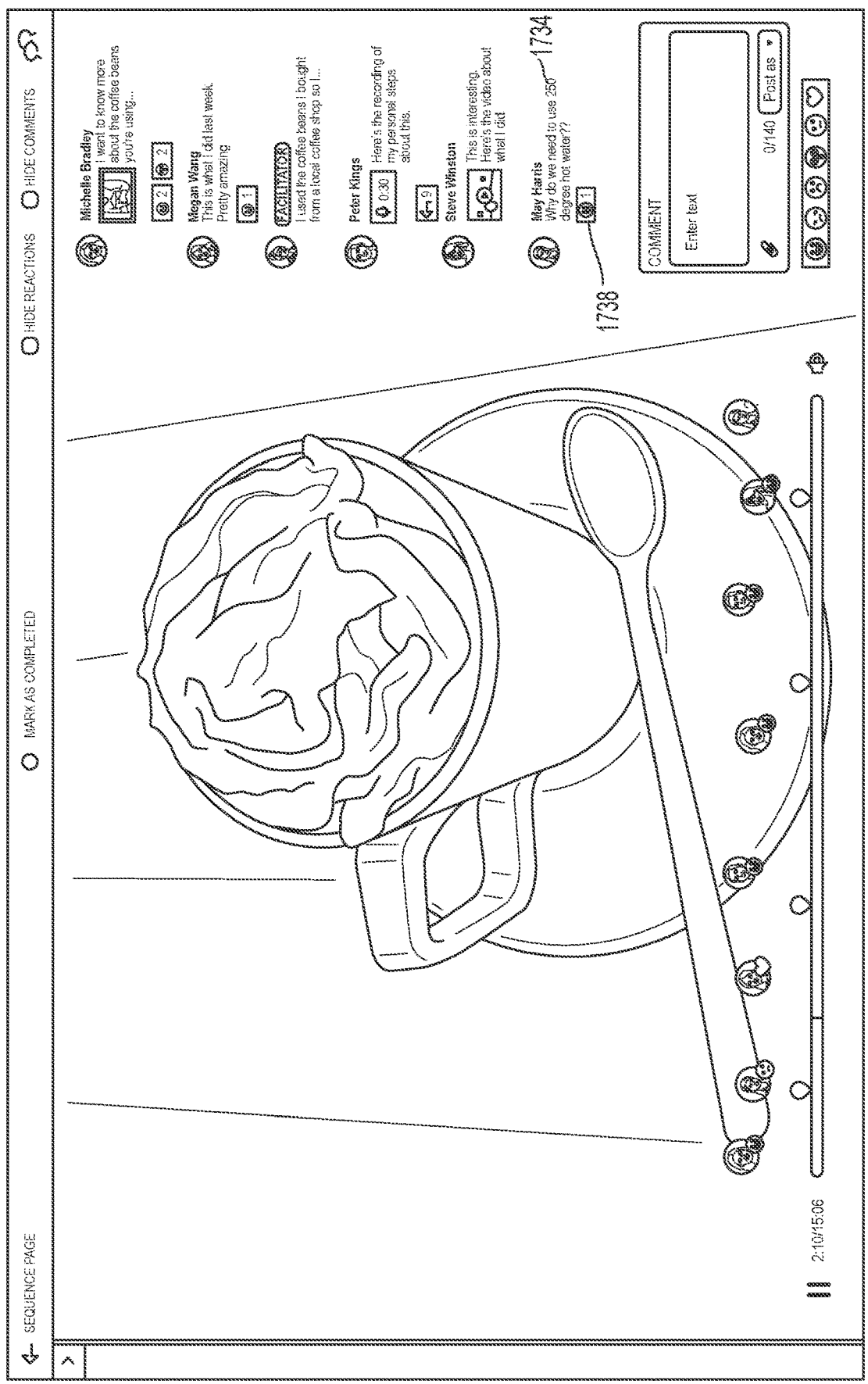

If, instead, the viewer wants to submit a reaction to an activity that was made by a prior viewer, referring to FIG. 17B, the viewer can hover a cursor 1730 over a reaction icon 1732 associated with an activity 1734, which causes a reaction menu 1736 to be displayed. The viewer may then select a reaction emoticon to submit a reaction in response to a prior viewer's comment. Referring to FIG. 17C, a representation of a reaction 1738 is then associated with the comment.

Figure 18A:
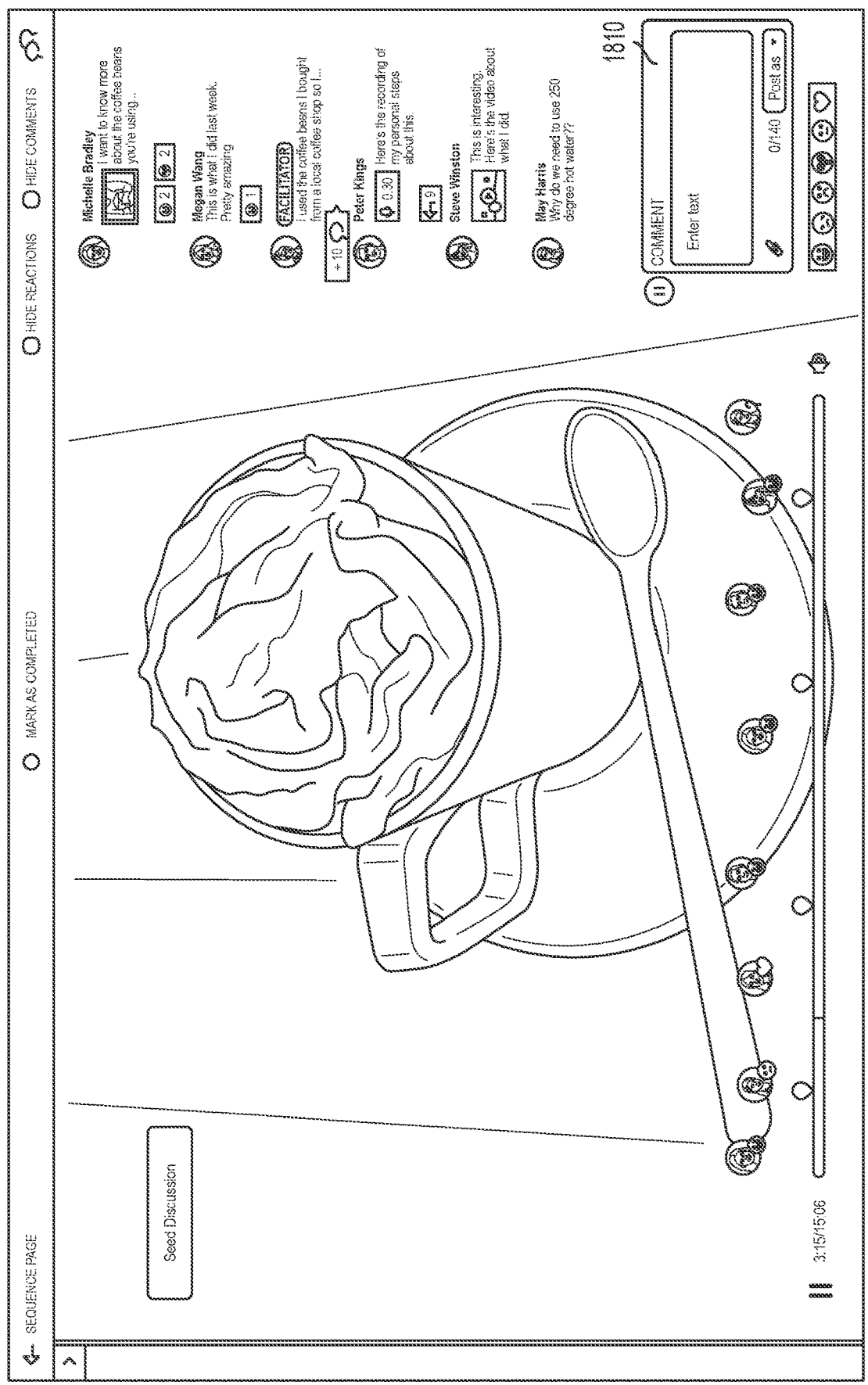
Figure 18B:
Figure 18C:
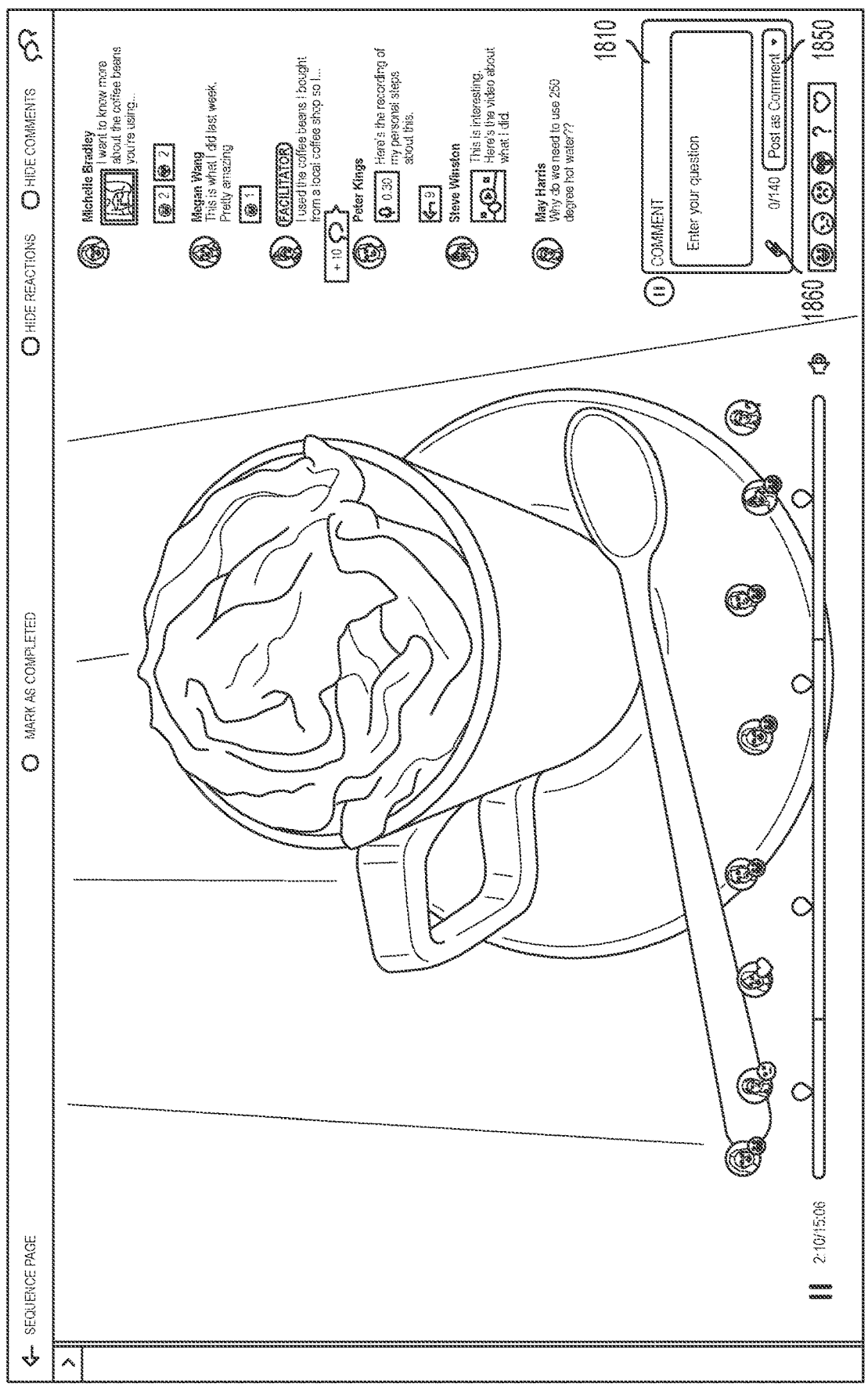
Figure 18D:
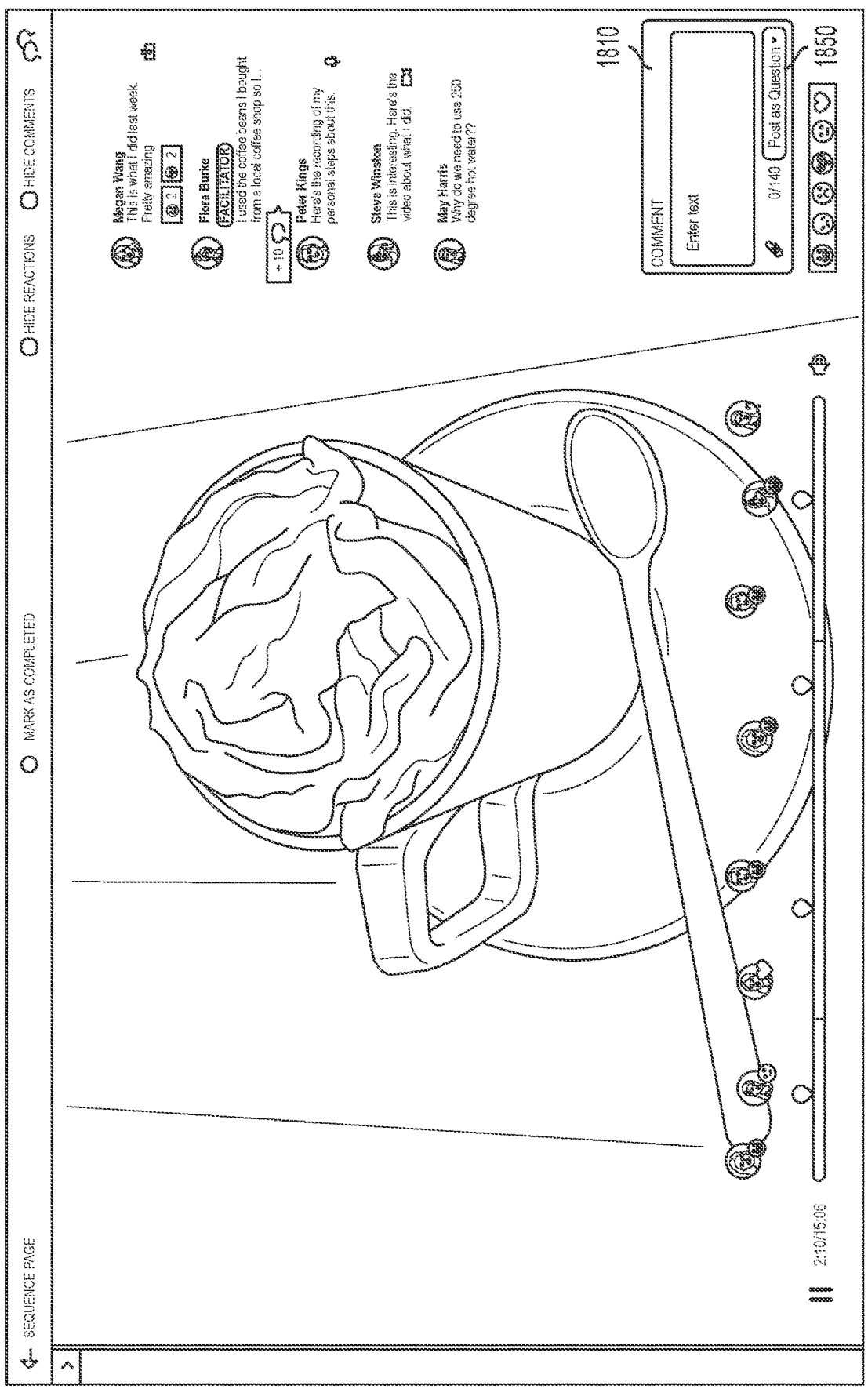
Figure 18E:
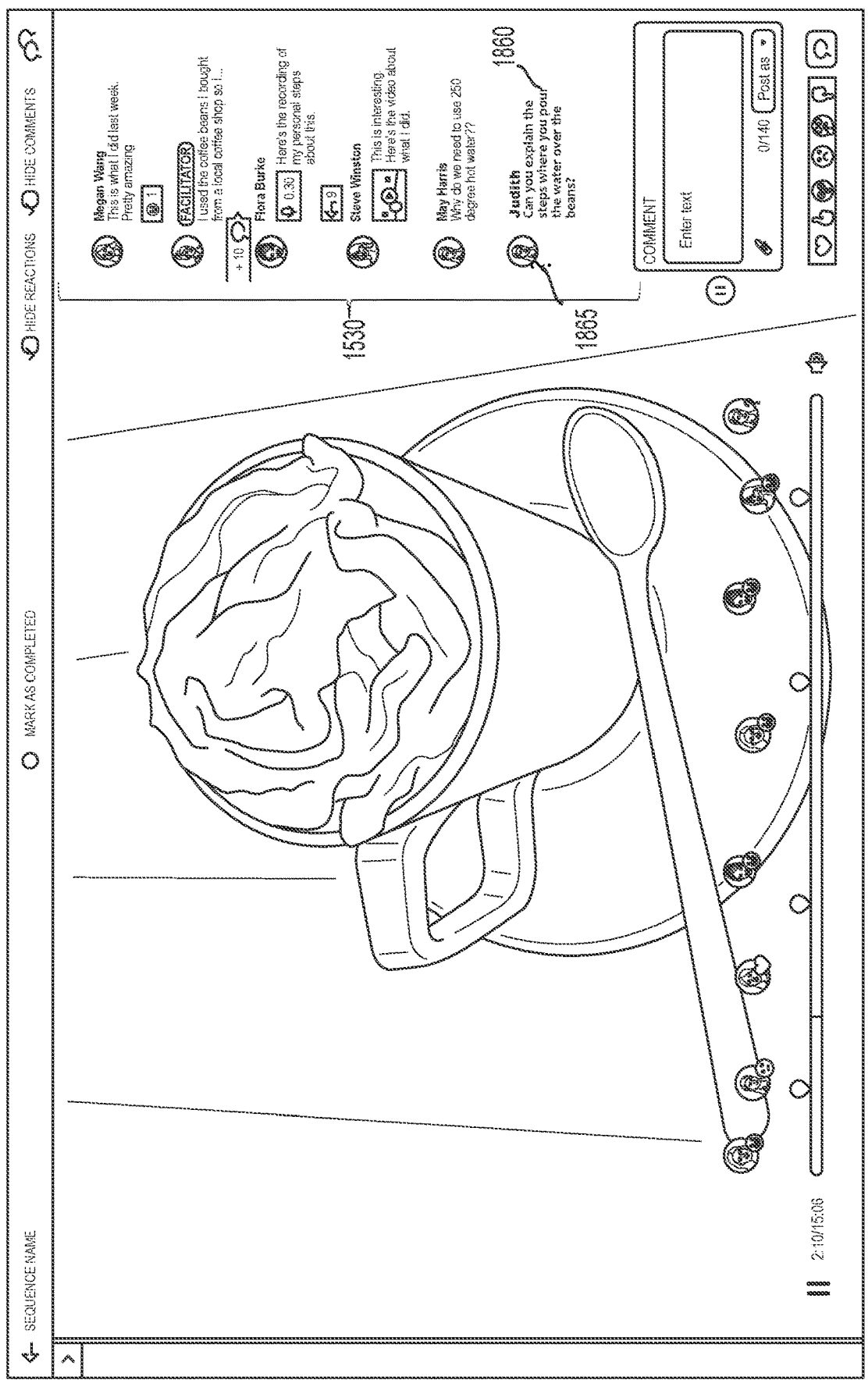

Referring to FIG. 18A, the user can submit an comment, question or reply to a prior comment or question by activating the comment box 1810 by clicking on it. Referring to FIG. 18B, the viewer selects, using a dropdown menu 1820 whether the comment being submitted is a question or an comment by selecting a question menu selection 1830 or an comment menu selection 1840. Referring to FIG. 18C, if the viewer selects the activity menu selection 1840, the submission button 1850 indicates that, by selecting the submission button, the text will be submitted as an comment associated with the multimedia content currently being viewed. In the alternative and referring to FIG. 18D, if the viewer instead selected the question menu selection 1830, the submission button 1850 would indicate that, by selecting the submission button the text would be submitted as a question associated with the multimedia content currently being viewed. Moreover and referring to FIG. 18E, the submitted question 1860 would be added to the conversation area 1530 and the question may also comprise an indicia 1865 that makes it easy to recognize questions when a viewer scans the comments in the conversation area 1530. In alternate embodiments, the system may have a single "post" button and the system may automatically parse comment and reply text and mark any comment or reply that includes a "?" as a question. In this way, the viewer will not be required to select between an comment or question since the system automatically determines which comments are questions.

Figure 19A:
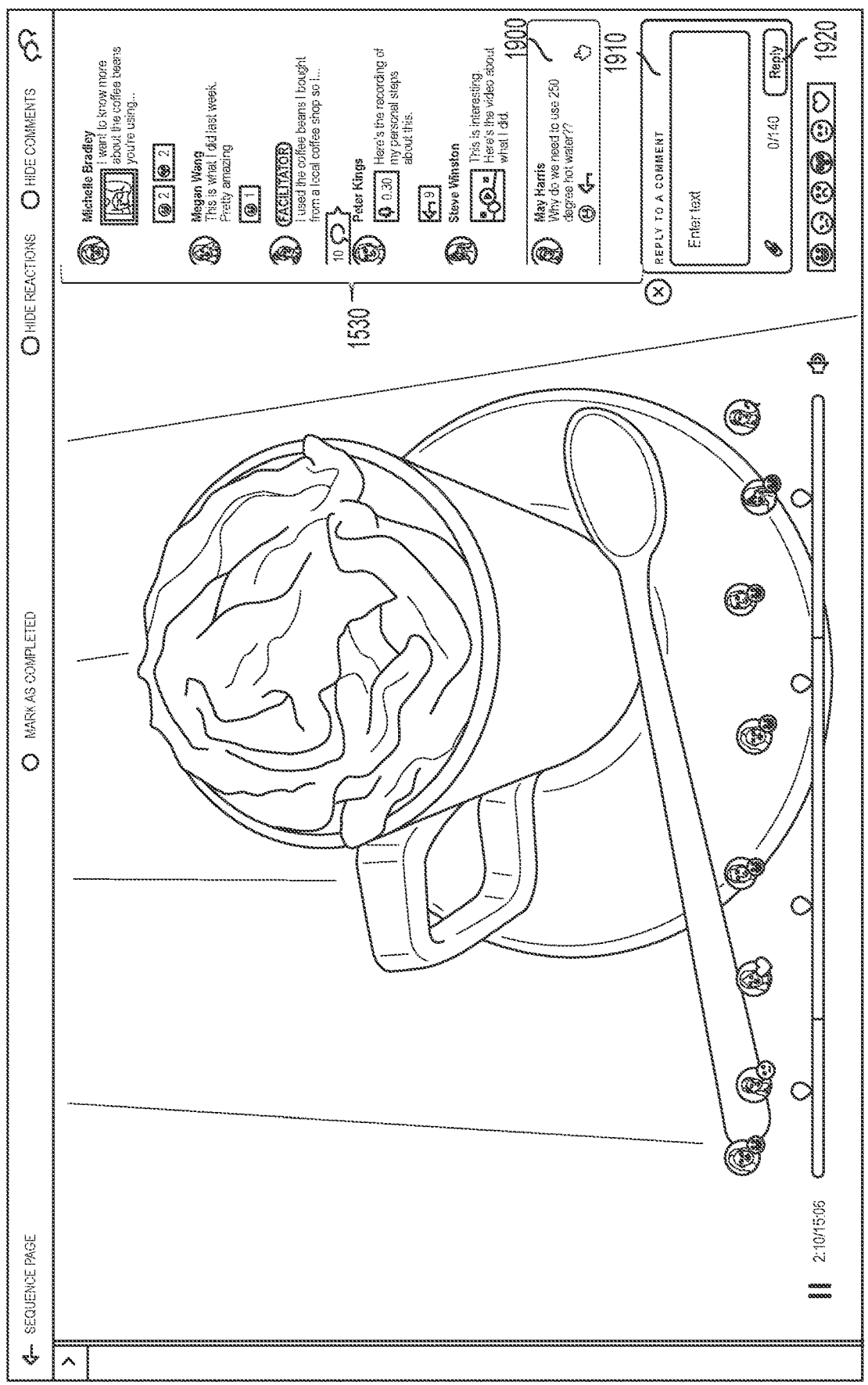
Figure 19B:
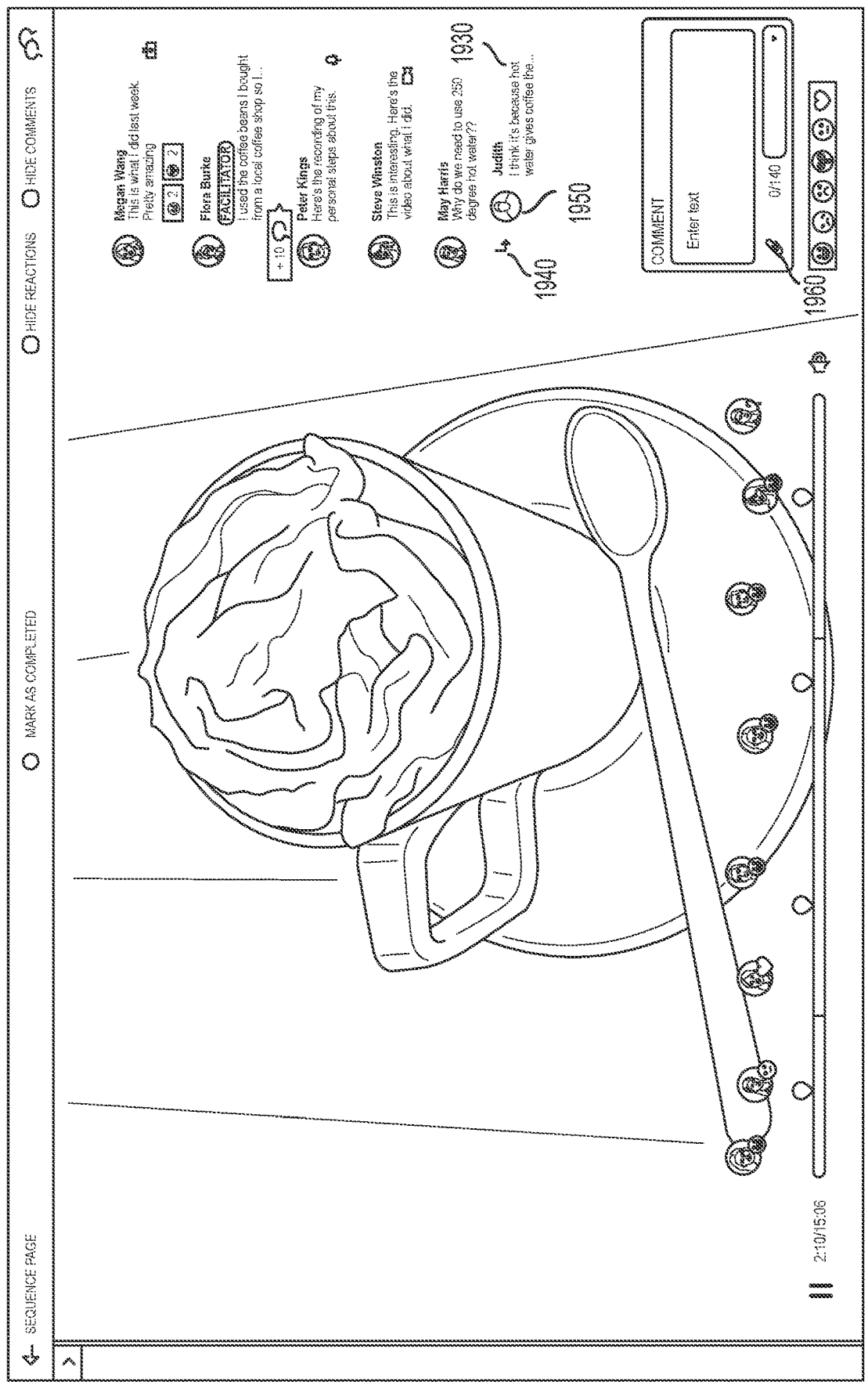
Figure 20A:
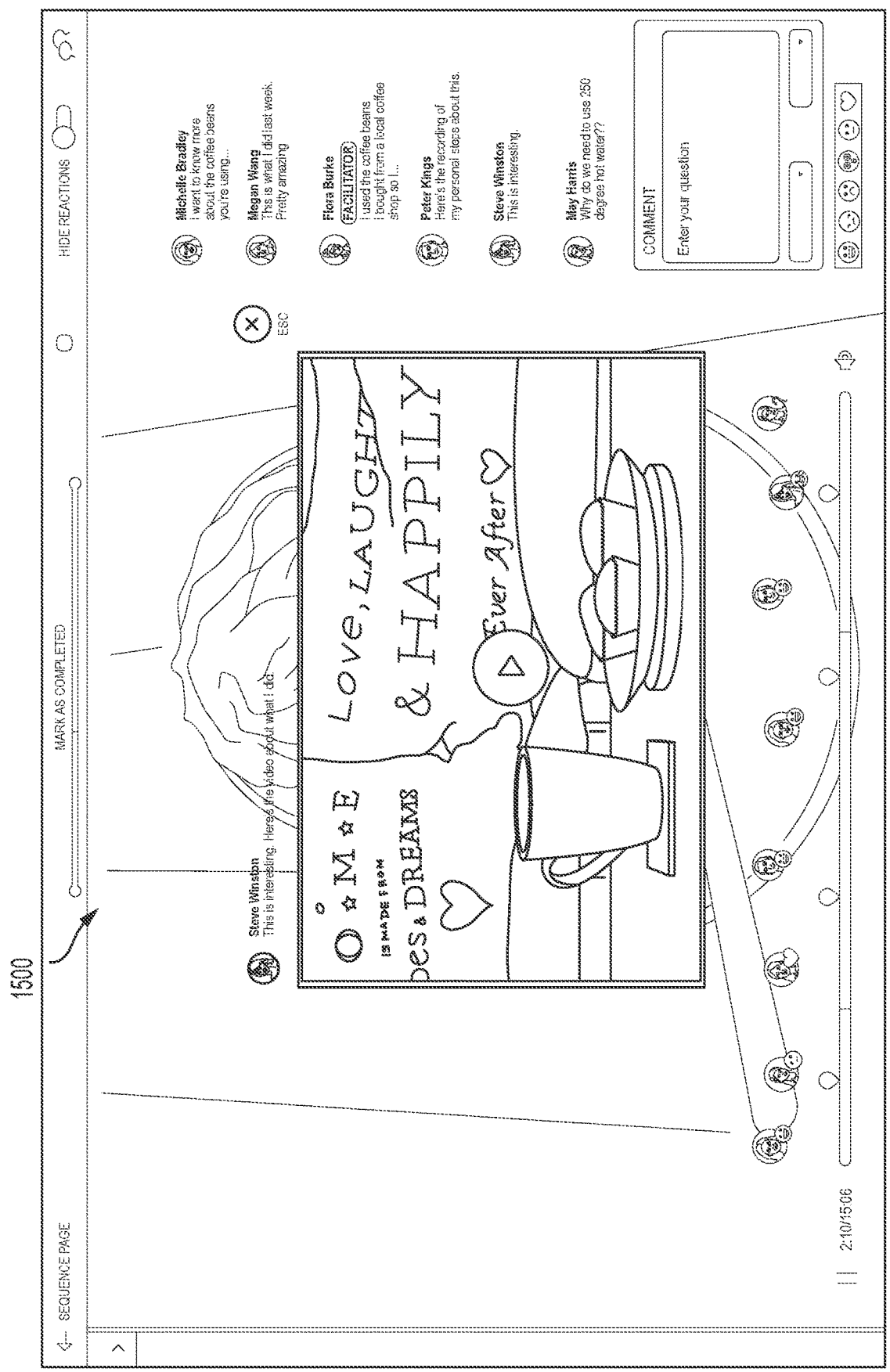
Figure 20B:
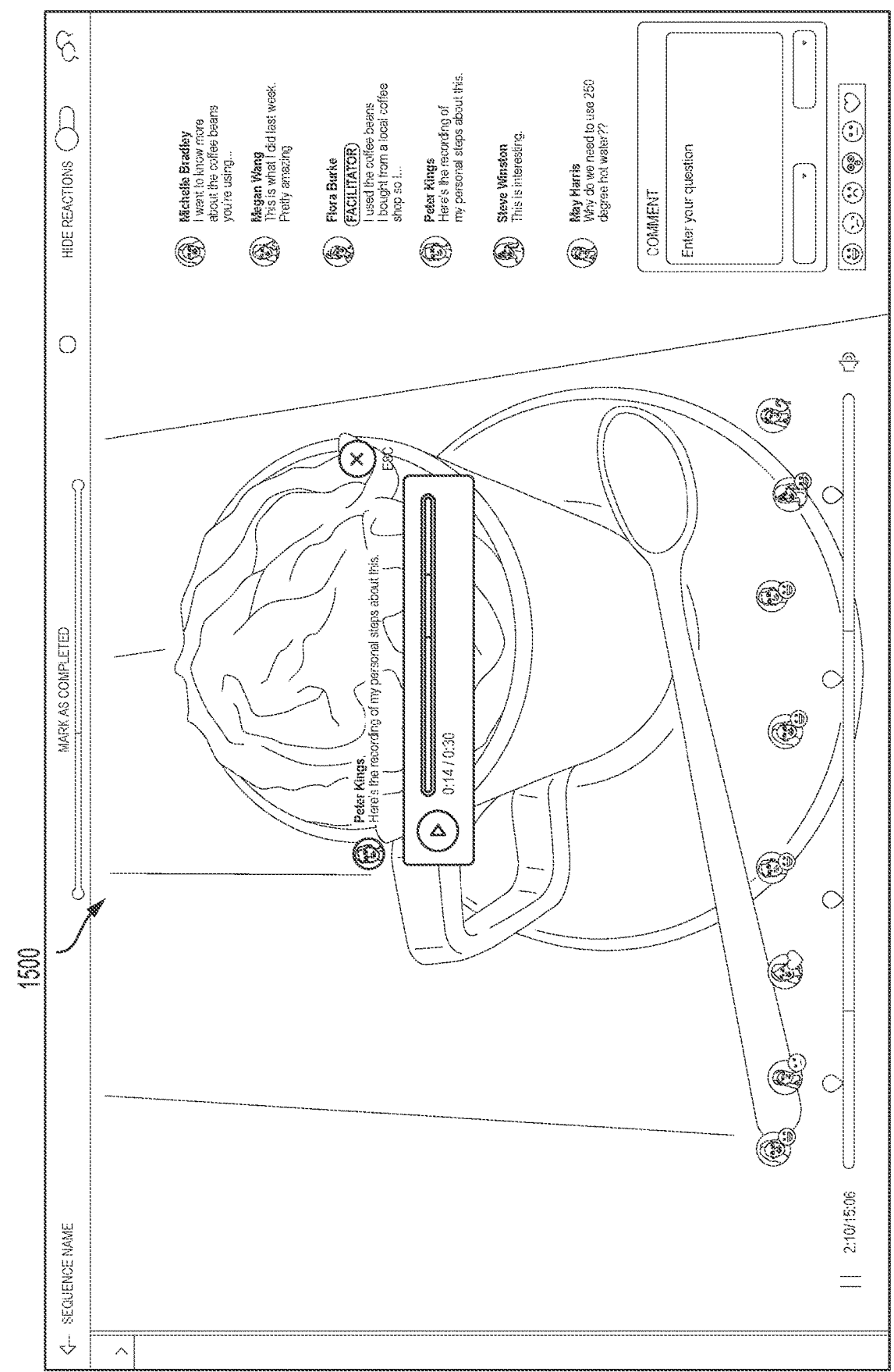

Should the viewer wish to submit a reply as an comment to a prior viewer's comment, question or reply, referring to FIGS. 19A and 19B, the viewer only need to select the comment, question or reply that they wish to reply to (e.g., comment 1900) from the conversation area 1530, which cause the comment box 1910 to become active and the submission button 1920 to indicate that selecting the submission button would submit a reply to the selected comment 1900. The viewer next types the text of the reply in the comment box 1910 and submits the reply. Referring particularly to FIG. 19B, after selecting the submission button 1920, the reply comment 1930 is displayed in the conversation area with an indicia 1940 to indicate that the submitted comment is a reply to another comment. The reply may also contain an avatar 1950 for the viewer that submitted the reply.

In various embodiments and referring to FIGS. 18C, 18D, 18E, 19A and 20A-20B, when the viewer is posting an activity (e.g., a comment, question or reply) to a prior activity (e.g., an comment, question or reply) from another viewer, the viewer may enter free form text. In addition to the free form text, the viewer may also attach an audio file, a video file, a document, an image file or any other suitable attachment to their comment by selecting an attachment button 1860 and 1960, which allows the user to navigate to the file that they wish to attach and attach the file to the activity (e.g., an activity, question or reply). The system 100 will then display the attached file as shown in graphical user interface 1500 presented in FIGS. 20A and 20B.

Figure 21A:
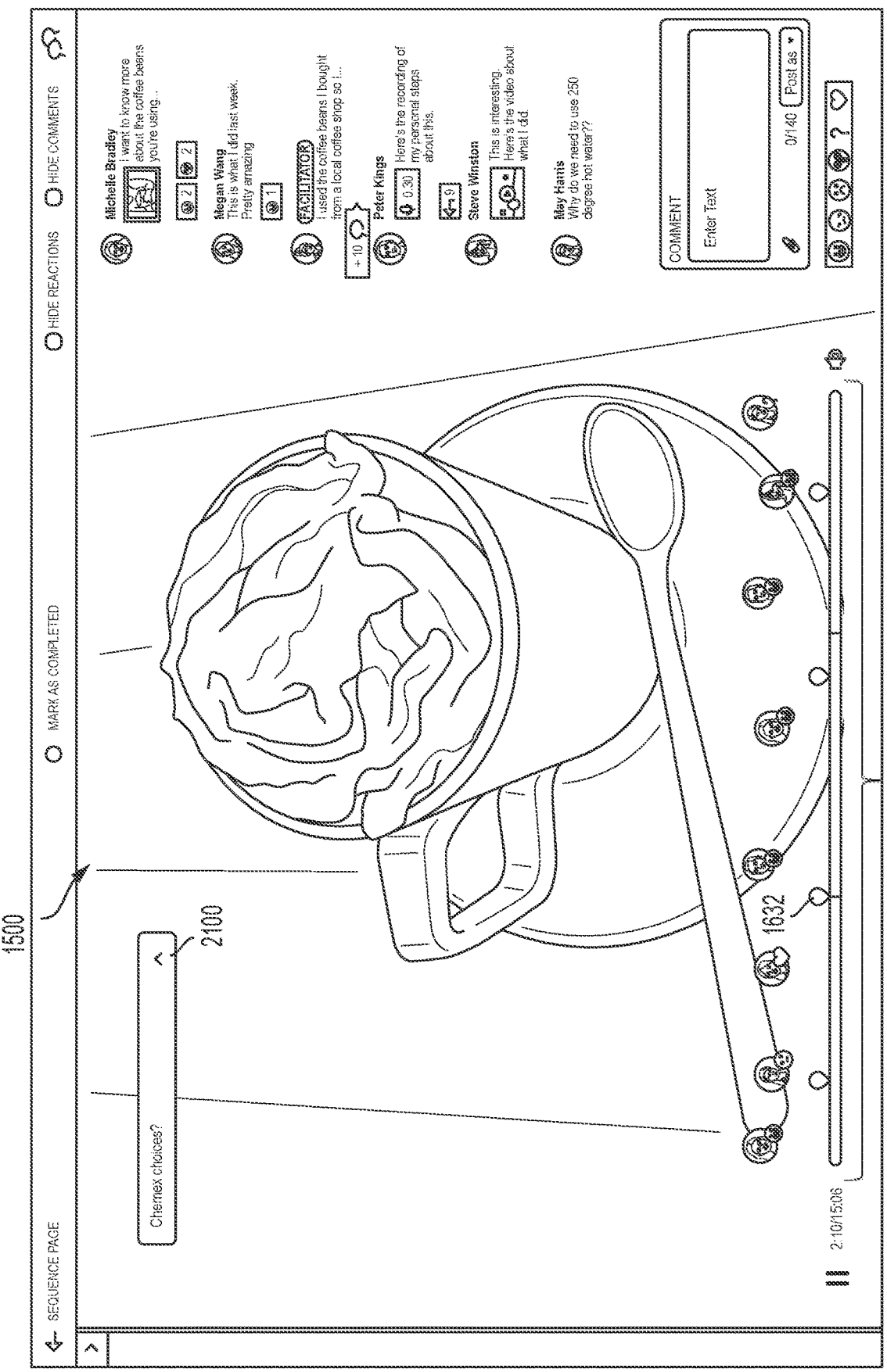
Figure 21B:
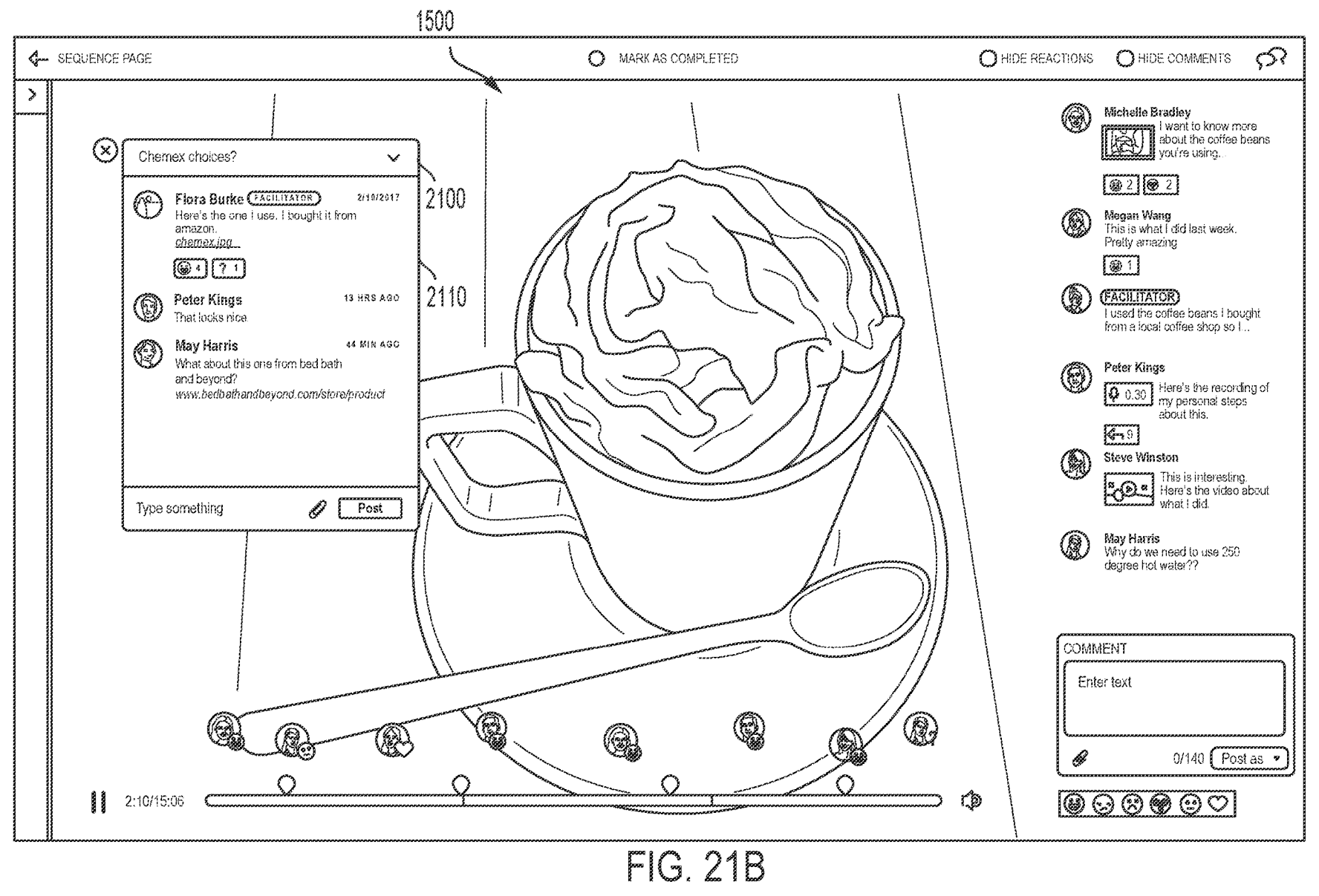

Referring to FIGS. 21A and 21B when the current segment of the multimedia content being displayed is electronically linked with a representation 1632 for a discussion associated with the segment display 1520, a discussion indicator 2100 is shown in the graphical user interface 1500. In various embodiments, the discussion indicator 2100 is shown in a collapsed orientation (FIG. 21A) to maximize the viewers view of the multimedia content. Thus, if the viewer wishes to read or view the activities in the discussion, the viewer can select the discussion indicator, which will cause the discussion conversation area 2110 to be displayed. The discussion conversation area 2110 functions similarly to the conversation area 1530 (FIG. 15) as described with reference to FIGS. 18A-20B.

Figure 22A:
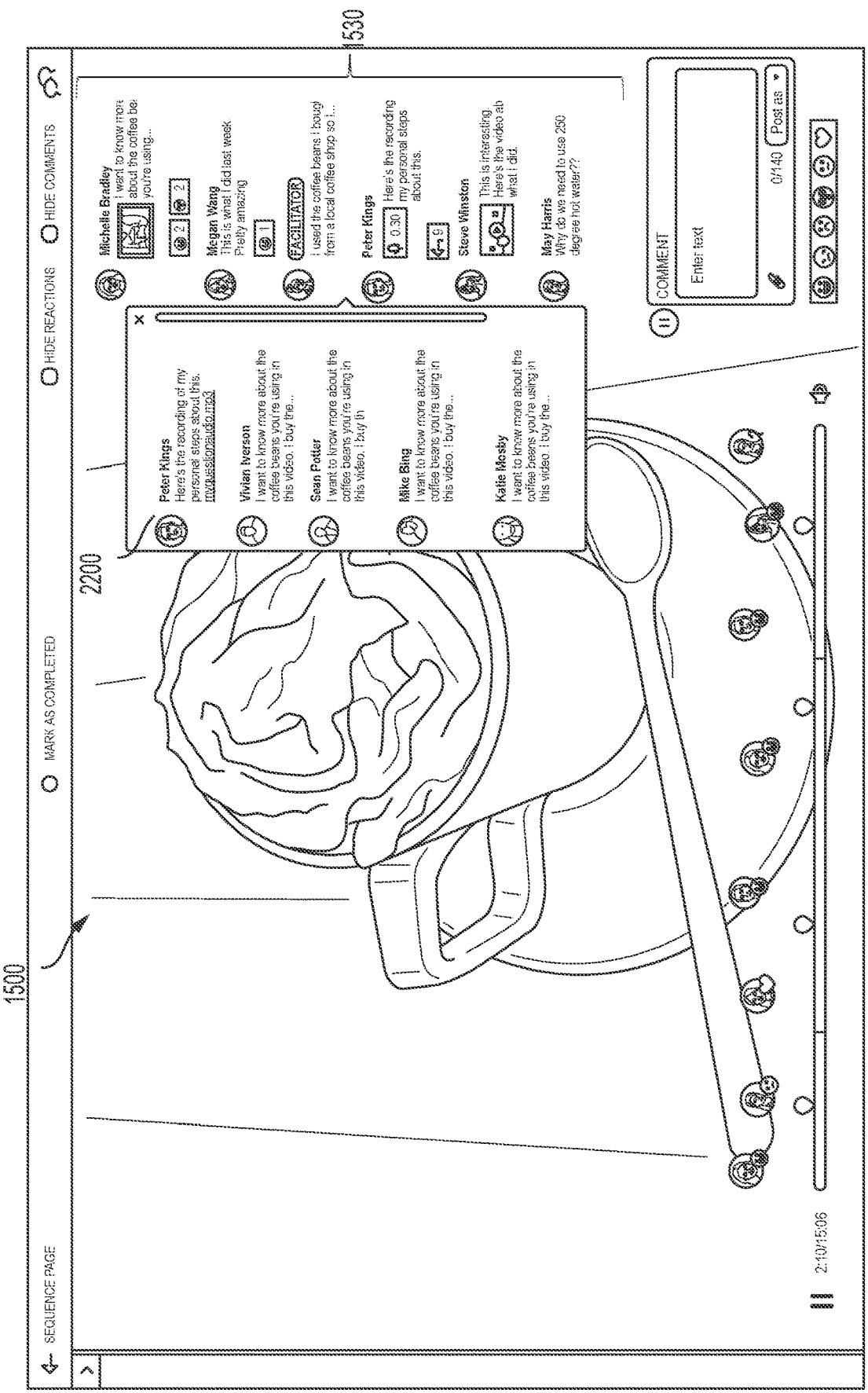
Figure 22B:
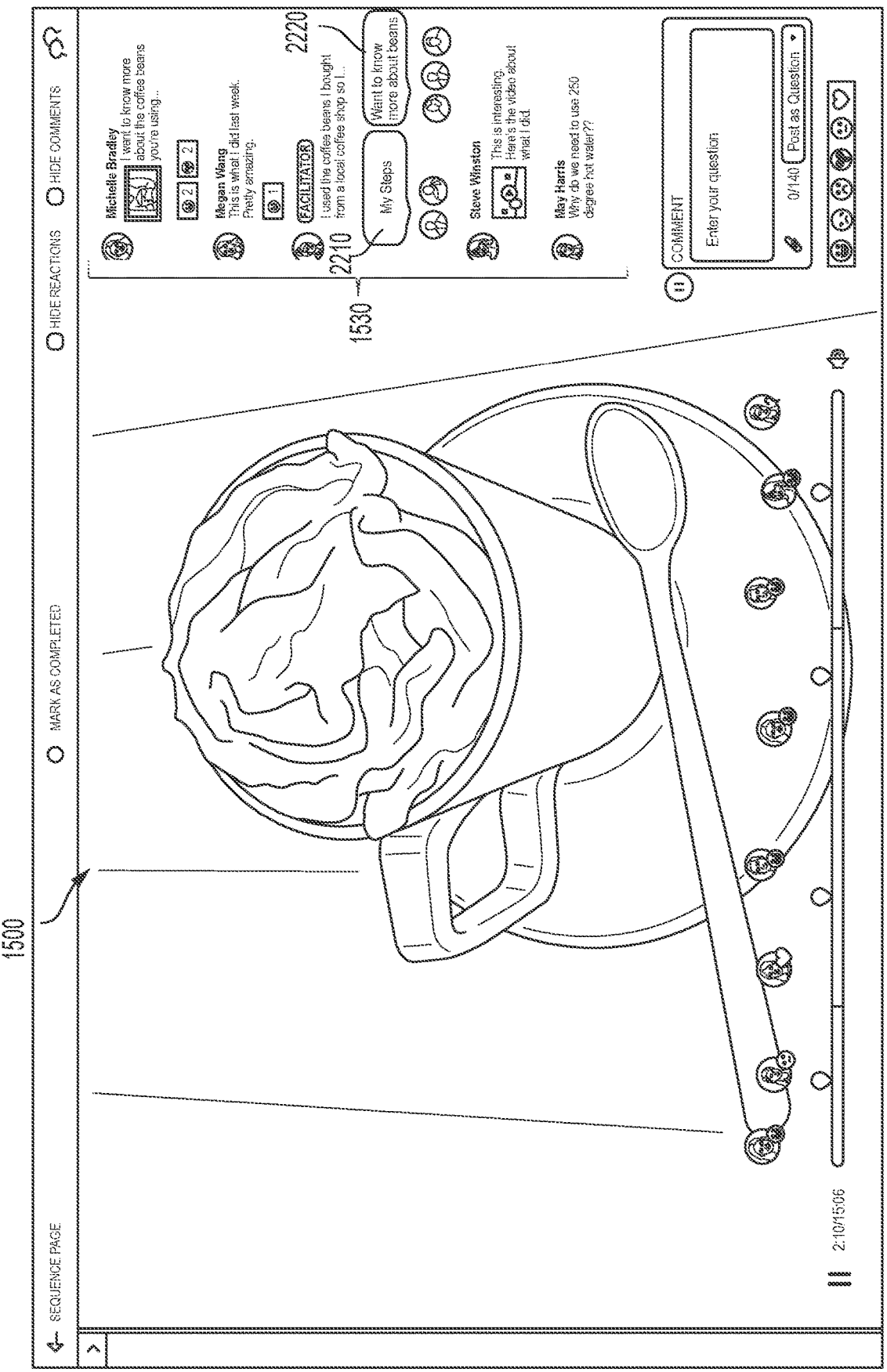

Referring to FIGS. 22A-22B, the conversation area 1530 can become congested based on the number of activities (e.g., comments, questions, replies and reactions) that are submitted by viewers. Moreover, depending on the multimedia content, the number of viewers whose activities are included in the conversation area can vary depending on whether the activities are limited by group, organization, a private group, the public, etc. In various embodiments the Activity Management System 100 can be configured to minimize congestion across the graphical user interface 1500. In various embodiments, the Activity Management System 100 may be configured to collapse multiple activities (e.g., hide) to minimize the number of activities that are displayed to the viewer. For example, a hidden activity indicia 1550 (FIG. 15) can be displayed where multiple activities are hidden. Therefore, should the viewer wish to view the hidden activities, the viewer merely clicks the hidden activity indicia 1550 using a mouse or touch screen and a hidden activity display window 2200 opens to display the activities that were hidden.

In other embodiments and referring to FIG. 22B, the Activity Management System 100 may be configured to minimize the number of displayed activities associated with one or more segments of the multimedia content by analyzing the text associated with the activities (e.g., comments, questions and/or replies) for the respective one or more segments and identifying the activities that contain similar subject matter. In preferred embodiments, those activity having similar subject matter can be grouped and replaced with an indicia 2210, 2220 (e.g., a cloud bubble) that contains a summary of the subject matter of the grouped activities. In this way, the number of displayed activities in the conversation area 1530 is minimized while still providing the viewer the ability to examine all of the activities associated with the one or more segments of the multimedia content. That is, if the viewer was interested in the steps that other viewers are using to weigh the bean, the viewer can click on the indicia 2210 labeled "my steps" and all of the hidden activities with similar subject matter would be displayed to the viewer. Furthermore, multiple avatars for viewer's comments that are hidden by the comment indicia 2210, 2220 may also be displayed adjacent the indicia.

In other embodiments, the Activity Management System 100 may be configured to allow the viewer to only view activities from particular viewers that are associated with the viewer. For example, the Activity Management System 100 may only show activities from viewers that are in the same group as the viewer, activities from other viewers that are in the viewers contact list, activities from other viewers that are associated with the viewer through a social media platform (e.g., friends on Facebook®, a connection on LinkedIn®, etc.) and/or other viewers that the viewer manually sets up using the settings in the viewer's profile for the Activity Management System 100. It should be understood that activities from particular viewers can be shown or filtered based on any number of suitable characteristics (e.g., keywords, search terms, common interests, etc.) that are manually selected by the user, the organization that the user belongs to, or by any other suitable user of the system.

Figure 23A:
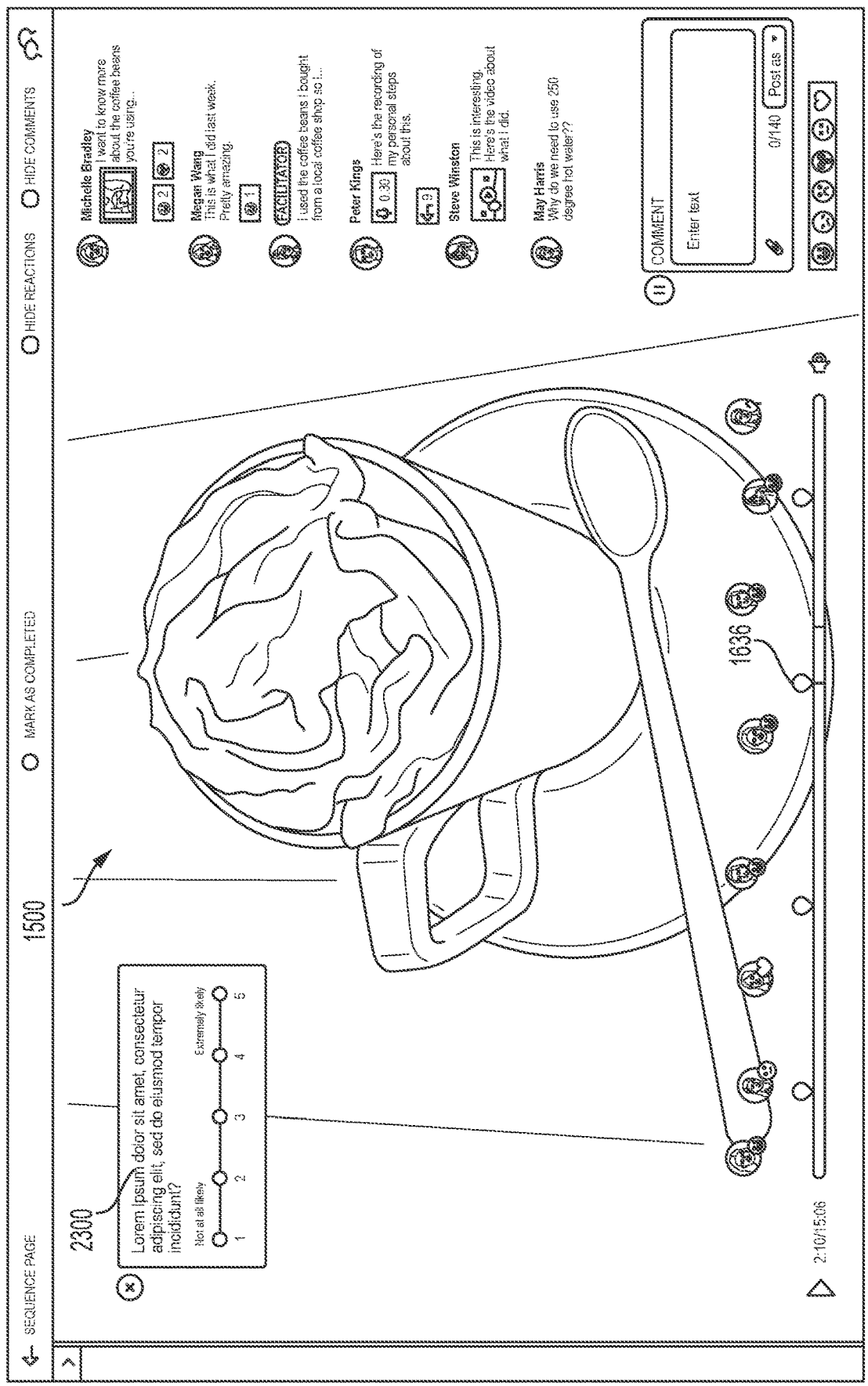
Figure 23B:
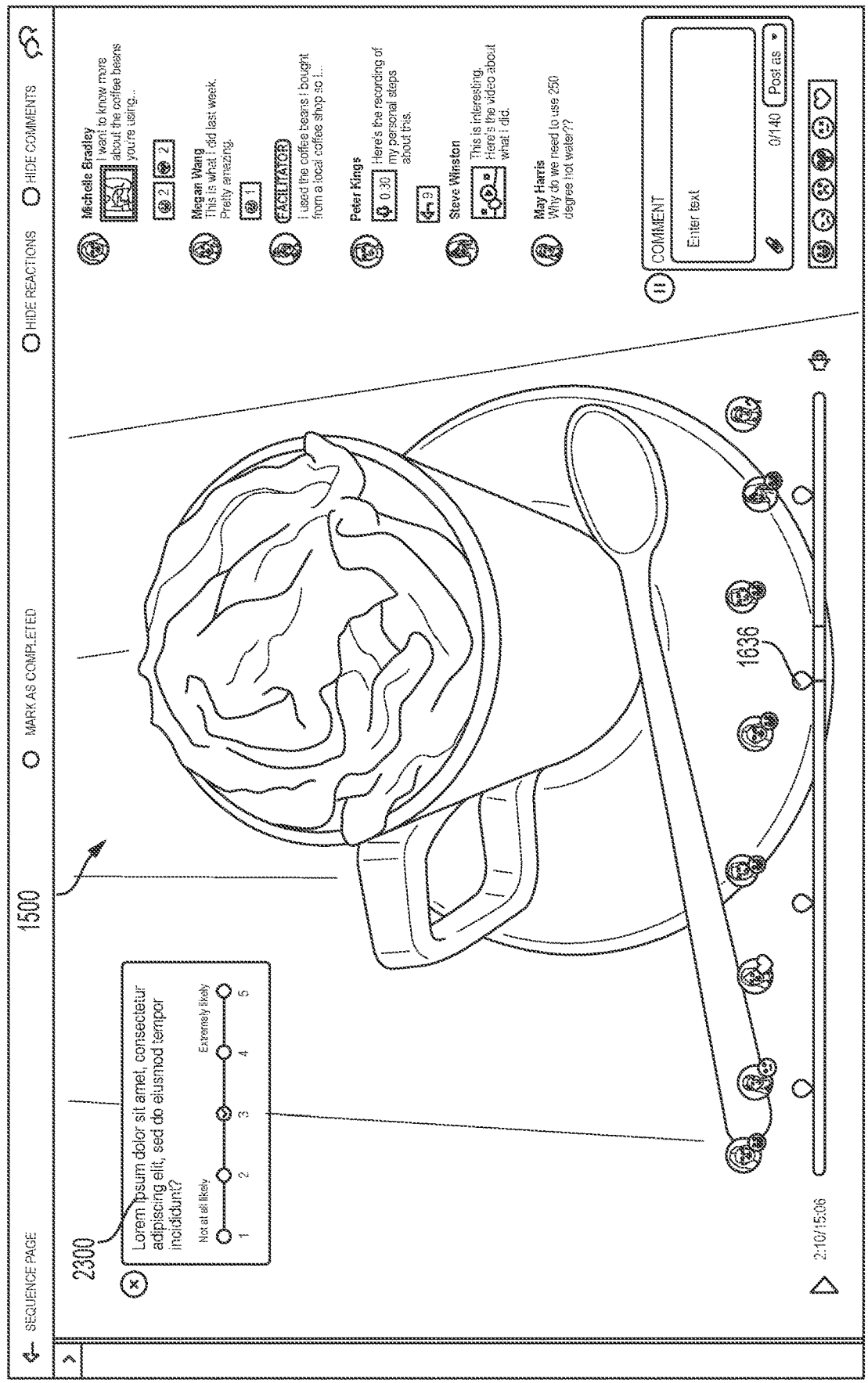

Referring to FIGS. 23A and 23B when the current segment of the multimedia content being displayed is electronically linked with a representation 1636 for a survey question associated with the segment display 1520, a survey question window 2300 is shown in the graphical user interface 1100. In various embodiments, the survey question window 2300 allows the viewer to select a response to the survey. The viewer can mouse over the response choices and click (e.g., select) a particular response that the viewer wishes to respond with to the survey question, as shown in FIG. 23B, where the viewer selected the response "3." Once the viewer submits their response, the viewer can close the survey question window 2300.

In various embodiments, the Activity Management System 100 may be configured to keep playing the multimedia content when the viewer initiates the submission of an activity. For example, when the viewer hovers over the reaction 1710 (FIG. 17A) the multimedia content continues to play (e.g., the video or audio file continues to play, the document or image file continues to be displayed, etc.). In other embodiments, the Activity Management System 100 may be configured to pause the multimedia content when the viewer initiates the submission of an activity (e.g., a comment, question reaction, response to a survey questions, etc.). In this way, the viewer does not get distracted from the multimedia content while submitting an activity. In various embodiments, playing or pausing the multimedia content during submission of an activity, answering a survey question, or during any other conversation activity associated with the system may be set by: (1) the viewer by adjusting the settings associated with the particular viewer, (2) the organization to which the viewer is a member, (3) the facilitator assigned to the multimedia content, or (4) any other user associated with the viewer or the multimedia content.

Electronically Linking the Received First Activity to a First Segment of the Multimedia Content Continuing at Step 340, the system 100 electronically links the received activity (e.g., the first activity) from the viewer to at least a segment of the multimedia content that the viewer was viewing when they submitted the received activity. Furthermore, if the activity was in response to one or more activities submitted by one or more other viewers, the activity may also be electronically linked to the one or more prior activities (e.g., a reply to an comment, a reaction to a prior comment, a reply to a comment in a discussion, etc.). Additionally, the received activity may also be electronically linked to the viewer (e.g., one or more of the identity of the viewer, one or more groups associated with the viewer, one or more organizations associated with the viewer, etc.).

Electronically Linking Received Activities to One or More Segments of Multimedia Content In preferred embodiments, the system 100 may electronically link the received activity to a segment of the multimedia content (e.g., an audio or video file) that was being viewed when the viewer began to enter the received activity. In preferred embodiments, the received activity is electronically linked to the segment of the multimedia content using a unique identifier associated with the multimedia content. In various embodiments, the received activity is electronically linked to the multimedia content using specific segment information for the segment of the multimedia content that was being viewed when the first activity was received. In still other embodiments, the received activity is electronically linked to the multimedia content using both the unique identifier for the multimedia content and segment information for one or more segments of the multimedia content associated with the activity.

In some embodiments, the system 100 may electronically link the received activity to a segment of the multimedia content that is being viewed when the viewer begins to initiate (e.g., begins to type in a comment, hovers over the reaction bar, selects a prior comment, etc.) the activity. In some embodiments, the system may electronically link the received activity to a segment of the multimedia content that is being viewed when the viewer submits (e.g., clicks the submit button, etc.) the received activity. In still other embodiments, the system 100 may electronically link the received activity to one or more segments of the multimedia content that is positioned intermediate the segment of multimedia content being viewed when the viewer initiates the received activity to the segment of multimedia content being viewed when the viewer submits the received activity (e.g., including the first and last segments, not including the first and last segments, only including some of the intermediate segments, including all of the intermediate segments). In some embodiments, the system may electronically link the received activity to a segment of the multimedia content that is prior in time to a segment of the multimedia content being viewed either when the activity was initiated or when the activity was submitted. In this way, the activity gets associated with a segment of the multimedia content that likely motivated the viewer to initiate the activity, which likely passed in time by the time the viewer begins to initiate the submission of the activity.

In particular embodiments, the received activity (e.g., the first activity) may be linked to the multimedia content (e.g., a spatial video file, a document, an image, etc.) based on a location segment of the multimedia content currently being viewed by the viewer (e.g., the first viewer) when the activity was submitted. In some embodiments, the system 100 may electronically link the received activity to one or more location segments associated with the multimedia content based on one or more of an x, y, and z-coordinate system associated with the multimedia content. In other embodiments, the system 100 may electronically link the received activity to one or more location segments associated with the multimedia content based on one or more pages, one or more paragraphs, one or more lines, words, characters, etc. associated with the multimedia content.

Electronically Linking Received Activities to One or More Prior Received Activities (e.g., Reply Comments)

In preferred embodiments, when the received activity (e.g., the first activity) is made in response to another viewer's prior activity (e.g., one or more comments, one or more questions, one or more reactions, one or more replies, one or more of the prior listed activities in a discussion conversation, etc.), the received activity may also be electronically linked to the prior activity, in addition to being linked to the segment of the multimedia associated with the activity. In some embodiments, the received activity may be electronically linked to the prior activity by a unique identifier that is associated with the prior activity. It should be understood that the received activity may be linked to the prior activity in any suitable manner that allows the system 100 to identify all activities that are linked with one another.

Electronically Linking Received Activities to the Viewer Submitting the Activity In various embodiments, the received activity may also be electronically linked to the viewer submitting the activity based on one or more unique identifiers (e.g., a viewer ID no., etc.) associated with the viewer. For example, an activity may be electronically linked with a viewer using a unique identifier assigned to the viewer based on login information submitted by the viewer to system 100. Additionally, when the viewer is viewing the multimedia content as part of a group, the activity may be electronically linked to the viewer by a unique group identifier. Furthermore, if the multimedia content was assigned to the viewer by an organization to which the viewer belongs, the activity may be electronically linked to the viewer by a unique identifier assigned to the organization. In various embodiments where the actual identification of the viewer is not known, but non-personal identifying information is known (e.g., browser cookie information, geographical location information for the viewer, etc.) the non-personal identifying information may be used to electronically link the viewer to the activity.

Creating a First Electronic Record that Comprises One or More of the First Activity, a Multimedia Identifier for the Multimedia Content, a First Viewer Identifier, and a First Segment Identifier for the First Segment, and Digitally Storing the First Electronic Record Continuing at Step 350, the Activity Management System 100 is configured to create an electronic record for the received activity and store the electronic record in the one or more databases 140 (FIG. 1). The electronic record may include one or more of a unique identifier or user identifier, (e.g., one or more of a viewer identifier, a group identifier, an organization identifier, non-personal information associated with the viewer, etc.), a multimedia content identifier, one or more segment and/or location information (e.g., a segment identifier, location coordinates, etc.), the contents of the activity (e.g., text data, a predefined sentiment associated with the activity, an attachment identifier, a copy of the attachment, etc.), an identifier for a prior activity if the received activity is a reply to a prior activity, and any other suitable information that allows the activity to be electronically linked into a conversation associated with the multimedia content being viewed when the activity was made. In various embodiments, the electronic record may include other fields for flag data (e.g., a flag indicating whether notification was sent to prior viewers of the multimedia content that a new activity has been added to the conversation associated with the multimedia content, as further discussed below).

In various embodiments, the electronic records for the activities may all be stored in a single database table. In this way, the system 100, when receiving a request from a viewer to view multimedia content, can search the database table for all records containing the multimedia content identifier. The system 100 may then filter the activities based on any one or more of various information associated with the viewer. For example, if the viewer was assigned the multimedia content by an organization, the system can filter all activities submitted by other viewers that are not part of the organization. If the viewer is part of a group under the organization, then the results of the prior filter can be further filtered by a group identifier so that the conversation presented in conjunction with the multimedia content only contains activities from other viewers that are part of the group. Organizing all of the electronic records for the activities in a single database table helps to expedite the operation of the system 100 since filtering of the electronic records can be accomplished in an efficient manner thereby reducing the number of operations performed by the system in creating electronic records and serving the conversations as the multimedia content is presented to the viewer.

In other embodiments, the electronic records for a conversation may be stored in a database table assigned to a particular course. In this configuration, when a viewer assigned to the course requests a particular multimedia content from the course, all of the activities associated with the particular multimedia content in the course may be served to the graphical user interface as the multimedia content is played for the viewer. While such an arrangement requires more database tables for the received activity, it reduces the time necessary to filter the activities to be served to the user interface. It should be understood to one of skill in the art that the electronic records may be stored in any suitable manner to meet the requirements of various configurations of the Activity Management System 100, all of which are contemplated by the disclosure herein.

Presenting a First Representation of the First Activity on the First Segment Display in Association with a Point on the First Segment Display Corresponding to the First Segment of the Multimedia At Step 360, activities received by the Activity Management System 100 are added to the appropriate point in a conversation associated with multimedia content. For example, in various embodiments when a received activity (e.g., a question, comment or reaction) is associated with the content of the multimedia content being viewed by the viewer, the activity may either be added to the conversation area 1530 (FIG. 15), after the last activity submitted for the segment of the multimedia being viewed by the viewer, or a representation of the activity (e.g., an emoticon reaction, etc.) may be associated with the segment being viewed at a corresponding location on the segment display 1520. In addition, when an activity received (a comment, reaction, etc.) is a reply to a prior activity (e.g., an comment, question, reply, etc.), the activity or representation of the activity is inserted into the conversation area 1530, and an indicium links the new activity to the prior activity. In this way, a synchronous or asynchronous conversation may be created around one or more segments of the multimedia content.

Multimedia Activity Mapping Module

In particular embodiments, a Multimedia Activity Mapping Module 400 is configured to: (1) receive one or more activities from one or more users that view (e.g., are viewing) a particular piece of multimedia (e.g., a video, slideshow, PDF, or other suitable piece of multimedia such as any suitable piece of multimedia described herein); (2) associate each particular activity with a particular segment of the piece of multimedia (e.g., a particular time segment of a video, audio file, slideshow, etc.; a particular location segment on an image, video, document, etc.; or any other suitable segment; (3) store the one or more activities; and (4) display, provide, or otherwise make the one or more activities available to a viewer or consumer of the multimedia that views or consumes the multimedia after the one or more activities was made. In various embodiments, the system is configured to display or provide the one or more activities such that the system displays the one or more activities in association with each respective associated segment of the multimedia while the viewer is viewing the multimedia. In further embodiments, the system is configured to display (e.g., or provide for display), the one or more activities such that the system displays the one or more activities in association with any associated other activities.

In particular embodiments, by electronically linking the one or more activities to a respective segment of the multimedia, the system may enable a more contextual discussion of a particular segment (e.g., timestamp, portion, etc.) of the multimedia, rather than limiting activity and discussion generically to the multimedia as a whole. As may be understood by one skilled in the art, in this way, a particular piece of multimedia may comprise a plurality of activity threads each electronically linked to (e.g., associated with) different segments of the multimedia. In this way, the system may provide different viewers that view or otherwise consume the multimedia at different times with substantially different user-submitted activities depending on, for example: (1) how many comments have been submitted prior to the time at which the viewer is viewing the multimedia; (2) how many responses have been made to those comments; (3) which particular segments of the multimedia those comments have been directed toward, etc. By enabling viewers to provide activities directed toward particular segments of the multimedia and respond directly to activities made by other viewers that relate to particular segments, the system may be configured to simulate to a first user and a second user that are viewing the multimedia in a time-shifted, asynchronous manner (e.g., at different times) that they are viewing the multimedia together and discussing different segments in virtually real time (even though they may be viewing the multimedia at drastically different times).

Although various embodiments of the Multimedia Activity Mapping Module 400 may be described below as relating to a single piece of multimedia, it should be understood that other embodiments may include a plurality of pieces of multimedia, one more pieces of mixed media (e.g., include one or more videos, one or more still images, one or more text files, etc.), or any other suitable combination or media or other content.

Identify a Plurality of Segments that Make Up the Piece of Multimedia

When executing the Multimedia Activity Mapping Module 400, the system begins, at Step 410, by identifying a plurality of segments that make up a piece of multimedia. In various embodiments, the piece of multimedia may comprise, for example: (1) one or more videos; (2) one or more lessons; (3) one or more text files (e.g., such as one or more PDF or other documents; (4) one or more slideshows; (5) one or more presentations; (6) one or more articles; (7) one or more questionnaires; (8) one or more webpages; and/or (9) any other suitable piece of media, content or other item that an individual may view, listen to, read, or otherwise consume or experience (e.g., via one or more of their five senses).

In various embodiments, the plurality of segments comprises a plurality of distinct location segments that make up the piece of multimedia. For example, the piece of multimedia may define a coordinate system that breaks the piece of multimedia into a plurality of discrete location segments that each defines a particular portion of the piece of multimedia. The system may, for example, identify the plurality of segments as comprising a grid of location segments defined by the coordinate system (e.g., with each location segment having an associated row and column number within the grid, having an 'x' and 'y' coordinate within the coordinate system, etc.). In some embodiments, the piece of multimedia comprises a piece of three-dimensional multimedia (e.g., a 3D video). In such embodiments, the plurality of segments may be defined by a three dimensional coordinate system, with each particular location segment having an 'x', 'y', and 'z' coordinate that indicates the particular location segment's location within the piece of multimedia.

As a particular example, a piece of multimedia comprising an image may identify a discrete number of location segments that make up the image such that the image comprises a four segment by four segment grid of location segments (e.g., totally sixteen segments). Each segment may be identified by number, by location (e.g., 1,3), etc.

In various embodiments, each particular location segment may have any suitable shape (e.g., rectangular, square, circular, etc.) and any suitable size (e.g., based on a height and width of the piece of multimedia, based on a resolution of a display of a computing device viewing the multimedia, etc.). In some embodiments, a particular location segment comprises a single pixel on a display screen displaying the multimedia.

In particular embodiments, each particular segment may be defined, for example, by a particular page, column, line, word, letter, sentence, paragraph, section, cell, etc. of a piece of multimedia (e.g., such as a spreadsheet, word processing document, presentation, PDF, etc.). In other embodiments, each particular segment may be defined in any other suitable manner.

In some embodiments, a particular piece of multimedia comprises one or more location segments such that every portion of the particular piece of multimedia comprises (e.g., is associated with) a particular portion of at least one of the one or more location segments. In various embodiments, a particular point on a piece of multimedia may comprise a plurality of location segments. In still other embodiments, at least one portion of the piece of multimedia does not comprise any location segments.

In particular other embodiments, the plurality of segments comprise a plurality of distinct time segments that make up the piece of media content. In various embodiments in which the plurality of segments comprise a plurality of time segments, the piece of multimedia may comprise, for example, a video, audio file, slideshow, or other piece of multimedia having a particular playtime. In some embodiments, each particular time segment may comprise a discrete time segment (e.g., a particular time stamp of the piece of multimedia such as 3:15 for a discrete time segment at 3 minutes, 15 seconds into the piece of multimedia).

In other embodiments in which the plurality of segments comprises a plurality of time segments, each of the plurality of time segments may comprise a particular time slice of the complete runtime of the piece of multimedia. For example, each time segment may define a particular time range of the piece of multimedia. A particular video may, for example, be broken into a plurality of time segments that each includes ten second increments of the video. In the case of a 60 second video, for example, the video would include six ten second time segments spanning from: (1) the 0 second mark to the 10 second mark; (2) the 10 second mark to the 20 second mark; (3) the 20 second mark to the 30 second mark; (4) the 30 second mark to the 40 second mark; (5) the 40 second mark to the 50 second mark; and (6) the 50 second mark to the 60 second mark.

In various embodiments in which the plurality of distinct time segments comprise a plurality of time slice segments, the plurality of time segments may not overlap with any of the other time segments (e.g., a first time segment may end at a time that immediately proceeds the beginning time of the immediate next second time segment). In such embodiments, a beginning and an end time of each particular segment may be determined by a resolution of the multimedia (e.g., a number of frames per second) or a particular precision with which time is delineated within the piece of multimedia (e.g., by the second, millisecond, etc.). In other embodiments, the plurality of time segments may be substantially the same length. In other embodiments, the plurality of time segments may vary in length. For example, in particular embodiments, each particular time segment may coincide with a section, chapter, scene, topic, or other suitable aspect of the piece of multimedia that delineates different portions of the piece of multimedia.

In particular embodiments, the plurality of segments may comprise a plurality of time segments and a plurality of location segments. For example, in particular embodiments, the plurality of segments may include a time segment within a video in addition to a location segment at the particular time segment. In such embodiments, a piece of multimedia may be broken down by a plurality of time segments where each time segment comprises a plurality of respective location segments. As may be understood in the light the above, a particular segment of a plurality of segments may point to both a time (e.g., a timestamp, timeframe, etc.) within a piece of multimedia, as well as a location in or portion of the piece of multimedia. In a particular video, for example, that comprises six ten second time segments, the video may further comprise sixteen location segments (e.g., in a four by four grid). In such an embodiment, the system may be configured to identify both the time and location segments, and associate any activities with one or both of the time and location segments as appropriate. The association of activities with segments (e.g., time and/or location segments) will be discussed more fully below.

In particular embodiments identifying the plurality of segments that make up the piece of multimedia comprise retrieving one or more predefined segments for the piece of multimedia. In particular embodiments, the system is configured to receive a breakdown of the plurality of time segments from a user (e.g., an owner and/or creator of the piece of multimedia, a facilitator of one or more lessons or courses that is utilizing the piece of multimedia in the context of the one or more lessons or course, or any other suitable user). In such embodiments, the system may be configured to store data related to the definition of the plurality of segments in memory and associate the stored data with the piece of multimedia.

In other embodiments, identifying the plurality of segments that make up the piece of multimedia comprises substantially automatically breaking the piece of multimedia into a plurality of segments. In some embodiments, the system is configured to break the piece of multimedia down into the plurality of segments based at least in part on a type of the piece of multimedia. In particular embodiments, for example, the system may be configured to break down video, audio, or slideshow media content into a plurality of time segments. The system may do this based on, for example, a length of the video, audio, number of slides in a slideshow, etc., or any other suitable factor. In other embodiments, for example, the system may be configured to break down video, image, PDF files, articles and other content into a plurality of location segments. The system may break the multimedia into a plurality of location segments based on, for example, one or more dimensions of the piece of multimedia, a resolution of the piece of multimedia, a resolution of a display on which the piece of multimedia is being displayed, and/or any other suitable factor.

Electronically Receive a First Activity at a First Time

Returning to step 420, the system is configured to electronically receive a first activity at a first time. In various embodiments, the system is configured to receive the first activity via any suitable user interface, for example, on a computing device associated with a first user. In some implementations, the first activity may be received via the graphical user interface 1500 shown in FIG. 15. In some embodiments, the system is configured to receive the first activity from the first user. In various embodiments, the system is configured to provide a software application for installation on the computing device. In various embodiments, the software application is configured to display, on the computing device, a user interface for entering one or more activities (e.g., the graphical user interface 1500 shown and described above in the discussion of FIGS. 15-23B). In still other embodiments, the system is configured to receive the first activity from a browser plugin, via a suitable webpage, or in any other suitable manner.

In various embodiments, the system is configured to provide the software plugin or software application via a suitable centralized software application repository (e.g., the Apple App Store, Google Play store, etc.). In still other embodiments, the system is configured to provide the software plugin or software application for download via a suitable website or server. In various embodiments, the system is configured to provide the software plugin for installation on any suitable computing device (e.g., desktop computer, laptop computer, smartphone, tablet, etc.). In various embodiments, the software plugin is configured to serve as an add-on to an existing software application on the computing device (e.g., computing device 130), facilitate provision of one or more activities, and display of those activities in association with particular segments of a piece of multimedia.

In other embodiments, the system comprises a stand-alone multimedia viewer configured to display, play, and/or otherwise provide access to the piece of multimedia. In such embodiments, the system may be configured to receive one or more activities (e.g., the first activity) via the stand-alone multimedia viewer or other suitable software application, as described above.

In various embodiments, the first activity is an activity regarding the piece of multimedia. In particular embodiments, the first activity is a first activity regarding a particular segment of the piece of multimedia from the plurality of segments identified at Step 410. In particular embodiments, the first activity comprises an identification of the particular segment.

In particular embodiments, the first time is any suitable time during which the first user is viewing, listening to, reading, or otherwise consuming the piece of multimedia. In other embodiments, the first time is a time subsequent to the first user's consumption of the piece of multimedia (e.g., after the user has watched, read, etc. the piece of multimedia).

Process the First Activity by: (1) Digitally Storing the First Activity in Memory; (2) Mapping the First Activity to a First Segment of the Plurality of Segments Based at Least in Part on the First Activity; and (3) Electronically Associating the First Activity, the First Segment, and the Piece of Multimedia in Memory Continuing to Step 430, the system is configured to process the first activity by: (1) digitally storing the first activity in memory; (2) mapping the first activity to a first segment of the plurality of segments based at least in part on the first activity; and (3) electronically associating (or electronically linking) the first activity, the first segment, and the piece of multimedia in memory. In this way, the system may, for example, be configured to provide for future retrieval of the first activity and identification of the piece of media and the particular first segment of the piece of multimedia with which the first activity is associated.

In particular embodiments, the system is configured to digitally store the first activity in memory. In some embodiments, the system is configured to store the first activity in a suitable database (e.g., the one or more databases 140 shown in FIG. 1). In other embodiments, the system is configured to store the first activity in any other suitable location (e.g., one or more remote servers, one or more conver4tion management servers, etc.).

In particular embodiments, the system is configured to modify the piece of multimedia to include the first activity. In such embodiments, the system may be configured to store the first activity along with the piece of multimedia in a single file. In still other embodiments, the system is configured to store the first activity independent of the piece of multimedia (e.g., such as in one or more embodiments in which the piece of media is hosted by one or more third parties).

In any embodiment described herein, the system may be further configured to map the first activity to a first segment of the plurality of segments that make up the piece of multimedia. In particular, the system may be configured to map the first activity to the first segment based at least in part on the first activity. For example, the system may be configured to map the first activity to the first segment based at least in part on: (1) a time at which the first activity was received (e.g., the first time); (2) a segment selected by the first user and provided as part of the first activity; (3) an elapsed time into the total length of a piece of multimedia having a particular runtime at which the user begins submitting the first activity (e.g., a time corresponding to a time at which the user began typing the activity; moused over one or more predefined activities; etc.); (4) an elapsed time into the total length of a piece of multimedia having a particular runtime at which the user submitted the first activity; (5) a location on the piece of multimedia that the user clicked or otherwise selected when submitting the first activity (6) one or more contents of the first activity (e.g., a reference to a particular video timestamp, a reference to a particular feature, page number, line number, word, image, etc. in the piece of multimedia, etc.); and/or (6) any other suitable characteristic related to the first activity.

The system may, for example: (1) identify the first segment of the plurality of segments as being a segment with which the first activity is associated; and (2) map the first activity to the first segment in memory. In particular embodiments, mapping the first activity to the first segment comprise associating, or electronically linking, the first activity with a first segment identifier (e.g., a unique identifier that identifies the first segment from the plurality of segments). In particular, the first segment identifier may include any suitable identifier such as, for example a string, marker, pointer, timestamp, coordinate location, time range, tracker, etc.

The system may further be configured to electronically associate the first activity, the first segment (e.g., the first segment identifier), and the piece of multimedia in memory. In various embodiments, by associating the first activity with both the piece of multimedia and the first segment, the system is configured to store the first activity remotely from the piece of multimedia and use the identifying information associated with the first activity to display the first activity along with the piece of multimedia in association with the first segment, as discussed more fully below. In particular embodiments, this storage and association arrangement may enable the system to provide the first activity for display along with the proper piece of multimedia at the proper segment, for example: (1) for a first activity made on a piece of multimedia hosted by the system (e.g., in a multimedia viewer or player hosted by the system); (2) for a first activity made on a piece of multimedia hosted by a third party, on a third party site, or through a third party application (e.g., as in one or more embodiments in which the system comprises one or more overlays); and/or (3) regardless of a manner in which the system received the first activity or the piece of multimedia is provided, stored, etc.

In such embodiments, the system is configured to improve a call time of the first activity when providing the first activity for display with the piece of multimedia because the system may, for example, only need to store the first activity itself in addition to the associated segment and multimedia identifiers (e.g., rather than storing the multimedia itself, which may include one or more video or other files of a relatively large size).

Electronically Receive a Second Activity at a Second Time

Continuing to Step 440, the system is configured to electronically receive a second activity at a second time. In various embodiments, the system is configured to receive the second activity via any suitable user interface, for example, on a computing device associated with a second user. In some embodiments, the system is configured to receive the second activity from the second user. In various embodiments, the system is configured to receive the second activity in any suitable manner, such as in any manner described above with respect to the first activity at Step 420. In various embodiments, the second user is the first user.

In particular embodiments, as described above with regard to the first activity, the second activity may comprise, for example: (1) one or more free form text comments (e.g., typed or otherwise provided by the second user); (2) one or more video comment (e.g., one or more videos recorded by the second user, one or more links to one or more videos, or any other suitable video comment); (3) one or more audio comment (e.g., one or more audio comment record by the second user, a link to one or more audio comment, or any other suitable audio comment; (4) one or more image comment (e.g., one or more uploaded images; one or more links to one or more images; one or more images created by the second user, etc.), which may include, for example, one or more graphics interchange format (GIF) images: (5) one or more predefined comment (e.g., one or more predefined text comment, one or more predefined image comment, one or more predefined video comment, one or more predefined audio comment, etc.); (6) one or more reactions (e.g., one or more smilies, one or more emoticons, one or more ideograms, etc.), which may, for example, comprise one or more predefined emoticons and/or one or more user-submitted emoticons; and/or (7) any other suitable activity, type of activity, combination of activities, or combination of activity types.

In various embodiments, the second activity is an activity regarding the piece of multimedia. In particular embodiments, the second activity is a second activity regarding a particular segment of the piece of multimedia from the plurality of segments identified at Step 410. In particular embodiments, the second activity comprises an identification of the particular segment. In particular embodiments, the second activity is a response to the first activity (e.g., a reply to a first comment, a response to a question that makes up the first activity, etc.). In particular embodiments, the first activity and the second activity make up an activity thread. In other embodiments, the first and second activities define a conversation (e.g., between one or more users).

In particular embodiments, the second time is any suitable time contemporaneous with a time in which the second user is viewing, listening to, reading, or otherwise consuming the piece of multimedia. In other embodiments, the second time is a time subsequent to the second user's consumption of the piece of multimedia (e.g., after the user has watched, read, etc. the piece of multimedia). In some embodiments, the second time occurs after the first time (e.g., is a time later than the first time).

Process the Second Activity by: (1) Digitally Storing the Second Activity in Memory; (2) Mapping the Second Activity to a Second Segment of the Plurality of Segments Based at Least in Part on the Second Activity; (3) Optionally Mapping the Second Activity to the First Activity; and (4) Electronically Associating the Second Activity, the Second Segment, and the Piece of Multimedia in Memory Continuing to Step 450, the system is configured to process the second activity by: (1) digitally storing the second activity in memory; (2) mapping the second activity to a second segment of the plurality of segments based at least in part on the second activity; (3) optionally mapping the second activity to the first activity; and (4) electronically associating the first activity, the first segment, and the piece of multimedia in memory. In this way, the system may, for example, be configured to provide future retrieval of the second activity and identification of the piece of media, and additionally, the system may be configured to provide the particular second segment of the piece of multimedia with which the second activity is associated (e.g., in addition to one or more additional activity with which the second activity may be associated).

In particular embodiments, the system is configured to digitally store the second activity in memory. In some embodiments, the system is configured to store the second activity in a suitable database (e.g., the one or more databases 140 shown in FIG. 1). In other embodiments, the system is configured to store the second activity in any other suitable location (e.g., one or more remote servers, one or more activity management servers, etc.). In some embodiments, the system is configured to store the second activity in the same location as the first activity. In other embodiments, the system is configured to store the first and second activities in one or more different locations.

In particular embodiments, the system is configured to modify the piece of multimedia to include the second activity. In such embodiments, the system may be configured to store the second activity along with the piece of multimedia in a single file. In still other embodiments, the system is configured to store the second activity independent of the piece of multimedia (e.g., such as in one or more embodiments in which the piece of media is hosted by one or more third parties).

In any embodiment described herein, the system may be further configured to map the second activity to a second segment of the plurality of segments that make up the piece of multimedia. In particular, the system may be configured to map the second activity to the second segment based at least in part on the second activity. For example, the system may be configured to map the second activity to the second segment based at least in part on: (1) a time at which the second activity was received (e.g., the second time); (2) a segment selected by the second user and provided as part of the second activity; (3) an elapsed time into the total length of a piece of multimedia having a particular runtime at which the user begins submitting the second activity (e.g., a time corresponding to a time at which the user began typing the activity; mouse over (e.g., placed a pointer device or mouse over) one or more predefined activities; etc.); (4) an elapsed time into the total length of a piece of multimedia having a particular runtime at which the user submitted the second activity; (5) a location on the piece of multimedia that the user clicked or otherwise selected when submitting the second activity (6) one or more contents of the second activity (e.g., a reference to a particular video timestamp, a reference to a particular feature, page number, line number, word, image, etc. in the piece of multimedia, etc.); and/or (6) any other suitable characteristic related to the second activity. In some embodiments, the second segment is the first segment.

The system may, for example: (1) identify the second segment of the plurality of segments as being a segment with which the second activity is associated; and (2) map the second activity to the second segment in memory. In particular embodiments, mapping the second activity to the second segment comprises associating the second activity with a second segment identifier (e.g., a unique identifier that identifies the second segment from the plurality of segments). In particular, the second segment identifier may include any suitable identifier such as, for example a string, pointer, timestamp, coordinate location, time range, tracker, memory address, etc.

In particular embodiments, such as one or more embodiments in which the second activity is a reply to, response to, or otherwise associated with the first activity, the system is configured to map the second activity to the first activity. In some embodiments, the system may be configured to store the first activity with the second activity (e.g., in memory) and associate the first activity with the second activity. In still other embodiments, mapping the second activity to the first activity comprises associating the second activity with a first activity identifier (e.g., a unique identifier that identifies the first activity, a storage location of the first activity, etc.). In particular, the first segment activity may include any suitable identifier such as, for example, a string, pointer, timestamp, coordinate location, time range, tracker, memory address, etc.

The system may further be configured to electronically associate the second activity, the second segment (e.g., the second segment identifier), and the piece of multimedia in memory. The system may, for example: (1) generate an electronic record for the second activity; (2) store the second activity with the electronic record for the second activity; and (3) store one or more identifiers for each of the second segment, the piece of multimedia, and any associated other activities (e.g., the first activity) in the electronic record.

Display, at a Third Time, at Least One of: (1) the First Activity in Association with the First Segment of the Piece of Multimedia; and (2) the Second Activity in Association with the Second Segment of the Piece of Multimedia Returning to Step 460, the system is configured to display, at a third time, at least one of: (1) the first activity in association with the first segment of the piece of multimedia; and (2) the second activity in association with the second segment of the piece of multimedia. In particular embodiments, as may be understood in light of this disclosure, the system is configured display any of a plurality of activities that have been received for a piece of multimedia for any subsequence consumers of that piece of multimedia.

For example, in any embodiment described herein, if the third time occurs after the first time at which the system receives the first activity but before the second time at which the system receives the second activity, the system would be configured to display the first activity in association with the first segment of the piece of multimedia (e.g., by not the second activity as the system would not have received the second activity at that point). As another example, in any embodiment described herein, if the third time occurs after both the first time, at which the system receives the first activity, and the second time, at which the system receives the second activity, the system would be configured to display both the first activity in association with the first segment of the piece of multimedia and the second activity in association with the second segment of the piece of multimedia. In embodiments in which the first and second activities are related (e.g., one is a reply and/or response to the other), the system is configured to display the first and second activities in association with one another (e.g., substantially simultaneously).

In various embodiments, displaying the first activity in association with the first segment comprises displaying the first activity (e.g., or providing the first activity for display) such that the first activity is visually associated with the first segment. For example, in an embodiment in which the first segment is a time segment, the system may display the first activity along a video or audio scrub bar that corresponds to the first time segment (e.g., the time in the video or piece of audio in which the first activity was made). In other embodiments, the system may display a first indicia adjacent the video or audio scrub bar that corresponds to the first time segment (e.g., such as a symbol, avatar of the first user, letter, number etc.), and display the first activity adjacent the piece of multimedia along with (e.g., adjacent to) a second indicia that is identical to the first indicia. In this way, the system may create a visual association between the first activity and the first time segment.

As a particular example, if the piece of multimedia comprises a video, the system may display a star indicia along the video scrub bar at the 1:00 minute mark (e.g., which may correspond to a time at which the first user made the first activity when viewing the video). When displaying the first activity at a later time, the systems may be configured to display the star indicia (e.g., or any other suitable indicia) at the 1:00 minute mark, and further configured to display the first activity adjacent to (e.g., next to, below, etc.) the video with a second star indicia adjacent to the first activity.

Similarly, in an embodiment in which the particular segment comprises a location segment, the system may display a particular indicia in a location on the piece of media that corresponds to the location segment and display the same particular indicia along with the first activity adjacent the piece of multimedia. The system may further use any other suitable technique to indicate the association, or electronic link, between the first activity and the first segment (e.g., by visually connecting the first activity and the first segment with a line or other marking, by highlighting the first activity and the first segment in one or more similar colors, etc.).

The system may be configured to display the second activity in association with the second segment in any suitable manner, such as any manner described above regarding the visual association of the first activity with the first segment. In particular embodiments, the system is configured to display the first and second activities in association with their respective segments as an overlay to the piece of multimedia (e.g., as an overlay to a third party media player). In other embodiments, the system may be configured to display the activities as part of a multimedia player and/or viewer. In still other embodiments, the system may display the activities as part of a software plugin or other suitable software application. In other embodiments the system may technically display (e.g., or provide for display) the activities in any other suitable manner. For example, the system may provide the first activity and the second activity in addition to their respective segment identifiers and associated activity identifiers for display by a mobile computing device, or other remote computing device.

In other embodiments, such as an embodiments in which the second activity is a response to the first activity, the system is configure to display (e.g., or provide for display) the first and second activities in a manner such that there is a visual association between the first and second activities (e.g., by connecting respective boxes in which the first and second activities are displayed with one or more lines or other indicia, by placing the second activity adjacent the first activity such as below or logically following the first activity, etc.).

Although the above module is described in the context of two distinct activities, it should be understood that the system may receive any number of activities for any number of segments of a particular piece of multimedia (e.g., a plurality of activities). Each particular activity may, for example, be stored, mapped to a particular segment, mapped to one or more other activities, associated with the piece of multimedia, etc. as generally described above or in any other suitable manner. It should be understood in light of this disclosure that the system is configured to display any of the plurality of activities that the system has received prior to the point at which the system is displaying the plurality of activities (e.g., providing the plurality of activities for display).

Scoring Module

In various embodiments of the Activity Management System 100, determining a sentiment score for (1) a particular multimedia content, (2) one or more segments of a particular multimedia content, (3) a viewer, (4) one or more viewers (e.g., a group, an organization, etc.), (5) etc. provides valuable information to users (e.g., content creators, facilitators, organizations, etc.) of the Activity Management System 100. For example, in various embodiments, a viewer's sentiment (e.g., mood) with respect to the multimedia content can guide a content creator to improve the overall multimedia content. In preferred embodiments, a viewer's sentiment with respect to one or more other viewers helps either a user to manually group viewers or allows the Activity Management System 100 to automatically group viewers. In some embodiments, a viewer's sentiment can also be used to determine how a viewer best consumes multimedia content in collaborative learning environments.

In various embodiments, calculating an engagement score for one or more viewers of the multimedia content allows content providers and facilitators to determine how viewers engage with content. Additionally, engagement scores help to determine which content drives engagement. For example, viewers may be more engaged with video type content as opposed to audio type content. In addition to engagement scores, calculating influence scores show how teams and individuals interact. Influence scores allow facilitators and the system to determine which viewers influence a group, how influencers influence certain other viewers, and who makes contributions that cause engagement of others. This information is important when deciding which viewers to group together. Finally, calculating a facilitator score allows the system to determine how effective facilitators are with respect to the multimedia content. For example, facilitator scores can be used to determine if the facilitator is effectively driving the group and how the facilitator can improve learning. The various scores can help improve the learning of a viewer, but more importantly, can improve the overall learning experience for the group of viewers. That is, optimizing a group of viewers based on viewer sentiment, engagement and influence, and pairing the optimized group with the most optimum facilitator for the group, will result in the maximum learning experience for the group, as well as for the individual viewers in the group.

The scoring module 500 can be used alone, or in combination with any one or more of the Activity Management System 100 modules described herein.

Selecting One or More Electronic Data Records from a Plurality of Electronic Data Records that are Linked to One or More Segments of a Particular Multimedia Content In particular embodiments, when executing a scoring module 500, the system begins at Step 500, by selecting one or more electronic data records from a plurality of electronic data records that are linked to one or more segments of a particular multimedia content. The particular multimedia content can be of a single type of multimedia or it may consist of multiple types of multimedia content. Each one of the selected one or more electronic data records is stored in a database, in one or more database tables. Each electronic data record comprises activity information that is part of a conversation related to one or more segments of the particular multimedia content, an identifier of the particular multimedia content and one or more additional data fields. The one or more additional data fields may be selected from (1) an identifier of the viewer that submitted the activity, (2) segment information for a segment of the particular multimedia content associated with the activity, (3) an identifier of a type of activity, (4) an identifier for a related activity, (5) a time stamp for when the activity was initiated, (6) a time stamp for when the activity was submitted, (7) a length of the activity, (8) a reaction type, (9) a reply count, (10) an activity count, (11) a question flag, (12) an answer flag, (13) an activity type, and (14) any other suitable data field necessary for tracking an activity submitted to the system.

In various embodiments, the one or more electronic data records may be generated as one or more viewers consume the particular multimedia content and submit activities in response to the content of the particular multimedia content. In some embodiments, the one or more electronic data records may be generated as one or more viewers consume the particular multimedia content and submit activities in response to activities submitted by prior viewers. In still other embodiments, the one or more electronic data records may be generated as one or more viewers consume the particular multimedia content and submit activities in response to activities or discussions pre-seeded by (1) the creator of the particular multimedia content or (2) the facilitator assigned to the viewer or group of viewers.

Figure 34B:
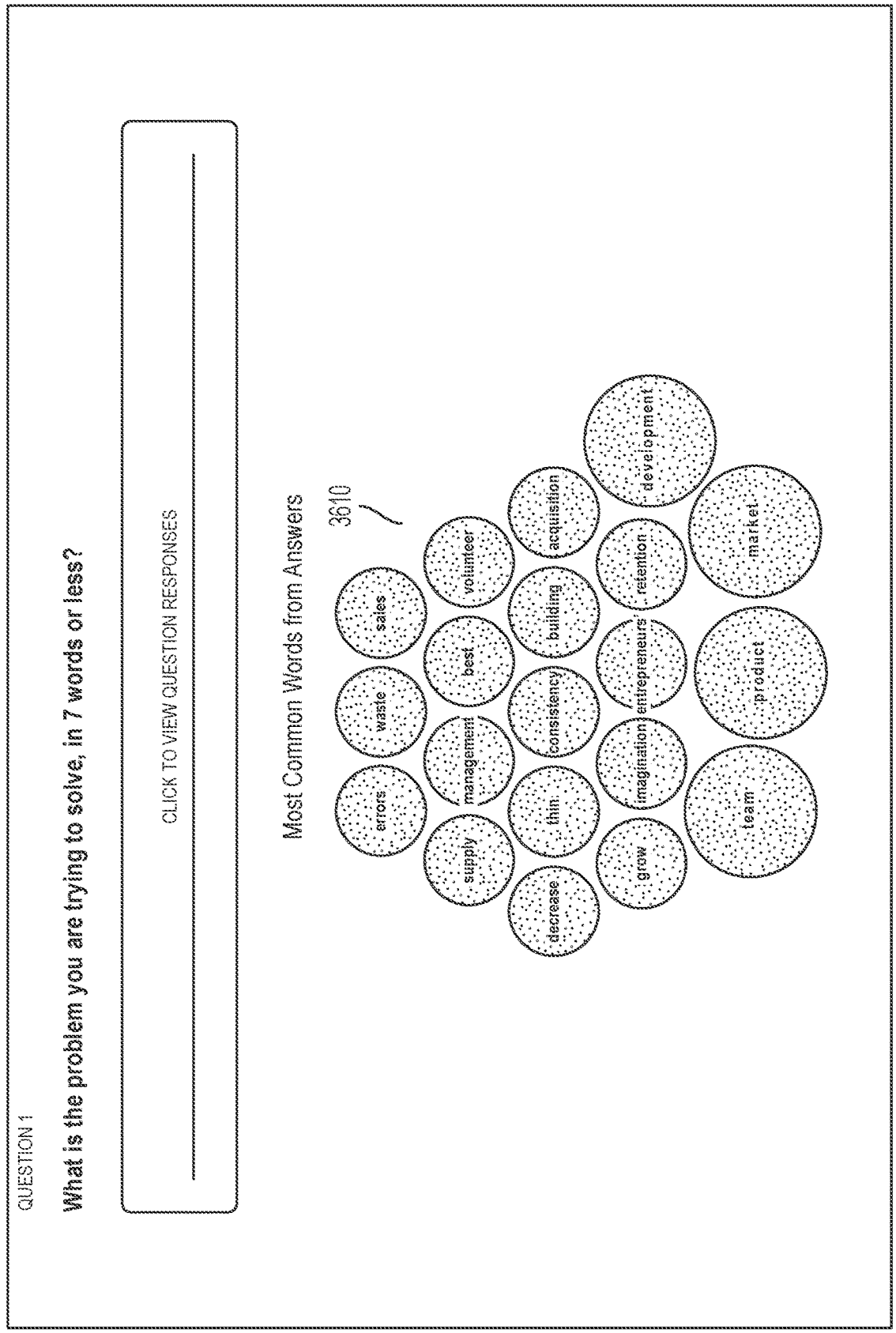

In particular embodiments, such as shown in FIGS. 34A and 34B, for some pre-seeded questions, the system is configured to display a plurality of answers 3605 provided by other takers of the questionnaire. In particular embodiments, such as embodiments shown in this figure, the system is configured to enable users to reply to or otherwise activity on other user's responses (e.g., using the user interface shown in FIG. 34A). In particular embodiments as shown in FIG. 34B, the system may be configured to parse answers provided by various users to determine particular words that appear more or less frequently in prior answers. For example, as shown in FIG. 34B, the system may generate a pictograph 3610 that depicts words that appear more frequently in submitted responses instead of providing answers submitted by others.

Generating a Sentiment Value for Each One of the One or More Electronic Data Records Selected From the Plurality of Electronic Data Records Continuing at Step 520, the system 100 evaluates activity information for each particular one of the one or more selected electronic data records to determine the type of activity contained therein. In various embodiments, activities consist of one or more of (1) a predefined text activity (e.g., a response to a survey question, etc.) that the first viewer can select via the first graphical user interface, (2) a plurality of reactions that a viewer can select from via a graphical user interface in response to the content of the particular multimedia content or to an activity made by another viewer, (3) a custom text entry that is entered by the viewer via the graphical user interface in response to the content of the particular multimedia content or to an activity made by another viewer, (4) pausing of the content, (5) skipping content, (6) mouse movements or touches on a touch screen, (7) etc.

Calculating a Sentiment Value for Each Activity Type

Continuing at Step 530, the system is configured to calculate a sentiment value for each activity type found in a respective electronic record. In various embodiments, each predefined text activity is assigned a corresponding predefined sentiment value. For example, when a survey questionnaire is presented, each potential answer of the survey questionnaire is preassigned a sentiment value. Additionally, each type of reaction has a corresponding predefined sentiment value assigned. For example, the one or more reactions (shown in FIG. 15) selected from a group of emoticons 1540 may be assigned the following sentiment values—smiley face 1541 the sentiment of agreement, annoyed face 1542 the sentiment of disagreement, sad face 1543 the sentiment of dislike, surprised face 1544 the sentiment of surprise, confused faced 1545 the sentiment of confusion, and heart 1546 the sentiment of liking something. Finally, each custom text entry submitted as an activity (e.g., a statement, a question, a reply to a statement, a reply to a question, etc.) may be run through one or more sentiment filters or algorithms that use one or more of natural language processing, text analysis, computational linguistics to systematically identify, quantify, and study affective states and subjective information in the activity to determine the emotional reaction of the viewer who submitted the activity.

Transforming the Sentiment Values for the One or More Electronic Data Records into at Least One Sentiment Score Continuation at Step 540, the system 100 is configured to transform the sentiment values calculated for each one of the electronic data records into at least one sentiment score. For example, in various embodiments, the system may be configured to calculate the sentiment score for each segment of the particular multimedia content. In this way, a content creator can view the overall sentiment score for all viewers of the multimedia content to determine which one or more segments are highly regarded and which one or more segments are negatively regarded. The content creator can then determine which segments of the multimedia content should be changed.

In some embodiments, the system may calculate the sentiment score for each segment of the particular multimedia content for a particular viewer. In this way, a facilitator of the particular multimedia content can evaluate how the viewer is reacting to the multimedia content. For example, the facilitator may determine that the particular viewer is confused with respect to certain segments of the multimedia content. The facilitator may then work with the particular viewer to help them better understand the content related to those segments where there sentiment scores indicate confusion.

In other embodiments, the system may calculate a sentiment score for each segment of the particular multimedia content for all viewers in a group. The sentiment of the group may allow the facilitator to direct the group's conversations associated with the particular multimedia content in a different direction that is more positive or conducive for group learning.

In still other embodiments, the sentiment scores for a particular viewer may also be used to evaluate the particular viewer in regard to their engagement with the multimedia content and their ability to influence others. For example, a viewer's sentiment score may be used in determining a viewer's ability to influence others through their activities submitted in a conversation for the multimedia content, as described in more detail herein.

Calculating a Viewer's Engagement Score and Influence Score

In various embodiments, the system 100 may be configured to determine from the selected one or more electronic data records for the particular viewer, a length of time that the particular viewer spends viewing each of the one or more segments of the particular multimedia content. In some embodiments, the system 100 may be configured to capture and store a segments start and stop time. The system may also be configured to determine from the electronic data records the number of times the particular viewer reviews the same segments of the multimedia content. In some embodiments, the system can determine: (1) a total number of activities submitted by the particular viewer for the particular multimedia content, (2) a total number of activities submitted by the particular viewer for each type of content that is contained in the particular multimedia content, (3) a total number of activities submitted by the particular viewer that elicited a conversation with one or more other viewers, (4) a total number of activities submitted by the particular viewer that were in reply to an activity submitted by another viewer, (5) a total number of activities submitted by the particular viewer that were questions, (6) a total number of activities submitted by the particular viewer that were questions that elicited a response from other viewers, (7) the total number of activities submitted by the particular viewer that were in reply to an activity submitted by another viewer, (8) a total number of reactions and/or type of reactions that were elicited from other viewers in response to activities submitted by the particular viewer, (9) a total number of reactions and/or type of reactions that were submitted by the particular viewer, (10) a total number of words in each activity submitted by the particular viewer, (11) a total number of words for each reply made by another viewer to the particular viewer's activity, (12) the sentiment score for one or more activities submitted by the particular viewer, (13) the sentiment score for one or more activities submitted in reply to an activity made by the particular viewer, (14) the role of the viewer within an organization, (15) the expertise of the viewer in the category of the multimedia content, (16) the viewer's history of published multimedia content, and/or (17) any other suitable characteristic of the particular viewer, captured activities of the viewer, a response to the viewer or the viewer's environment. One or more of the above data points can be used to determine a viewer's engagement score for the particular multimedia content (e.g., the multimedia content in general, the types of multimedia content, etc.) and/or the viewer's influence score with respect to other viewers.

Referring to FIG. 28, a facilitator may examine a facilitator user interface 2800 that provides an overview of all of the various multimedia content assigned to the facilitator. For each of the multimedia content 2805, 2810, etc. assigned to the facilitator, the user interface 2800 provides an overview of the influence score 2815 and the engagement score 2820 for each listed multimedia content. In various embodiments, the facilitator can click on the listed score to drill down into more detailed influence scores and engagement scores. For instance, by clicking one of the influence or engagement scores, the system may be configured to provide a graph of the score versus the segments to provide a view of the engagement or influence score for one or more segments of the multimedia content.

Figure 33A:
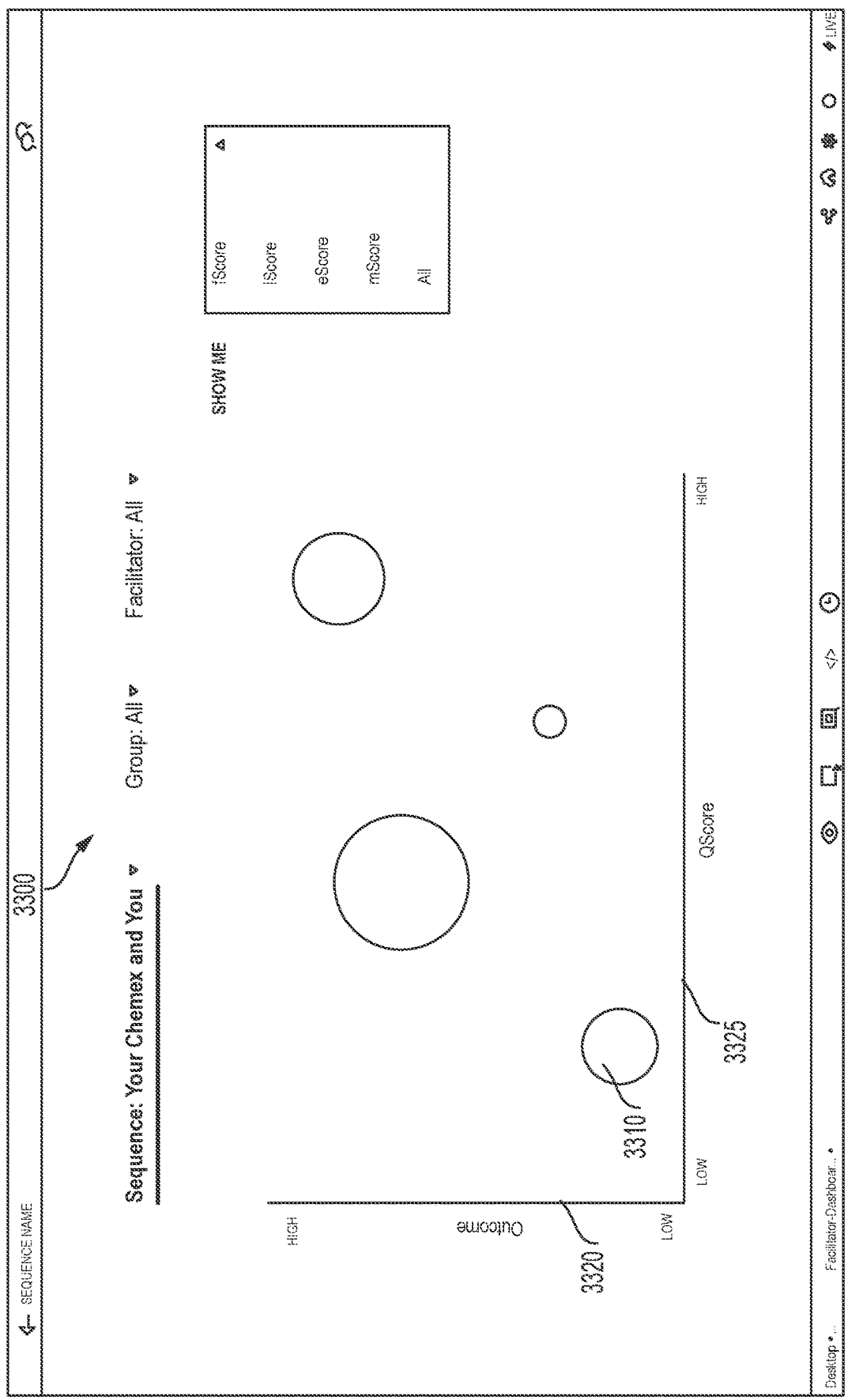
FIGS. 33A-33B depict exemplary screen displays and GUIs according to various embodiments of the system, which may display components and embodiments for displaying system scores for influence, sentiment, engagement and facilitator effectiveness.
Figure 33B:
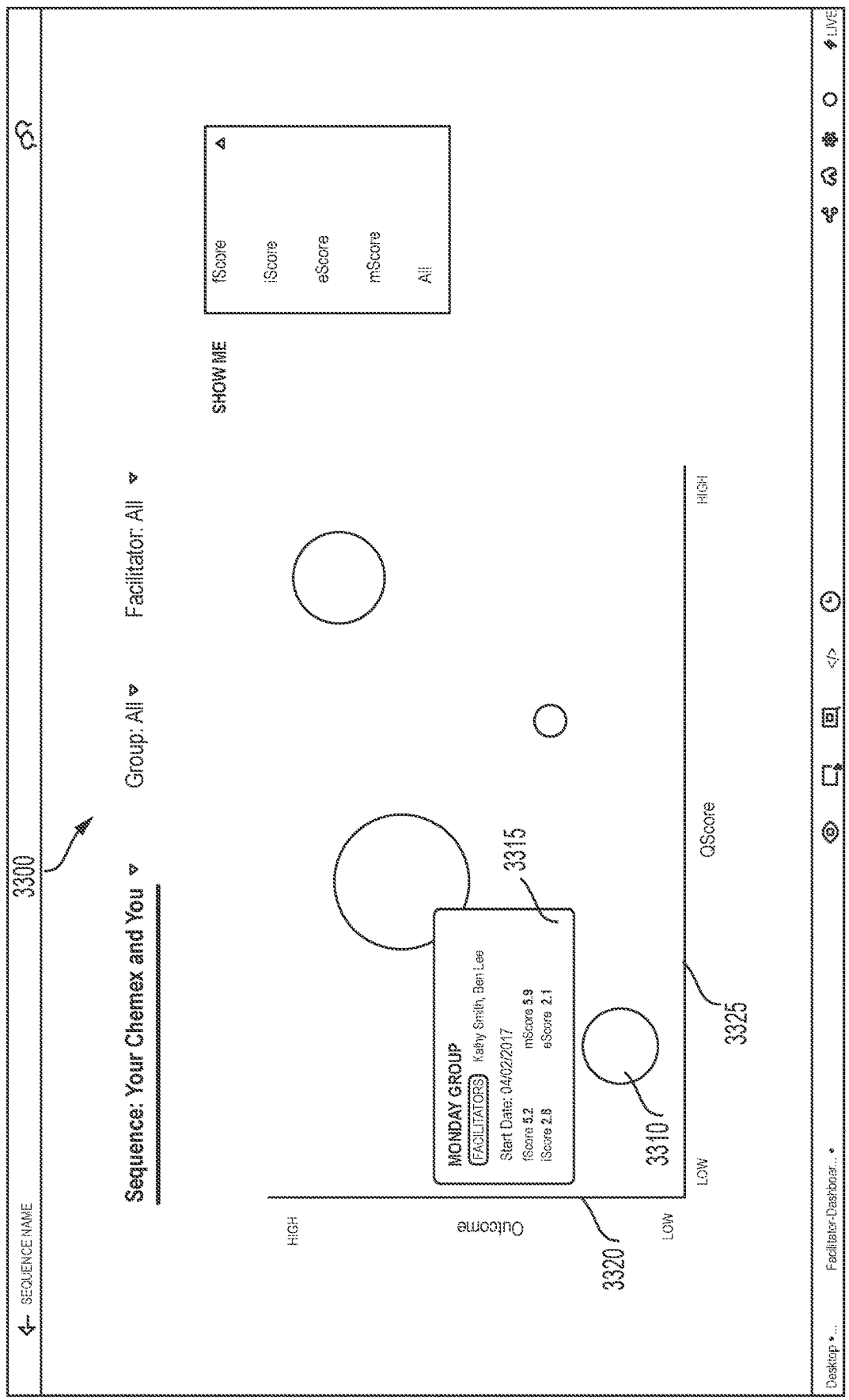

Referring to FIGS. 33A and 33B, an exemplary user interface 3300 that provides one method of graphing sentiment scores, engagement scores, facilitator scores and influence scores for different groups that are viewing the same multimedia content. In the example, each group is represented by a different circle. For example, circle 3310 represents a first group of viewers. When the user selects circle 3310, a display menu 3315 appears and provides the user with additional information about the group. In the case of circle 3310 for the Monday group, the display menu 3315 lists the facilitator for the Monday group, the day the Monday group started and the various scores associated with the group. The graph of the groups is organized by the outcome on the y-axis 3320 and by a quality score on the x-axis 3325. The quality score is calculated based on a combination of the sentiment scores, engagement scores, facilitator scores and influence scores.

Using the Sentiment, Engagement and Influence Scores to Determine the Learning Characteristics for a Viewer In preferred embodiments, the system 100 is configured to determine, from a selected one or more electronic data records for the particular viewer, a day and/or a time of day that each activity was submitted by the particular viewer. This data in combination with engagement, sentiment and influence scores for a viewer can be used to determine how to optimize the learning for a viewer. In particular, the system may be configured to determine the optimum day and time of day that a viewer gets the most from consuming the multimedia content. For example, the system 100 can determine that a particular viewer's engagement score is highest on Saturday between the hours of 11 am-3 pm, and the viewer shows high engagement scores when interacting with visual and auditory multimedia content. Thus, in various embodiments, the system may build a learning characteristics assessment for each viewer based on viewer history that can be used by the facilitator or automatically by the system when grouping viewers and assigning multimedia content to particular groups of viewers. For example, the system may be configured to automatically group visual and audio learners together and assign them multimedia content that contains more audio and visual content types.

Multimedia Management Mapping Module

In particular embodiments, a Multimedia Management Mapping Module 600 is configured to perform one or more additional steps to the Multimedia Activity Mapping Module 400 described above or any other module described herein. In various embodiments, each step of the Multimedia Management Mapping Module 600 may include one or more optional steps in various embodiments of any system described herein.

Receive a First Activity Associated with a First Piece of Multimedia of a Plurality Pieces of Multimedia and Process the First Activity by: (1) Digitally Storing the Activity in Memory; (2) Mapping the First Activity to a First Segment of the First Piece of Multimedia; and (3) Electronically Associating the First Activity, the First Segment, and the First Piece of Multimedia in Memory When executing the Multimedia Management Mapping Module 600, the system beings, at optional Step 610, by receiving a first activity associated with a first piece of multimedia of a plurality pieces of multimedia and processing the first activity by: (1) digitally storing the activity in memory; (2) mapping the first activity to a first segment of the first piece of multimedia; and (3) electronically associating the first activity, the first segment, and the first piece of multimedia in memory.

In various embodiments, the system is configured for storing a plurality of activities, each of the plurality of activities being associated, in memory, with a segment identifier identifying a particular segment of a particular one of the plurality of pieces of multimedia. In such embodiments, the system may receive, map, and store such activities in any suitable manner described herein. In particular embodiments, the system receives a first activity associated with a first piece of multimedia of the plurality of pieces of multimedia, and performs one or more actions in response to receiving the first activity. In various embodiments, the one or more actions comprise: (1) digitally storing the first activity in memory; (2) mapping the first activity to a first segment of the first piece of multimedia; and (3) electronically associating, or electronically linking, the first activity, the first segment, and the first piece of multimedia in memory.

As may be understood in light of this disclosure, multimedia may comprise a plurality of pieces of multimedia. For example, in some embodiments, the plurality of pieces of multimedia combines to define a single piece of multimedia (e.g., such as a presentation that contains one or more slides, one or more videos, one or more questionnaires, etc.). In other embodiments, the plurality of pieces of multimedia may be associated with one another, for example, because: (1) the plurality of pieces of multimedia make up a particular lesson (e.g., portions of a lesson); (2) the plurality of pieces of multimedia make up a particular course (e.g., particular portions of or lessons that make up the course; and/or (3) they are associated or related in any other suitable way (e.g., chapters of a video, sections, of a piece of media, etc.).

Receive a Second Activity from a User that Comprises a Reply to the First Activity; Transmitting One or More Alerts to One or More Individuals; and Enabling the One or More Individuals to View the Second Activity Without Having to View the First Piece of Multimedia.

When executing the Multimedia Management Mapping Module 600, the system continues, at optional Step 620, by receiving a second activity from a user that comprises a reply to a first activity; transmitting one or more alerts to one or more individuals; and enabling the one or more individuals to view the second activity without having to view the first piece of multimedia.

In various embodiments, the system is configured for storing a plurality of activities, each of the plurality of activities being associated, in memory, with a segment identifier identifying a particular segment of a particular one of the plurality of pieces of multimedia. In such embodiments, the system may receive, map, and store such activities in any suitable manner described herein. In some embodiments, the plurality of activities comprises the first activity associated with a first segment of the first piece of multimedia.

In various embodiments, the system is configured for: (1) receiving a second activity, the second activity being associated with the first segment and comprising a reply to the first activity; (2) generating one or more alerts; (3) transmitting the one or more alerts to one or more individuals; and (4) enabling the one or more individuals to view the second activity without having to view the multimedia. In various embodiments, the one or more individuals may include, for example: (1) a facilitator of the multimedia; (2) a creator of the multimedia (e.g., a content creator); (3) a user that submitted the first activity; (4) one or more individuals that had previously consumed (e.g., viewed, watched, read, etc.) the multimedia; (5) one or more users enrolled in a course that utilizes the multimedia; (6) etc. In various embodiments, the method further comprises enabling the one or more individuals to respond to the second activity without viewing the multimedia.

Figure 32:
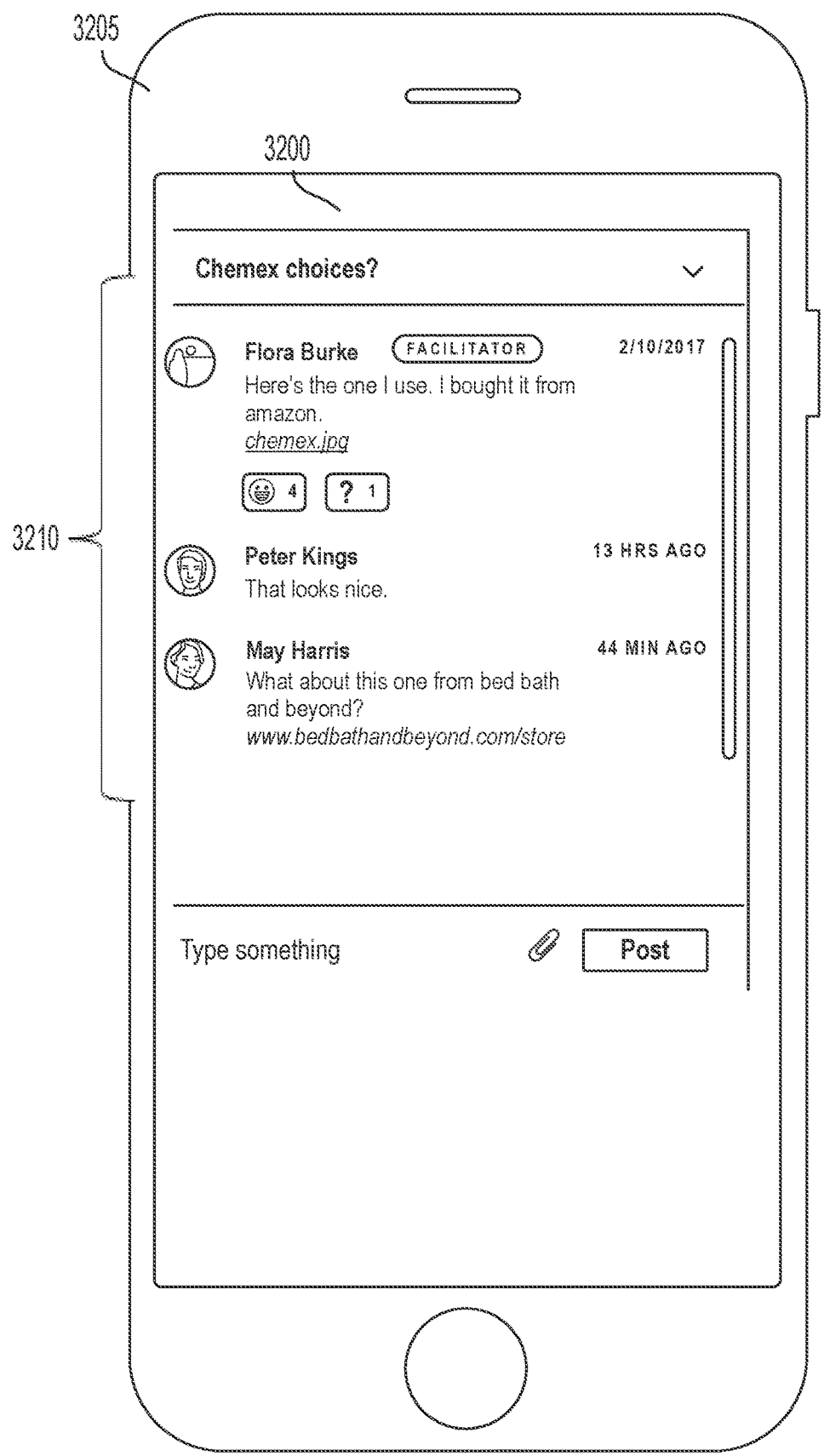
FIG. 32 an exemplary screen display on a mobile computing device, which may, for example, facilitate transmission of the one or more alerts to a suitable individual.

FIG. 32 depicts an exemplary screen display 3200 on a mobile computing device 3205, which may, for example, facilitate transmission of the one or more alerts (e.g., and one or more activities that triggered the one or more alerts) to a suitable individual. As may be understood from this figure, the system may be configured to transmit and display one or more replies 3210 to a particular comment on a display screen of the mobile computing device 3205. The system may display the one or more replies, for example, in a suitable mobile application, as a push notification, as a text or other message, etc. However, in other implementations, the one or more replies may be provided to any remote computing device 130, as described above.

As may be understood from this figure, the system is configured to display the one or more replies 3205 independent of the piece of multimedia. In various embodiments, the system is configured to enable the user to provide a response to the one or more replies 3210 using a suitable text entry box and post button 3215. As may be understood from this figure, the system is configured to enable the user to post one or more additional replies without accessing the piece of multimedia. In this way, the system may facilitate a conversation between/among two or more viewers that are viewing the multimedia at different times. A first user may leave a first activity at a first time, and a second user may wish to engage with the first user by replying to that activity. In any embodiment described herein, the system may facilitate such a conversation by notifying the first user of the second user's reply and enabling the first user to reply further (e.g., even though the first user had already viewed the media at an earlier time, is not currently viewing the media, and may not wish to re-view the media or be required to re-view or otherwise access the media again).

Generate and Provide a Graphic Display Based on a Plurality of Activities Associated with the First Piece of Multimedia; and Enable the User to Filter the Graphic Display Based on One or More Terms, One or More Segments of the First Piece of Multimedia, and/or One or More Viewers.

When executing the Multimedia activity Management Module 600, the system continues, at optional Step 630, by generating and providing a graphic display based on a plurality of activities associated with the first piece of multimedia; and enabling the user to filter the graphic display based on one or more terms, one or more segments of the first piece of multimedia, and/or one or more viewers.

In various embodiments, the system is configured for storing a plurality of activities, each of the plurality of activities being associated, in memory, with a segment identifier that identifies a particular segment of a particular one of the plurality of pieces of multimedia. In such embodiments, the system may receive, map, and store such activities in any suitable manner described herein. The system may then generate a graphic display (e.g., a visual representation) of the plurality of stored activities for the piece of multimedia. In various embodiments, the system is configured to generate the graphic display based on, for example: (1) an activity density for each of the plurality of segments (e.g., a number of activities received for each segment); (2) a type of activity that makes up the activity density for each of the plurality of segments; and/or (3) any other suitable factor.

Figure 25A:
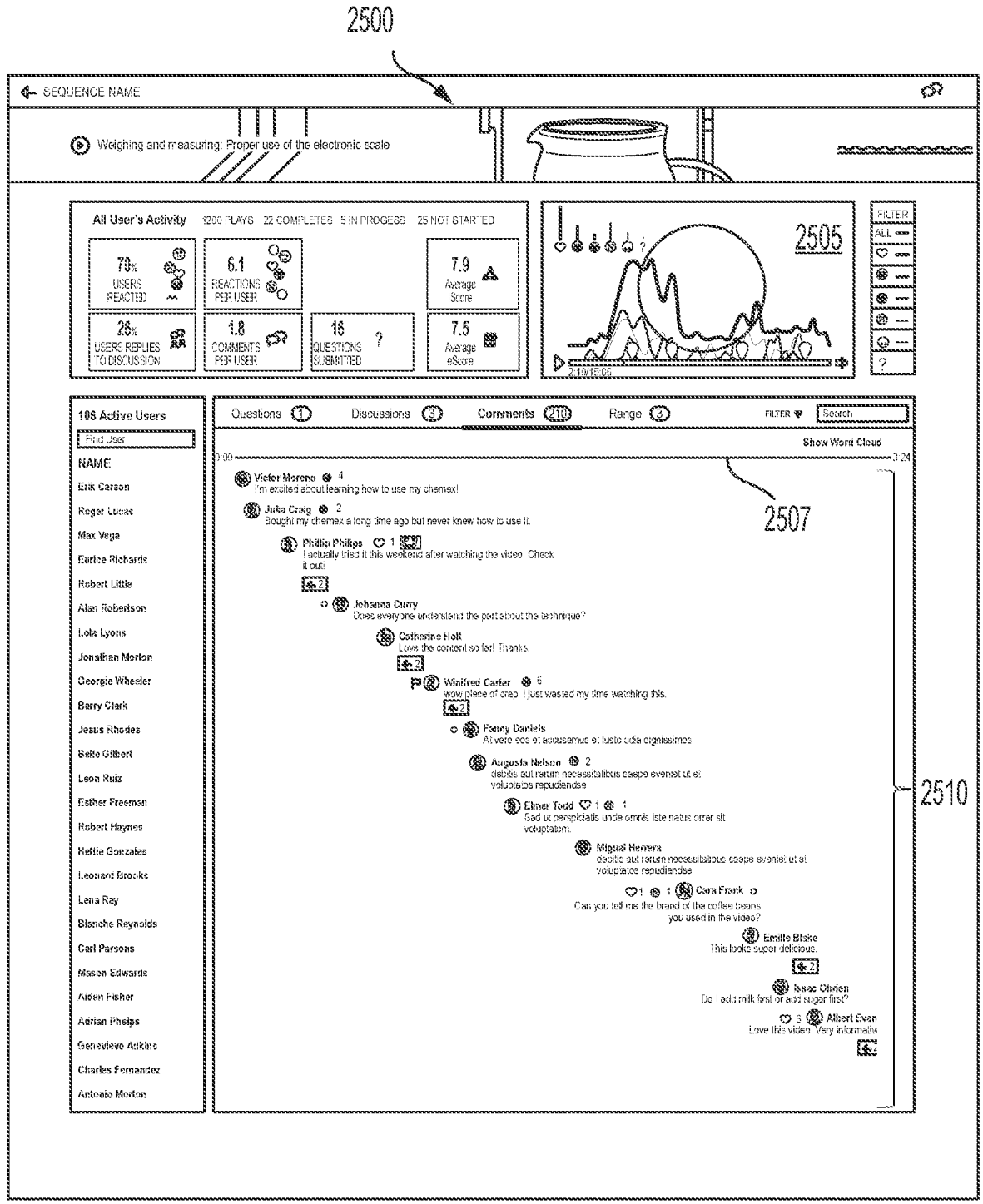

FIG. 25A depicts an exemplary screen display (e.g., a facilitator dashboard) showing a graphic display 2500 of a plurality of activities. As may be understood from this figure, the graphic display 2500 comprises activity graphic 2505 that depicts a volume of activities over the course of a particular video. As may be understood from the embodiment shown in this figure, the activity graph 2505 reflects different distinct types of activities submitted at various time segments (e.g., different emoticons). The activity graph 2505 indicates a total number of activities submitted in various discrete time segments of the video. The graphic display further comprises a plurality of activities 2510 submitted for the video. As may be understood from this figure, the plurality of activities 2510 each comprise, for example: (1) text of the activity; (2) one or more reactions (e.g., hearts, emoticons, etc.); and (3) an avatar or visual representation and/or name of the viewer.

Figure 25B:
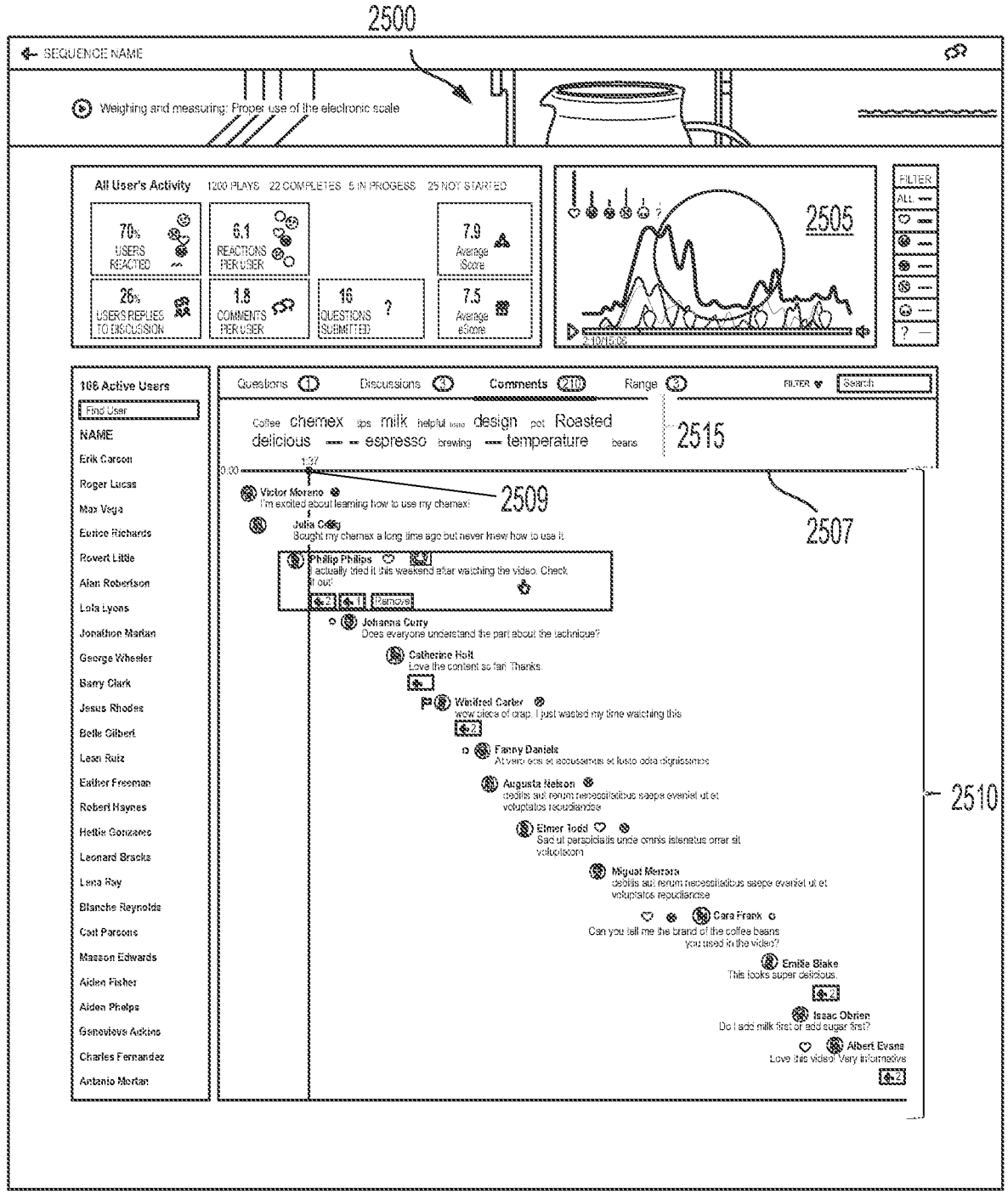

The graphic display 2500 further comprises a scrub bar 2507 which may depict a visual representation of a total runtime of a particular video. As may be understood from FIG. 25B, the scrub bar 2507 may further comprise an indication of a particular time 2509 along the scrub bar. This particular time 2509 may, for example, correspond to a time segment for which the plurality of activities 2510 was submitted. In various embodiments, as shown in FIG. 25B, the graphic display 2500 comprises a word cloud 2515 which may, for example, indicate a visual display of a graphic density of particular words that appear in the plurality of activities 2510. As may be understood from this figure, more frequently used words in the plurality of activities 2510 may be displayed more prominently in the world cloud 2515. For example, more frequently used words may be displayed in a larger font, in a bolder font, etc.

In various embodiments, the system is further configured for: (1) receiving a request to filter the graphical display 2500 based at least in part on an activity term; (2) in response to the request, identifying one or more of the plurality of activities that comprise the term; and (3) displaying, adjacent the graphical display, each of the identified activities that comprise the term in association with an associated particular segment. The system may receive the request, for example, in response to selection of a particular term by the user in the word cloud 2515.

Figure 25C:
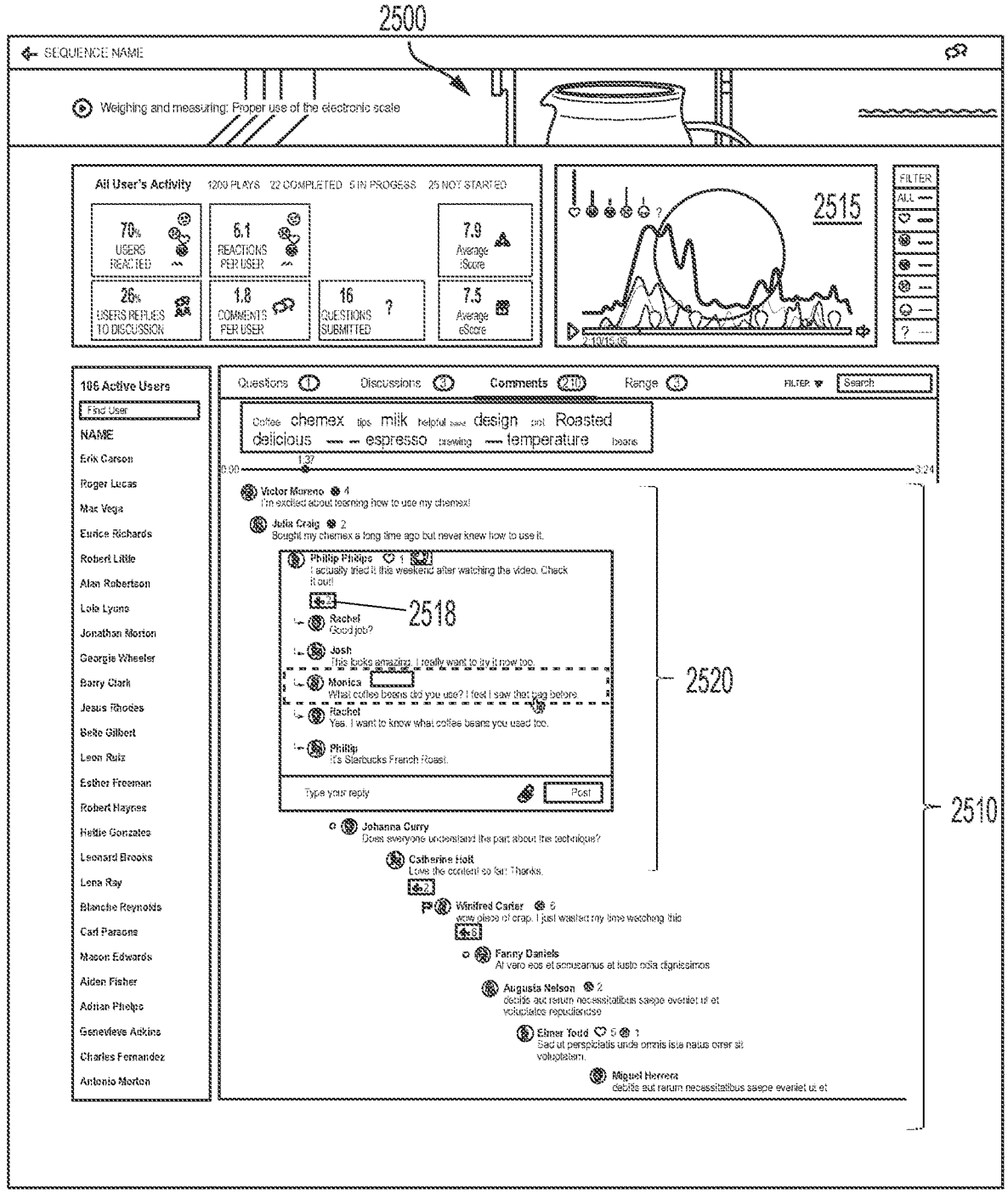

FIG. 25C depicts the plurality of activities 2510, in which a previously collapsed activity thread 2520 has been expanded, for example, in response to selection of an activity expansion 2518 indicia. As will be discussed more fully below, in various embodiments, the system is configured to throttle activities in response to receiving a threshold number of activities. This may, for example, enable the system to maintain an easier to read display (e.g., graphic display 2500) for users.

Figure 26A:
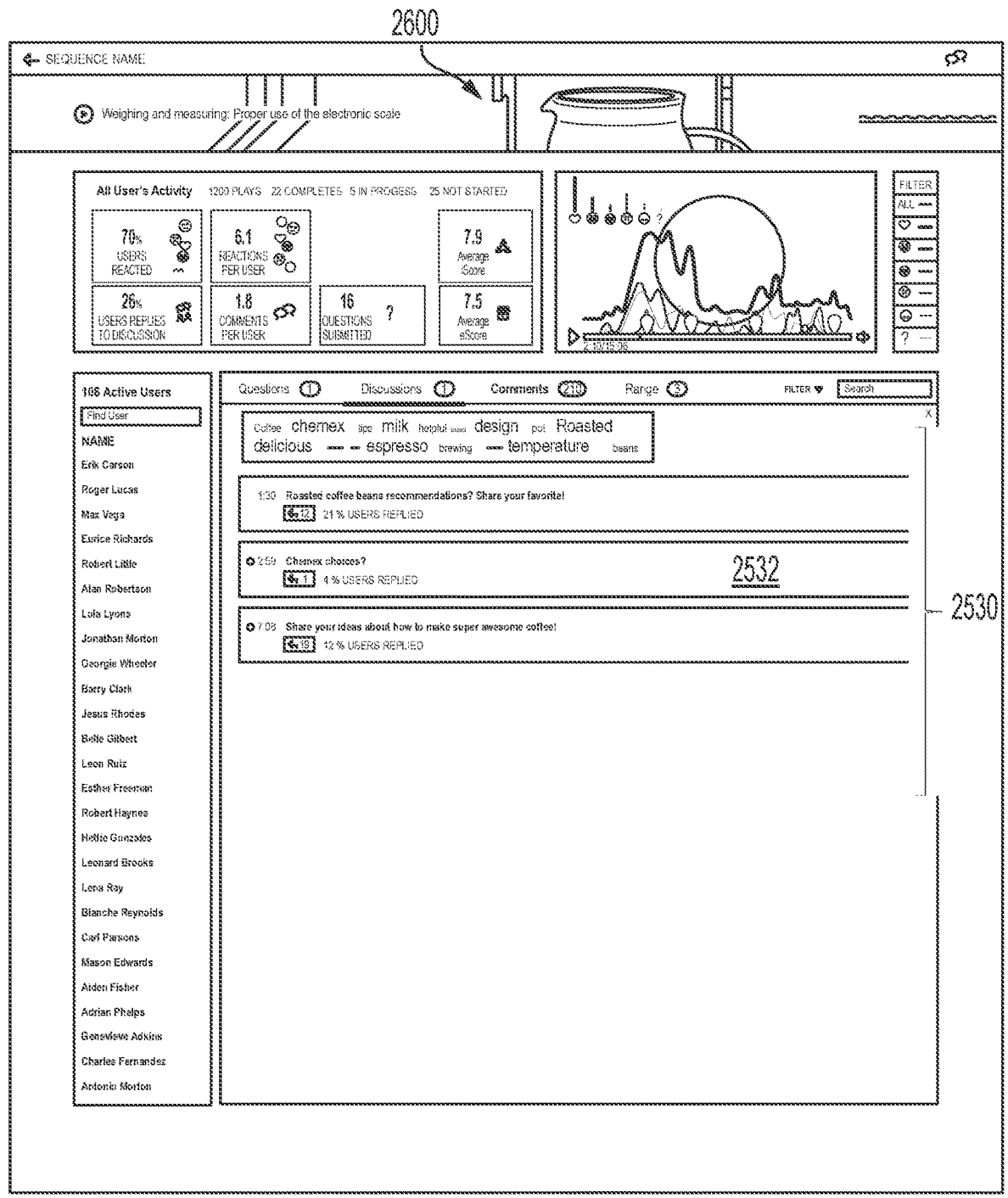

In various embodiments, the system is further configured for: (1) receiving request to view one or more activities associated with a particular segment (e.g., a particular time segment); and (2) in response to the request, displaying the one or more activities associated with the particular segment. FIG. 26A depicts a screen display 2600 depicting a listing of one or more discussions 2530 associated with the piece of multimedia. In various embodiments, each particular discussion may be associated with a particular time segment of the video. For example, a first particular discussion 2532 labelled "Chemex choices?" may be associated with a segment at the 2:59 mark of the video. In various embodiments, the system is configured to request to view one or more activities associated with a particular segment in response to selection, by a user, of one of the one or more discussions 2530. Here, the user may select the first particular discussion 2532 related to "Chemex choices."

Figure 26B:
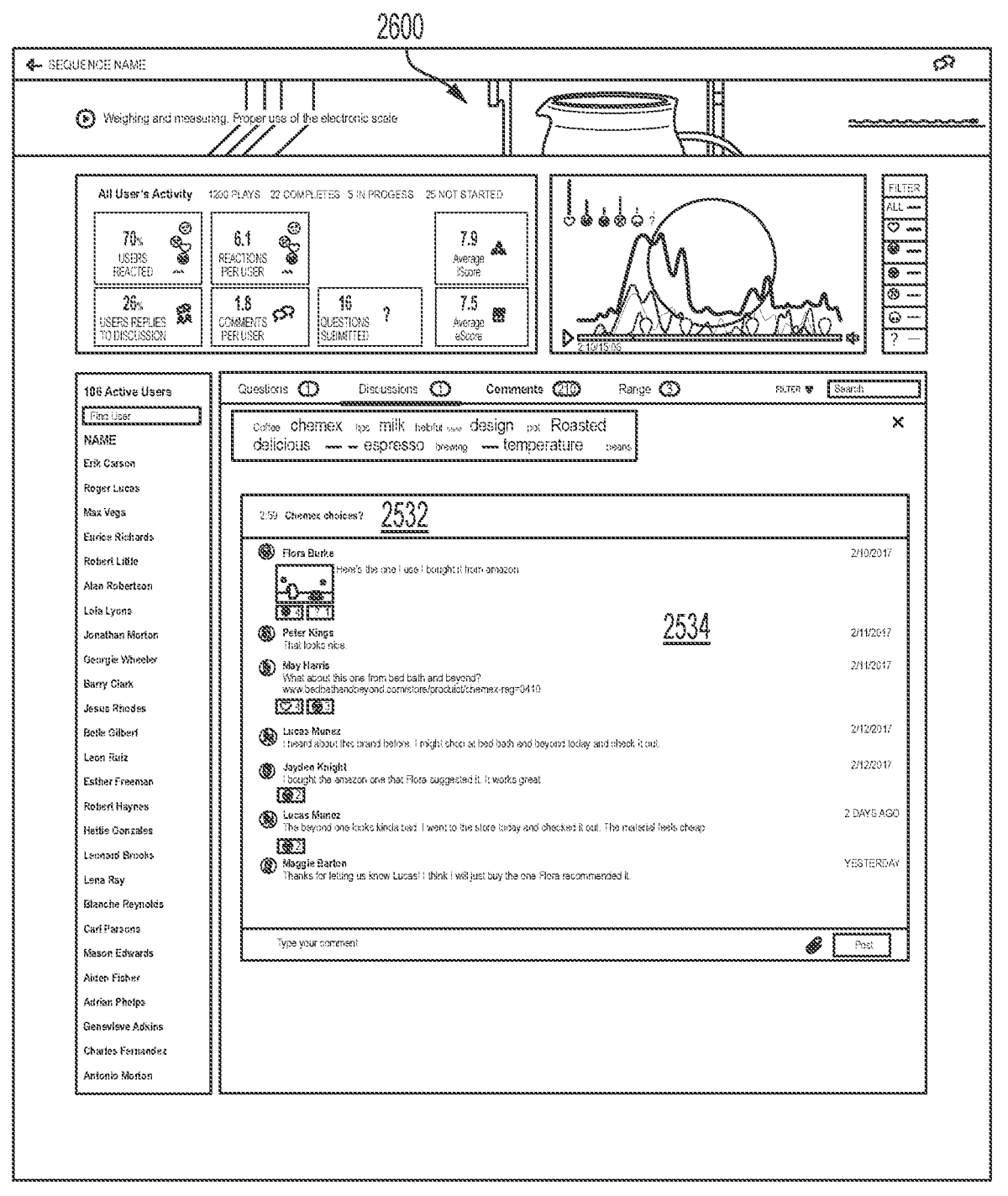

In response to selection, by the user, of the first particular discussion, the system may be configured to expand the first particular discussion 2532 to show a plurality of activities 2534 that make up the particular discussion as shown in FIG. 26B. As may be understood from this figure, a user may read the one or more activities, and respond to them in any suitable manner described herein.

Figure 27:
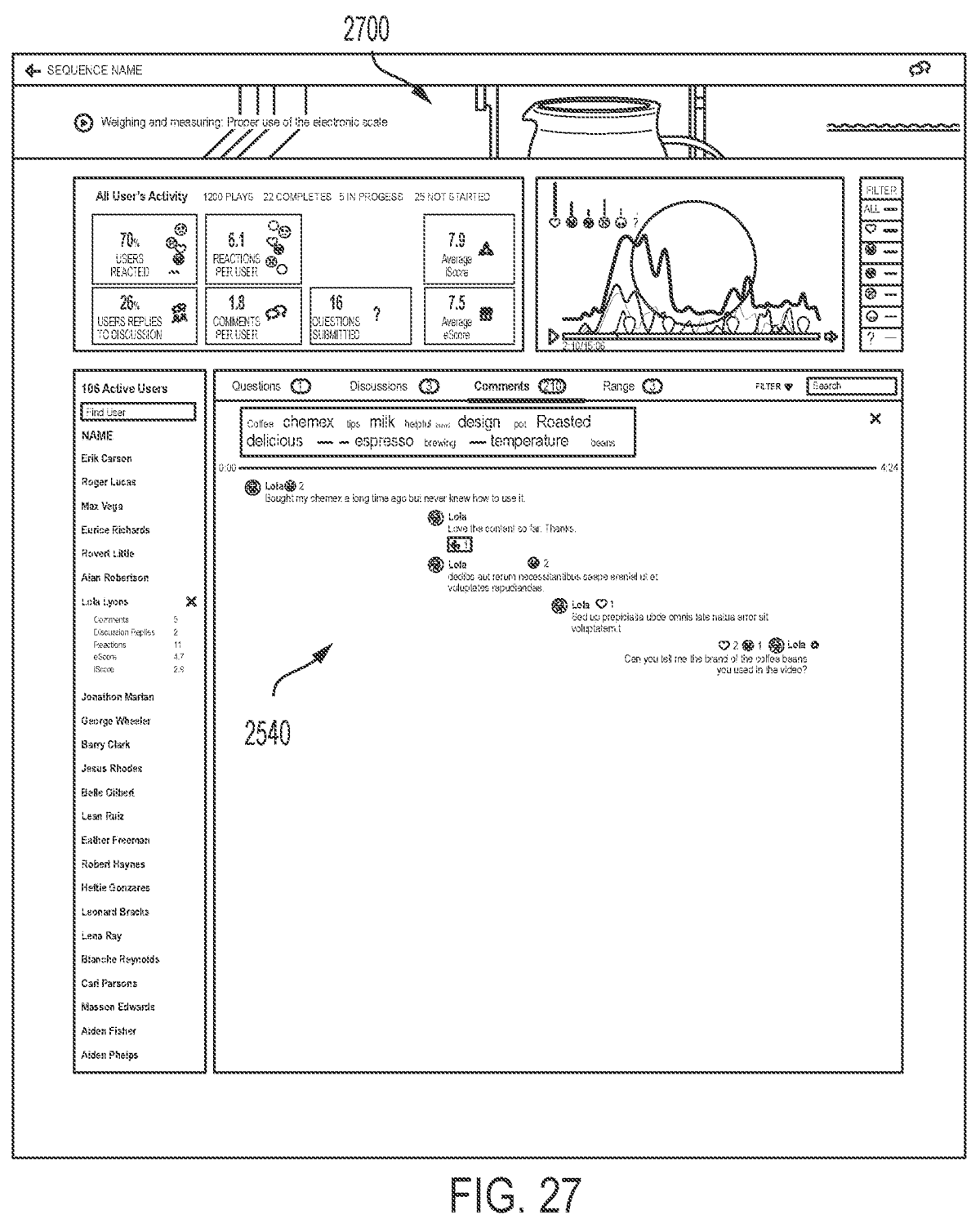

In still other embodiments, the system may be configured for: (1) receiving selection of a particular user; (2) in response to the response to the request, identifying one or more of the plurality of activities made by the particular user; (3) modifying the graphical display to reflect only those one or more of the plurality of activities made by the particular user; and (4) displaying, adjacent the modified graphical display, each of the one or more of the plurality of activities made by the particular user. FIG. 27 depicts a screen display 2700 that depicts a plurality of activities 2540 made by a single user (e.g., Lola). As may be understood from this figure, the screen display 2700 provides a summary of Lola's activities (e.g., activities), reactions, questions, etc.

Filter One or More Activities for Display in Association with the First Piece of Multimedia Based at Least in Part On: (1) A Number of Activities Received for a Particular Segment; (2) One or More User Group Affiliations; (3) One or More Links Between Users; (4) An Influence Level of a User that Provided the One or More Activities; (5) An Engagement Level with One or More of the One or More Viewers; (6) etc.

When executing the Multimedia Management Mapping Module 600, the system continues, at optional Step 640, by filtering one or more activities for display in association with the first piece of multimedia based at least in part on: (1) a number of activities received for a particular segment; (2) one or more user group affiliations; (3) one or more links between users; (4) an influence level of a user that provided the one or more activities; (5) an engagement level with one or more of the one or more activities; (6) meta or property data associated with users or groups (e.g., a branch ID, a region ID, etc.), (7) etc.

In various embodiments, the system is configured for storing a plurality of activities, each of the plurality of activities being associated, in memory, with a segment identifier that identifies a particular segment of a particular one of the plurality of pieces of multimedia. In such embodiments, the system may receive, map, and store such activities in any suitable manner described herein. In particular embodiments, the system is further configured for: (1) storing a plurality of activities, each of the plurality of activities being associated, in memory, with a particular segment identifier that identifies a particular segment of a plurality of segments that make up the multimedia; (2) receiving one or more activity display criteria; (3) filtering the plurality of activities based at least in part on the criteria; and (4) displaying the filtered activities along with the multimedia based at least in part on an associated segment identifier of each particular filtered activity.

In various embodiments, the one or more activity display criteria comprise, for example: (1) reducing a number of activities in response to determining that a threshold number of activities have been received by the system for a particular segment (e.g., a throttling criteria); (2) displaying only activities that are associated with a particular user; (3) displaying only activities that have been submitted by one or more users that are part of a particular group (e.g., course, course project group, club, social network connection, neighborhood association, etc.); (4) displaying only activities that have been submitted by one or more users that are connected via one or more links; (5) an engagement score of a particular segment of content (e.g., determined using any suitable technique described herein); (6) an engagement of a user viewing the plurality of activities to the multimedia or a segment thereof (e.g., determined using any suitable technique described herein); (7) an influence level of a user that submitted one or more of the plurality of activities; and/or (8) any other suitable factor.

For example, the system may be configured to filter and/or sort activities based on whether: (1) a first user viewing the activities is connected with one or more of the viewers on social media; (2) a first user viewing the activities is in the same class or course as the one or more viewers (e.g., and the multimedia is part of the course); (3) etc.

Multimedia Branching Module

In particular embodiments, when executing a Multimedia Branching Module 700, the system is configured to automatically determine which sequences of a piece of multimedia content to display to a viewer and which sequences to skip, based on for example, a user's engagement score with the piece of multimedia content, a sentiment score associated with the content, etc. This may, for example, result in branching of the piece of multimedia where particular portions are removed and/or other new pieces of multimedia are added in various locations and/or time locations of the multimedia during viewing. The system may be further configured to: (1) skip one or more sequences of content where a user's scores are low (e.g., the user has low engagement) or add new sequences of similar subject matter presented in a different format (e.g., a different type of multimedia) based on the viewer's learning preferences; (2) add one or more sequences of content in response to determining that a user appears confused or lost based on, for example, the user's activities, reactions, sentiment, questions or replies submitted, etc.; and/or (3) deviate to one or more new sequences of content based on a user's interests, engagement (e.g., score) line of questions, replies, etc.

Identify One or More Sequences (e.g., Fragments) of a Piece of Multimedia Based on One or More Criteria.

When executing the Multimedia Branching Module 700, the system begins, at Step 710, by identifying one or more sequences (e.g., fragments) of a piece of multimedia based on one or more criteria. In particular embodiments, the one or more criteria comprise, for example: (1) an engagement score of the user (e.g., determined using one or more suitable techniques described herein); (2) a volume of activities submitted by the user; (3) a volume of questions submitted by the user; (4) one or more preferred learning techniques of the user (e.g., determined using one or more suitable techniques described herein); (5) a sentiment score of the piece of multimedia, or one or more segments of the piece of multimedia (e.g., determined using one or more suitable techniques described herein); (6) content (e.g., one or more terms used in, a tone of, punctuation of, etc.) of the user's one or more activities, responses, or questions; (7) etc.

The system may, for example, identify the one or more sequences (e.g., fragments) of the piece of multimedia by identifying one or more sequences where: (1) the user has a low engagement score; (2) the user is asking a lot of questions; (3) the user has struggled understanding that type of sequence in the past; (4) the one or more sequences have a low sentiment score (e.g., are not well received by other users); and/or (5) for any other suitable reason.

In some embodiments, the system is configured to store an indication of the identified one or more sequences in computer memory. The system may, for example, store (e.g., in an electronic record associated with the user, one or more activities, the piece of multimedia, or any other suitable aspect of the system) metadata detailing which of the various sequences of a piece of multimedia were identified.

Provide Data Indicating the Identified One or More Sequences

When executing the Multimedia Branching Module 700, the system continues, at Step 720, by providing data indicating the identified one or more sequences. The system may be configured to provide the data to a suitable mobile computing device, software application, plugin, etc. that the user is using to view the multimedia. In other embodiments, the system is configured to provide the data indicating the identified one or more sequences to facilitate display of at least a subset of the multimedia in view of the one or more criteria as described more fully below.

Provide a First Subset of the Multimedia for Display that does not Include the Identified One or More Sequences.

When executing the Multimedia Branching Module 700, the system continues, at Step 730, by providing a first subset of the multimedia for display that does not include the identified one or more sequences. In various embodiments, the first subset of the multimedia comprises all portions of the multimedia other than at least one of the one or more sequences identified at Step 710. In particular, the first subset of the multimedia is indicated in the data provided at Step 720. In various embodiments, the first subset comprises at least a portion of the piece of multimedia. For example, the first subset may include some of the scenes of an entire video, or any other suitable portion.

The system may, for example, provide the metadata detailing which of the various sequences of a piece of multimedia should be played back during playback of the multimedia (e.g., in the case of a video).

Optionally Provide One or More Pieces of Additional Multimedia Based at Least in Part on the One or More Criteria When executing the Multimedia Branching Module 700, the system continues, at Step 740, by optionally providing one or more pieces of additional multimedia based at least in part on the one or more criteria. In some embodiments, the system may add one or more additional pieces of multimedia (e.g., one or more sequences from one or more additional pieces of multimedia), or link to one or more additional pieces of multimedia to provide to the viewer. The system may, in various embodiments, identify an additional piece (e.g., or portion) of another piece of media content to add to the first subset of the multimedia based on the one or more criteria. The one or more criteria may include, for example: (1) a type of multimedia that the user learns better from (e.g., the user may learn better from worksheets or reading than from videos); (2) one or more pieces of multimedia related to a particular sequence of the multimedia that was giving the user trouble (e.g., they are having trouble understanding), which may, for example, replace an identified sequence that was not part of the first subset; and/or (3) any other suitable criteria.

In particular embodiments, the system may identify and replace one or more portions of a piece of multimedia using any suitable technique described herein. For example, the system may identify one or more segments to remove from the multimedia and/or one or more segments to add to the multimedia based at least in part on any factor, score (e.g., engagement score, learning score, etc.), activity, activity, type of activity, frequency of activity; volume of activities; content of activities; activity map; etc. described herein.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. An electronic data processing system for electronically managing a conversation that is linked to one or more segments of multimedia content divided into a plurality of segments, and for syncing certain activities to one or more segments of the multimedia content, comprising:
   a. one or more processors;
   b. memory coupled to the one or more processors;
   c. a plurality of electronic data records stored in the memory, each one of the plurality of electronic data records corresponding to an activity submitted by a viewer of a particular multimedia content and comprising an identifier for the particular multimedia content, information associated with the activity, information regarding the segment of the multimedia content the activity is associated with, and one or more data fields selected from a group consisting of:
      i. text contained in the activity;
      ii. a time stamp for when the activity was initiated;
      iii. a time stamp for when the activity was submitted;
      iv. a length of the activity;
      v. a number of words contained in the activity;
      vi. a reaction type;
      vii. a reply count;
      viii. an activity count;
      ix. a question flag;
      x. an answer flag;
      xi. an activity type;
      xii. an identifier for the viewer who submitted the activity; and
      xiii. an identifier for a related activity that is linked to the activity;
   wherein the one or more processors are configured for:
      i. receiving one or more activity display criteria;
      ii. filtering the plurality of electronic data records based at least in part on the one or more activity display criteria; and
      iii. displaying activities associated with the one or more of the filtered electronic data records along with the multimedia based at least in part on an associated segment identifier of each of the one or more particular filtered electronic data records.

2. The electronic data processing system of claim 1, wherein receiving one or more activity display criteria further comprises determining one or more characteristics associated with a first viewer of the particular multimedia content.

3. The electronic data processing system of claim 2, wherein filtering the plurality of electronic data records based at least in part on the one or more activity display criteria further comprises reducing the number of electronic data records to be displayed based on one or more characteristics selected from the group consisting of:
   a. a relationship between the first viewer and one or more other viewers that viewed the particular multimedia content;
   b. one or more other viewers selected by the first viewer;
   c. one or more other viewers whose activities the first viewer has reacted to in the past; and
   d. one or more other viewers whose activities the first viewer has reacted to in a positive manner.

4. The electronic data processing system of claim 1, wherein the one or more processors are further configured for:
   a. displaying an indicator that notifies the first viewer that the displayed activities are being filtered; and b. at least partially in response to the indicator being selected by the first viewer, displaying an unfiltered plurality of activities.

5. The electronic data processing system of claim 1, wherein the displayed activities associated with the one or more of the filtered electronic data records comprise activities that are associated with other viewers of the particular multimedia content that are considered high influencers with respect to the particular multimedia content.

6. The electronic data processing system of claim 1, wherein the displayed activities associated with the one or more of the filtered electronic data records comprises activities that are associated with other viewers of the particular multimedia content that the viewer has elected to follow.

7. The electronic data processing system of claim 1, wherein filtering the plurality of electronic data records based at least in part on the one or more activity display criteria further comprises limiting the number of activities that are displayed for a particular segment of the multimedia content to a predefined threshold value.

8. A computer-implemented data processing method for electronically managing a conversation that is linked to one or more segments of multimedia content that is divided into a plurality of segments, and for filtering the displayed conversation based on various criteria, comprising:
   a. determining, by one or more processors, one or more throttling criteria associated with a first viewer;
   b. at least partially in response to determining one or more throttling criteria for the first viewer, identifying, by one or more processors, one or more of the electronic data records that are associated with segments of the multimedia content based at least in part on the one or more filtering criteria; and
   c. displaying, by one or more processors, on a display interface the identified one or more of the plurality of activities as a segment of the multimedia content associated with the identified one or more of the plurality of activities is displayed to the first viewer.

9. The computer-implemented data processing method of claim 8, wherein the identified one or more of the plurality of activities are activities associated with one or more viewers preselected by the first viewer.

10. The computer-implemented data processing method of claim 8, wherein the identified one or more of the plurality of activities are activities associated with one or more viewers that belong to a group to which the first viewer belongs.

11. The computer-implemented data processing method of claim 8, wherein the identified one or more of the plurality of activities are activities associated with one or more viewers that have previously influenced the first viewer.

12. The computer-implemented data processing method of claim 11, wherein a viewer previously influenced the first viewer when the first viewer previously submitted an activity in response to a viewer's activity.

13. The computer-implemented data processing method of claim 8, wherein the identified one or more of the plurality of activities are activities that contain subject matter that are similar to the subject matter of the first viewers activities that have been previously submitted by the first viewer.

14. The computer-implemented data processing method of claim 8, further comprising the step of allowing the first viewer to switch to a display view where the first viewer can view all of the activities associated with a particular segment of the multimedia content.

\* \* \* \* \*